E. H. PIERSEN.
TELEGRAPH TRANSMITTER.
APPLICATION FILED JUNE 1, 1915.
1,359,463.
Patented Nov. 16, 1920.
27 SHEETS—SHEET 1.
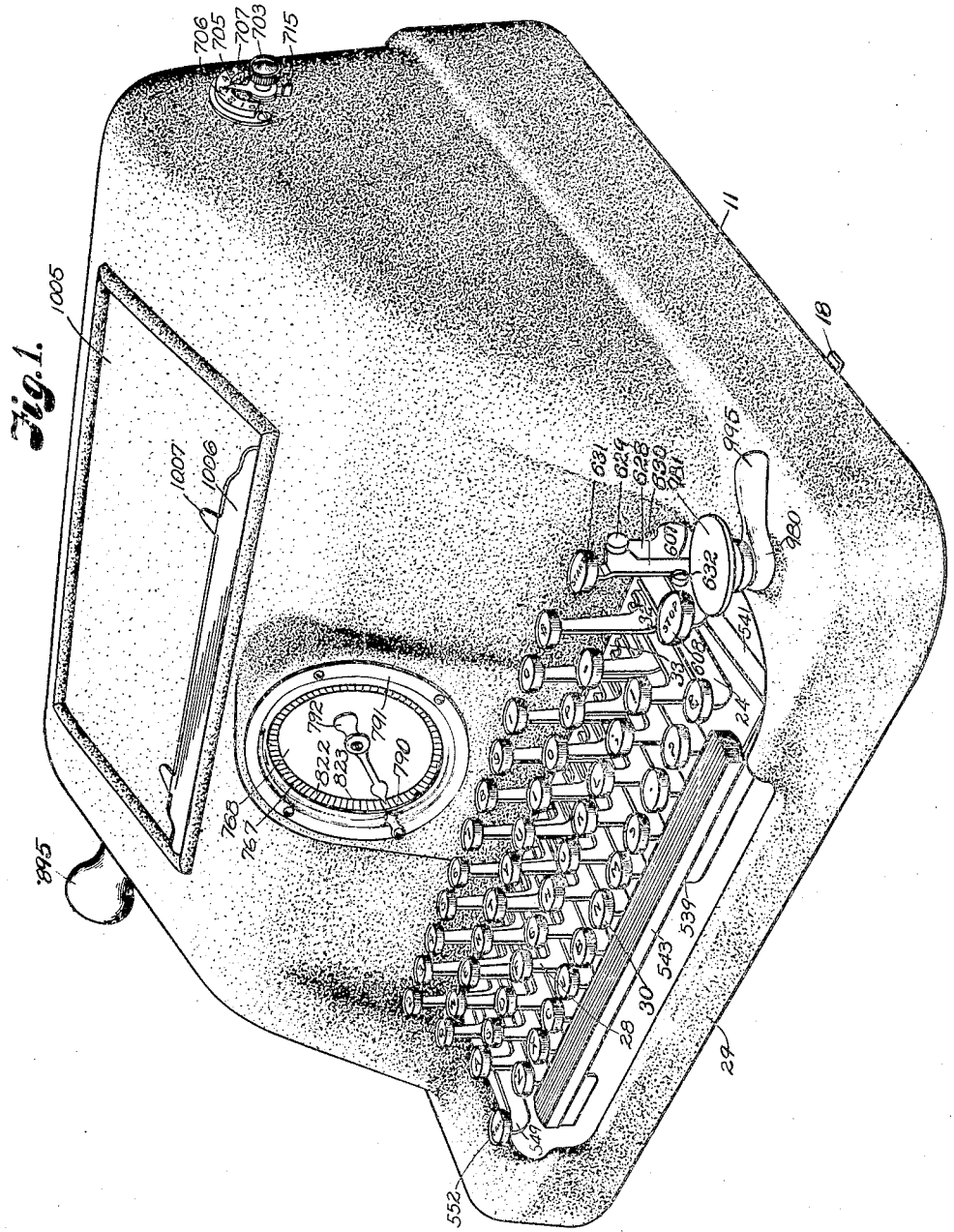
WITNESSES.
Arthur W. Caps.
Milton Lenoir
INVENTOR.
Edwin H. Piersen.
BY
ATTORNEY.

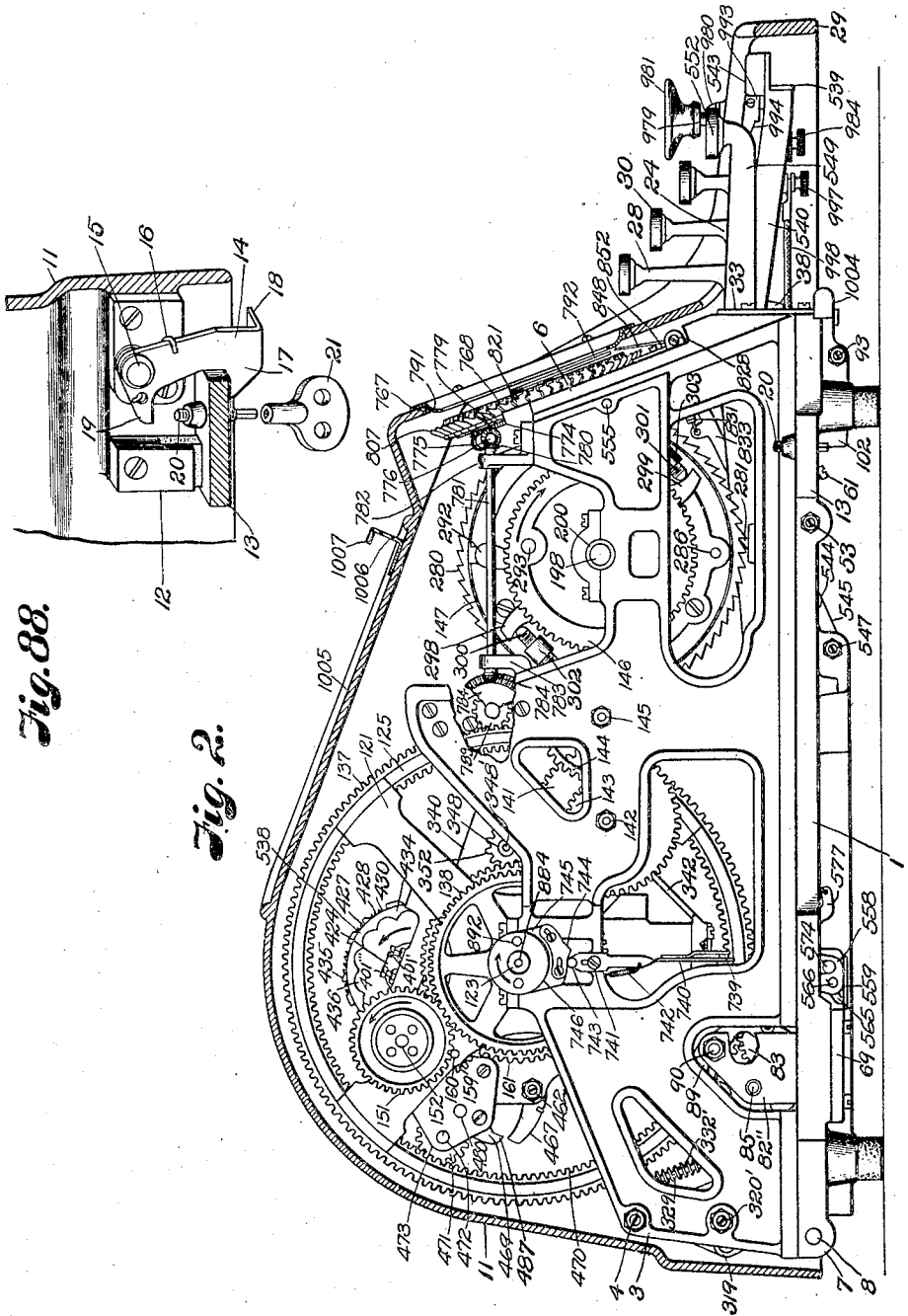

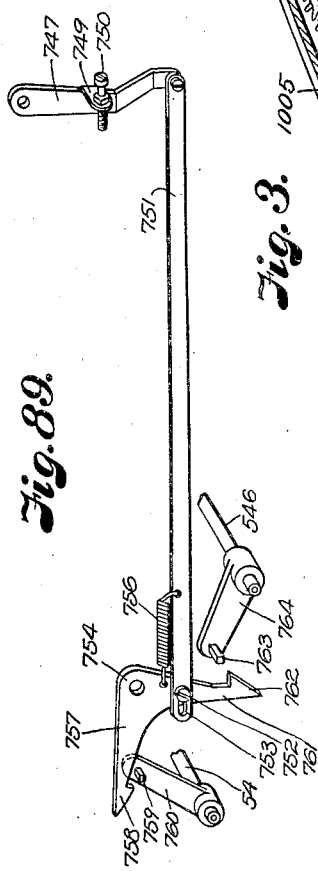

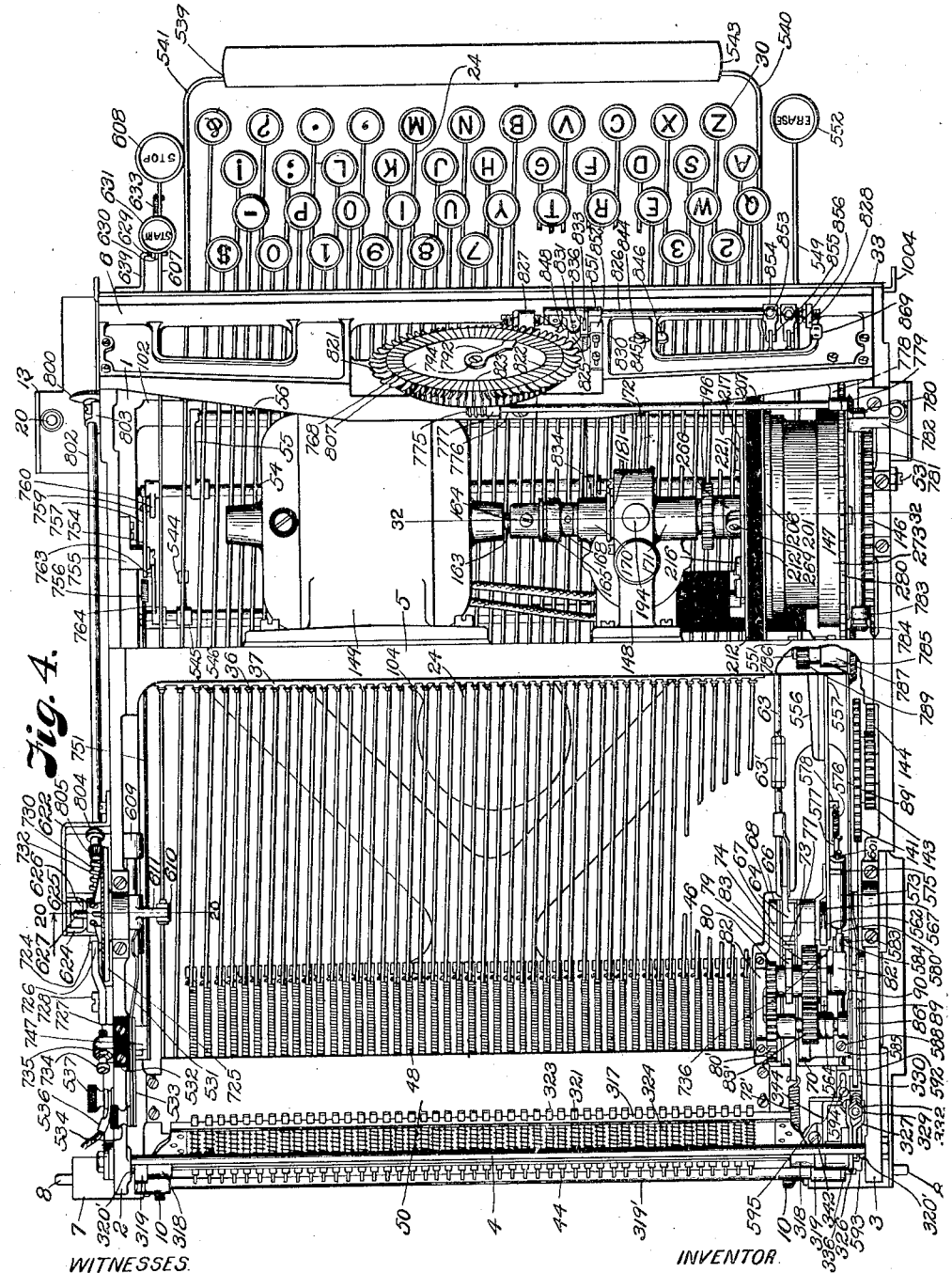

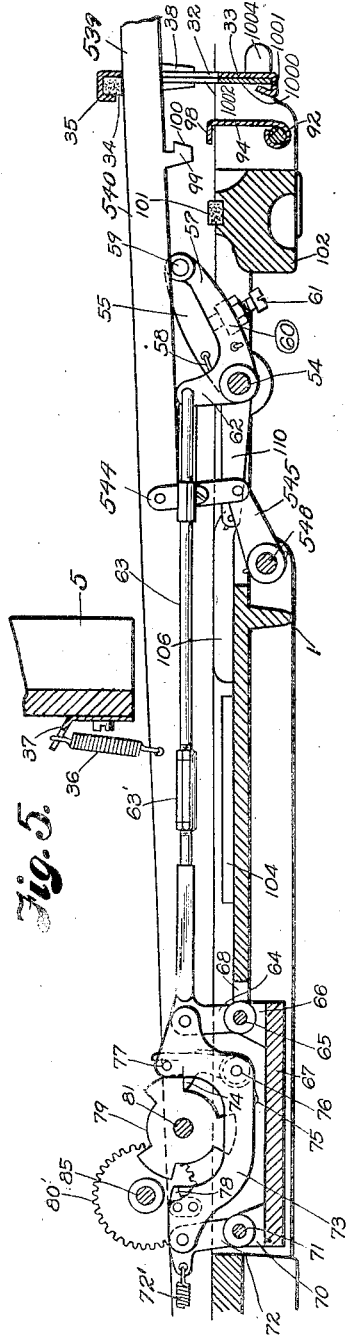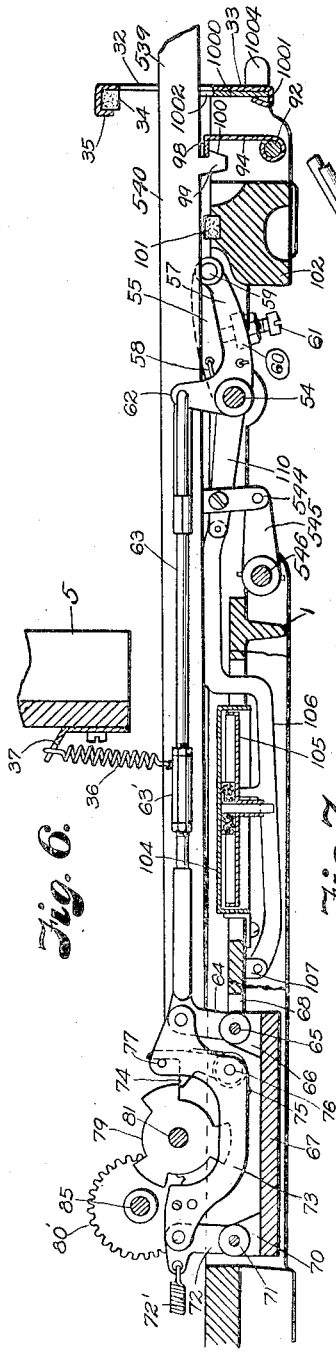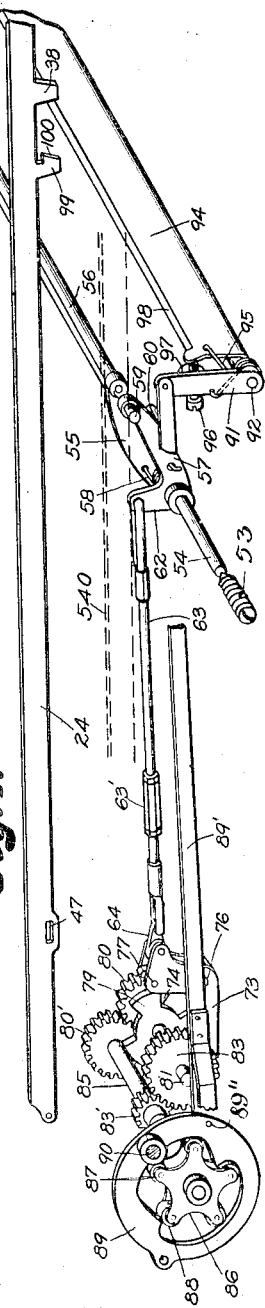

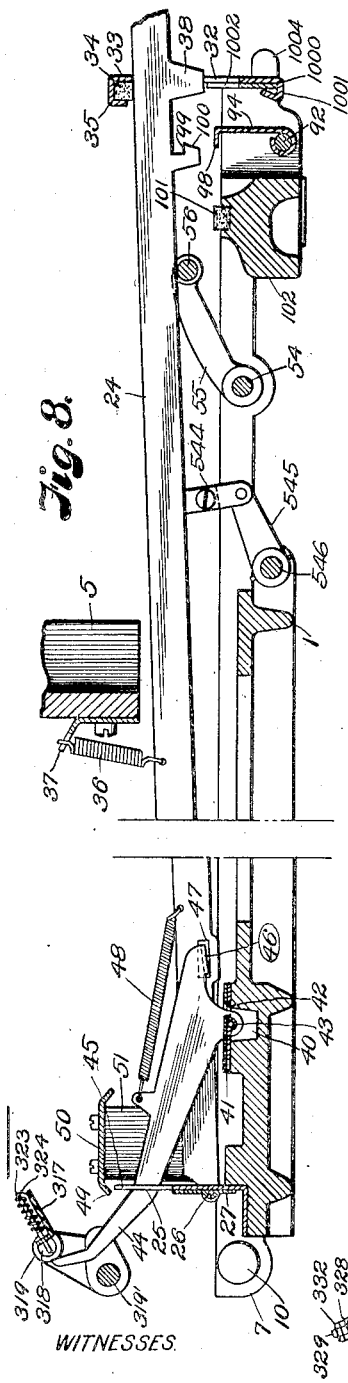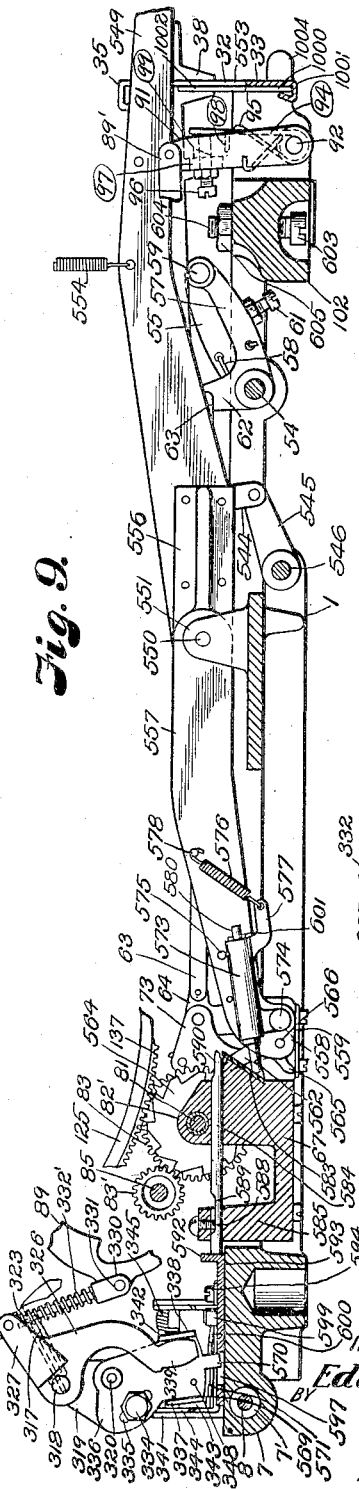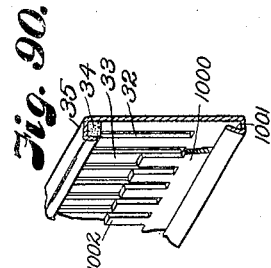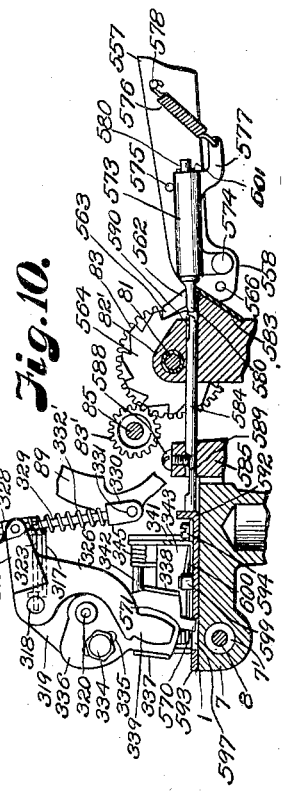

E. H. PIERSEN.
TELEGRAPH TRANSMITTER.
APPLICATION FILED JUNE 1, 1915.
1,359,463.
Patented Nov. 16, 1920.
27 SHEETS—SHEET 7.
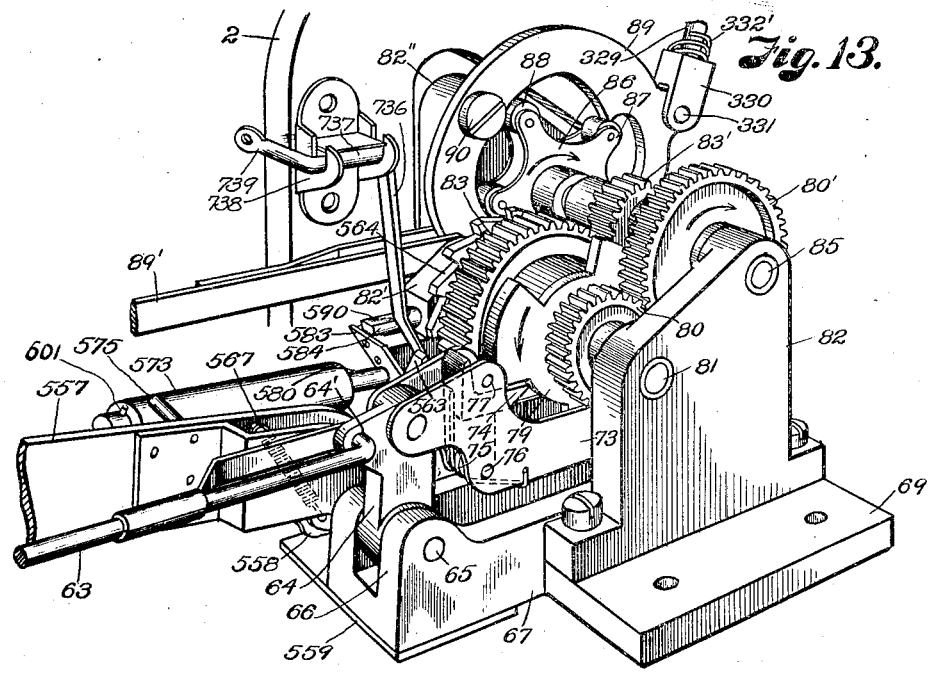
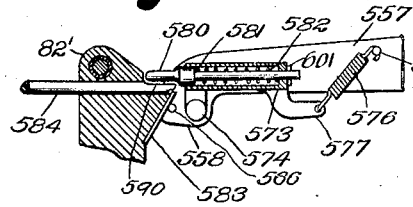
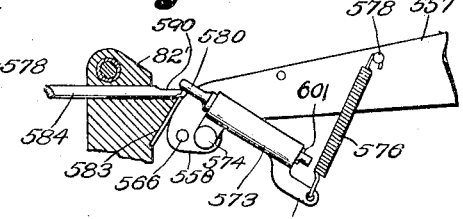
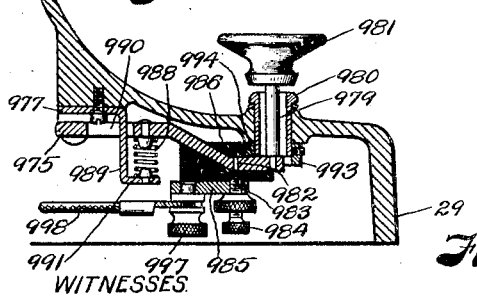
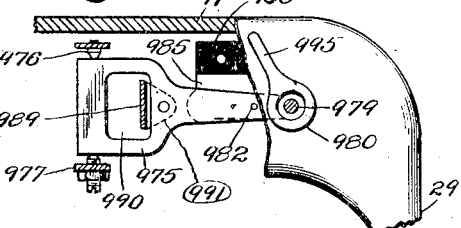
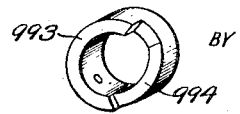
WITNESSES
Arthur W. Caps.
Milton Lenoir
INVENTOR
Edwin H. Piersen.
BY
ATTORNEY.

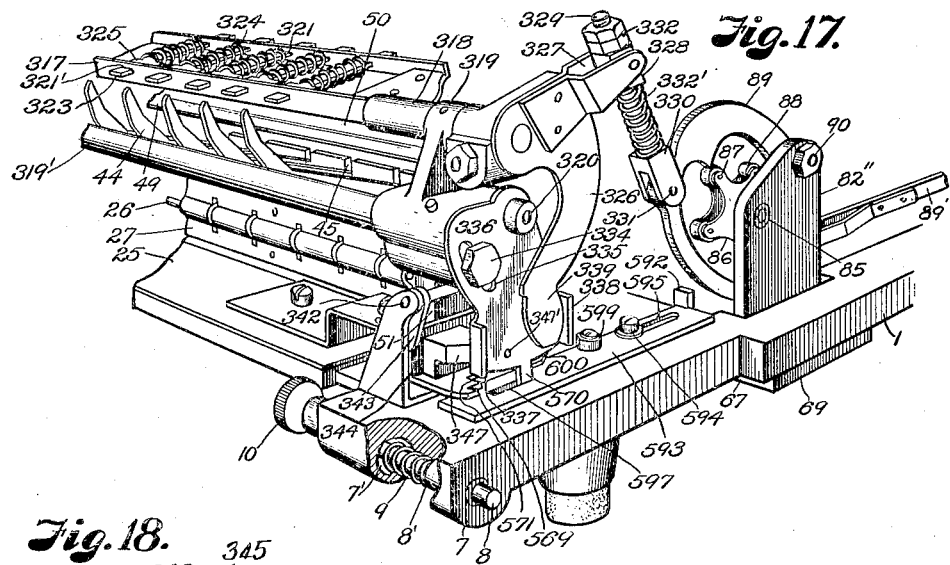
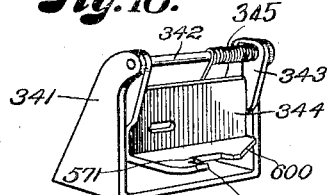
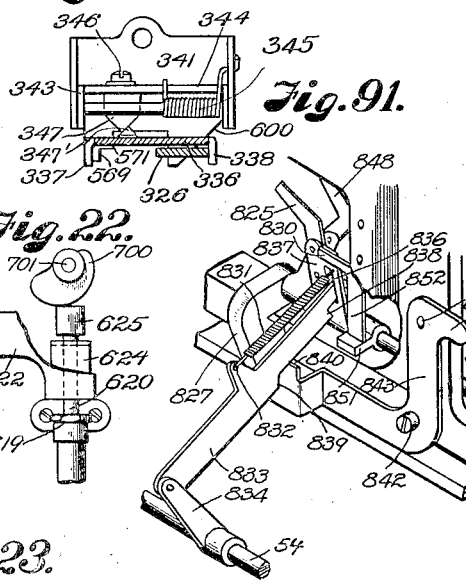
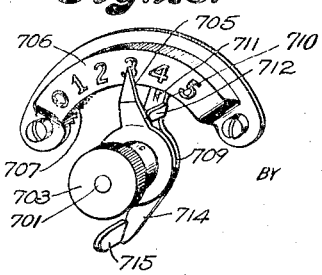

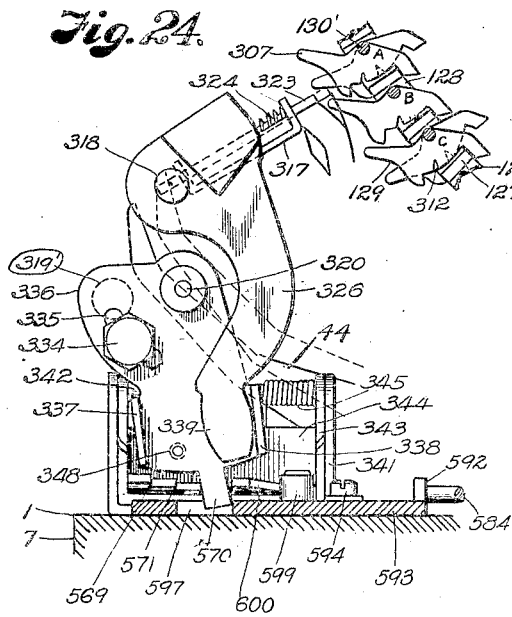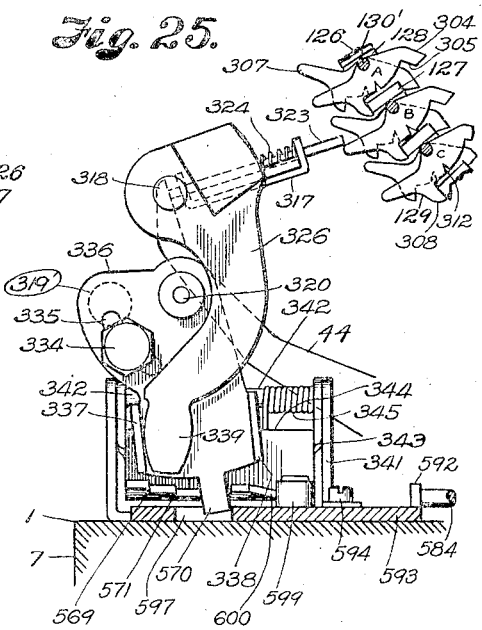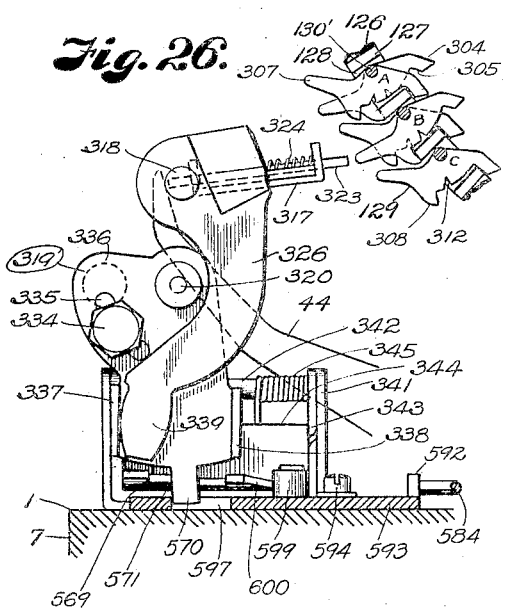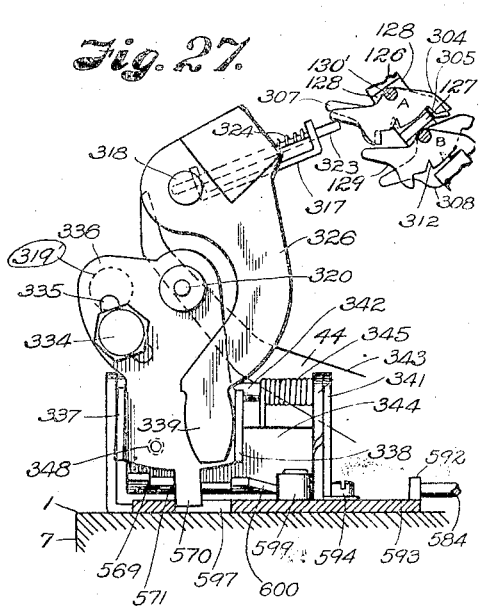

E. H. PIERSEN.
TELEGRAPH TRANSMITTER.
APPLICATION FILED JUNE 1, 1915.

1,359,463.

Patented Nov. 16, 1920.

WITNESSES.
Arthur W. Caps.
Milton Lenoir

INVENTOR.
Edwin H. Piersen.
BY Arthur C. Brown
ATTORNEY.

E. H. PIERSEN.
TELEGRAPH TRANSMITTER.
APPLICATION FILED JUNE 1, 1915.
1,359,463.
Patented Nov. 16, 1920.
27 SHEETS—SHEET 11.
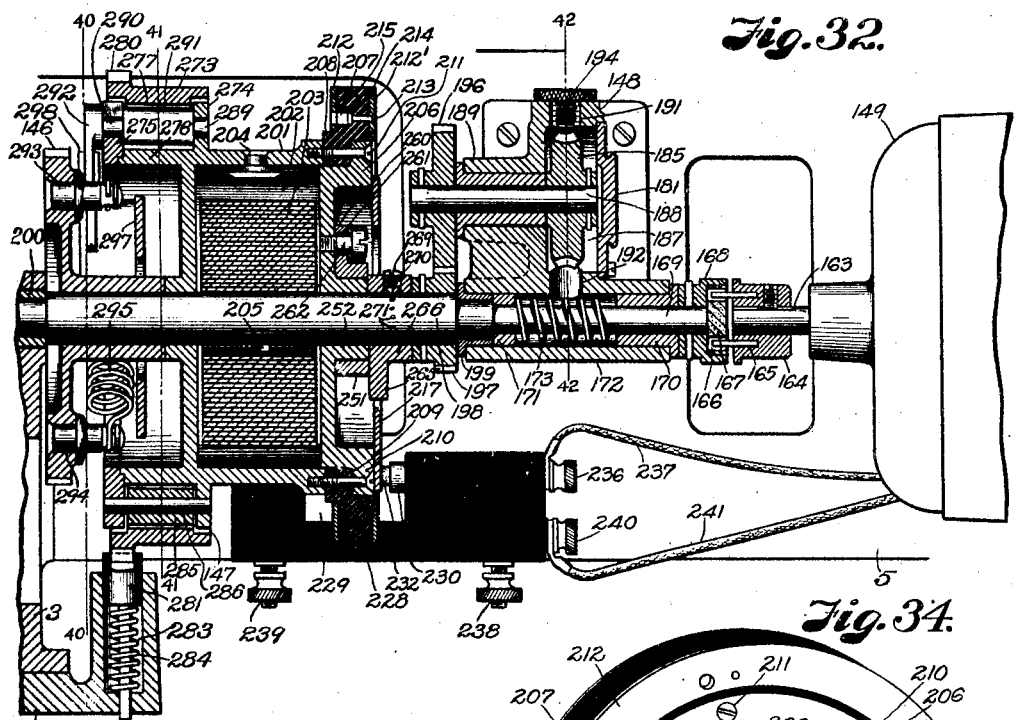
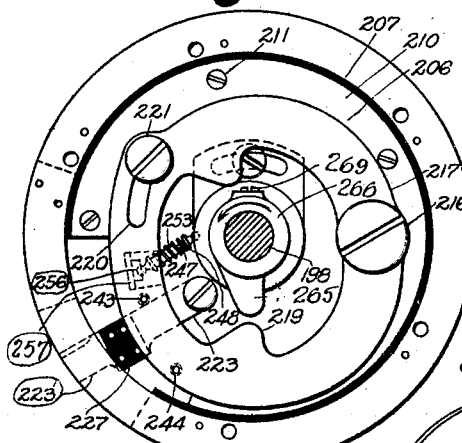
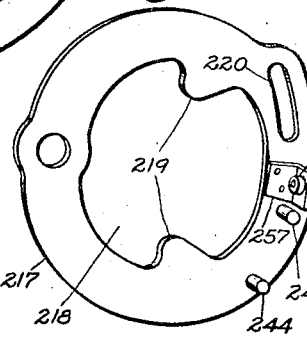
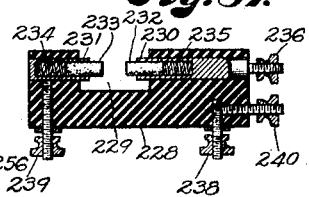
WITNESSES.
Arthur W. Capes.
Milton Lenoir
INVENTOR
Edwin H. Piersen.
BY
Arthur C. Brown
ATTORNEY.

E. H. PIERSEN.
TELEGRAPH TRANSMITTER.
APPLICATION FILED JUNE 1, 1915.
1,359,463.
Patented Nov. 16, 1920.
27 SHEETS—SHEET 12.
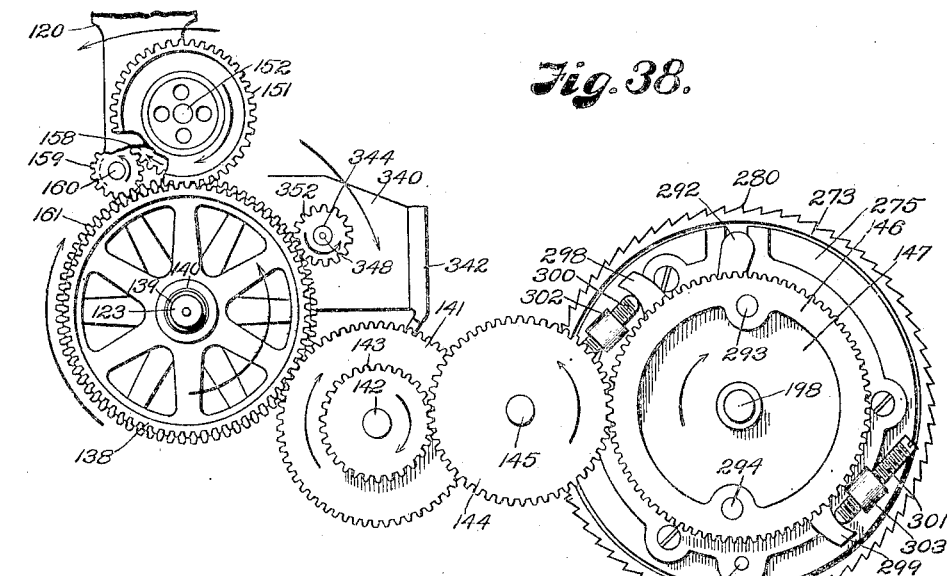
Fig. 38.
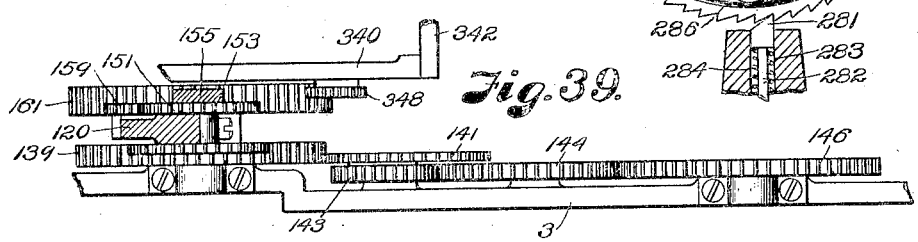
Fig. 39.
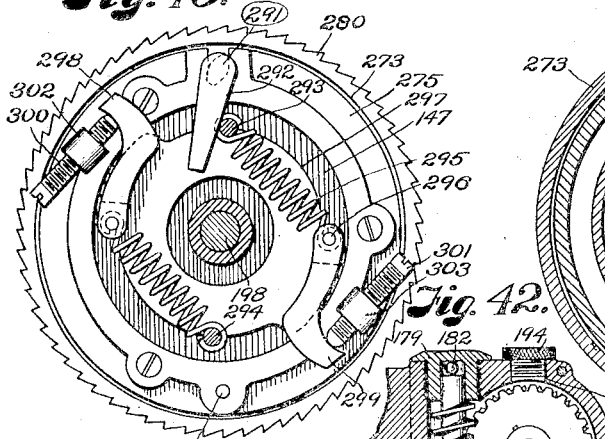
Fig. 40.
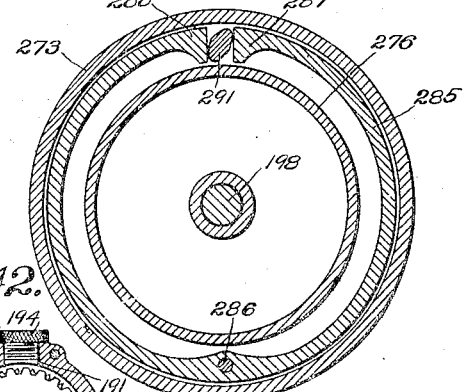
Fig. 41.
Fig. 42.
WITNESSES
Arthur W. Capps.
Milton Lenoir
INVENTOR.
Edwin H. Piersen.
BY
Arthur E. Brown
ATTORNEY.

E. H. PIERSEN.
TELEGRAPH TRANSMITTER.
APPLICATION FILED JUNE 1, 1915.
1,359,463.
Patented Nov. 16, 1920.
27 SHEETS—SHEET 13.
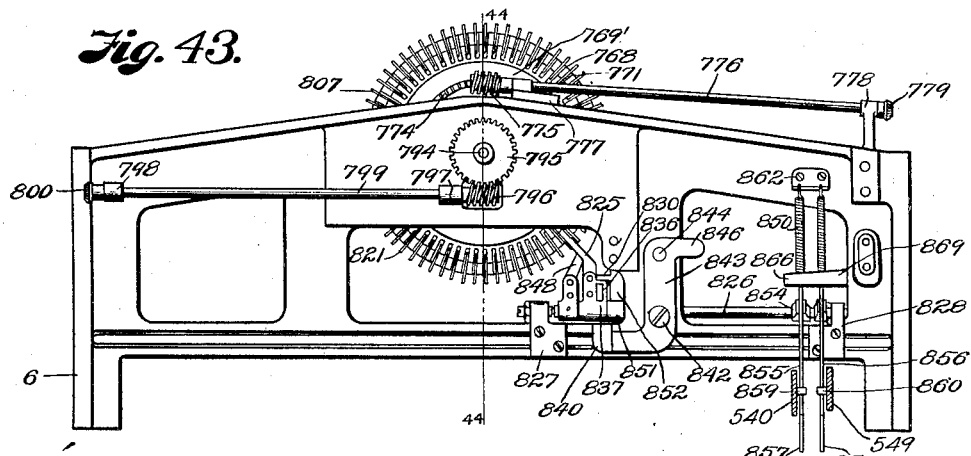
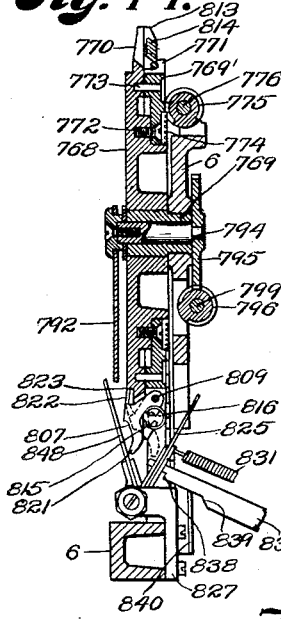
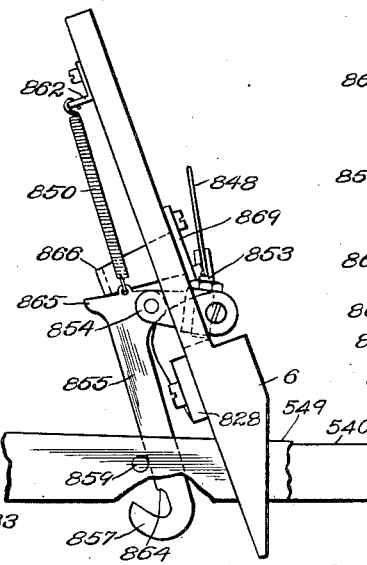
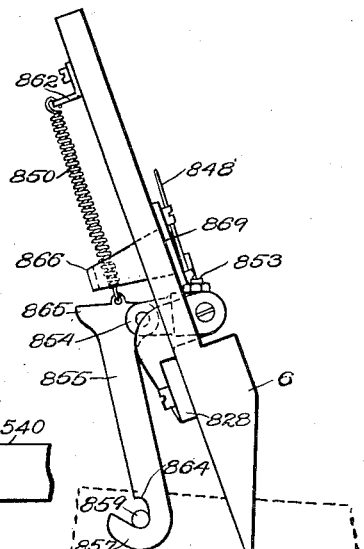
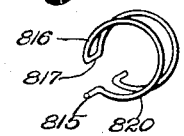
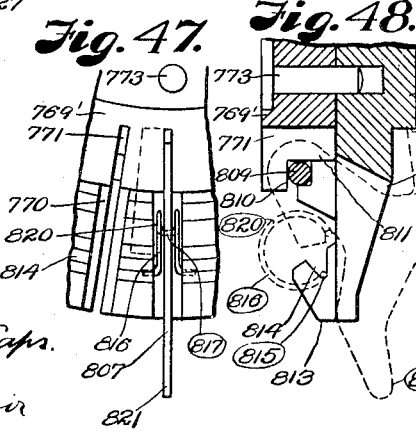
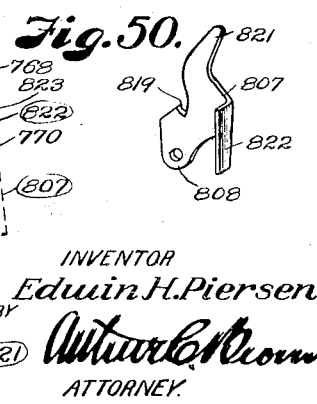
WITNESSES.
Arthur W. Caps.
Milton Lenoir
INVENTOR
Edwin H. Piersen.
BY Arthur C. Brown
ATTORNEY.

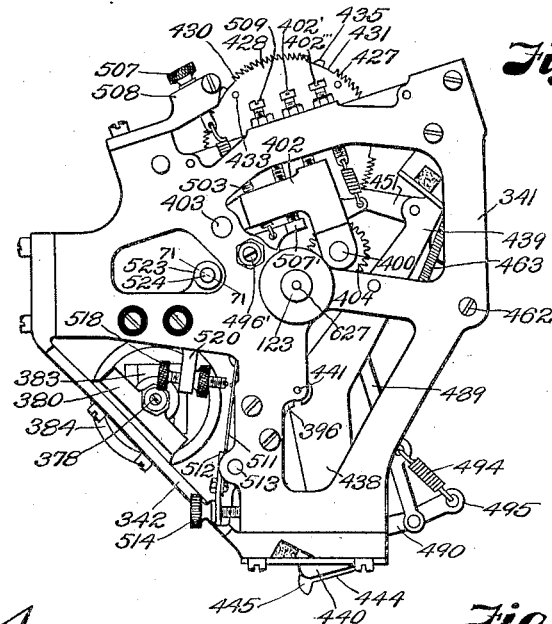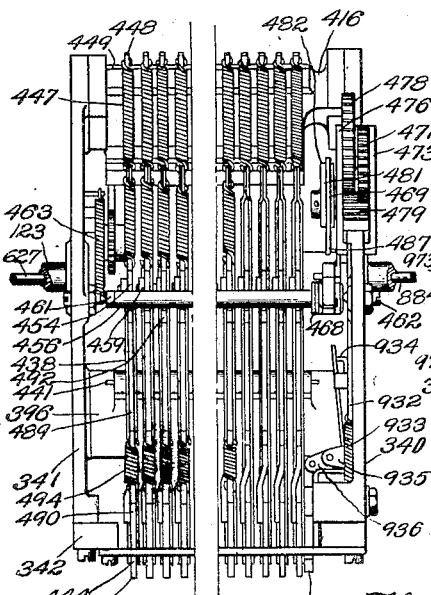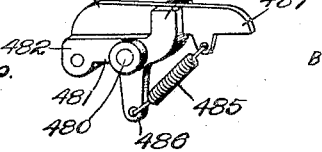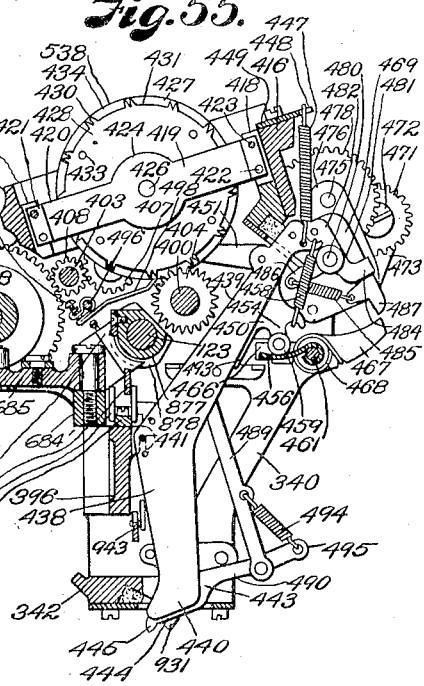

E. H. PIERSEN.
TELEGRAPH TRANSMITTER.
APPLICATION FILED JUNE 1, 1915.

1,359,463.

Patented Nov. 16, 1920.
27 SHEETS—SHEET 16.

WITNESSES.
Arthur W. Caps.
Milton Lenoir

INVENTOR.
Edwin H. Piersen.
BY
Arthur C. Brown
ATTORNEY.

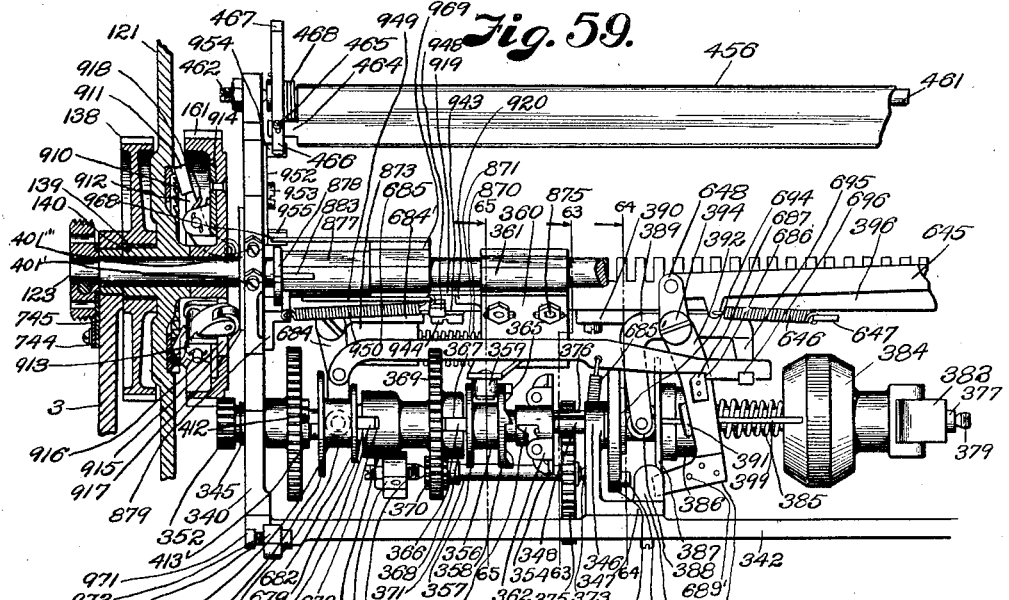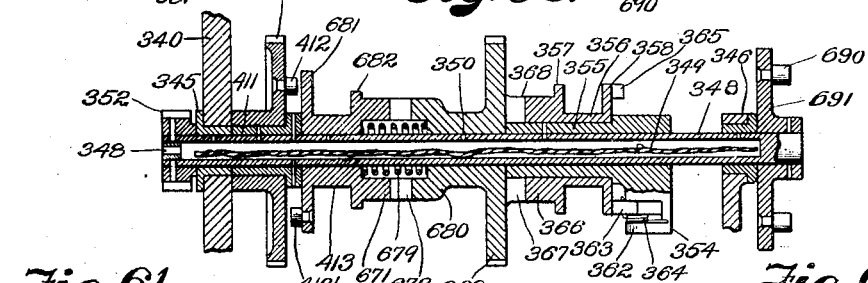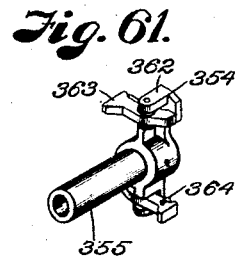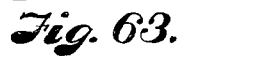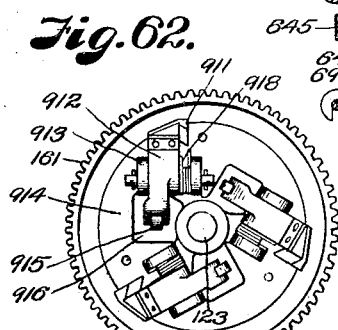

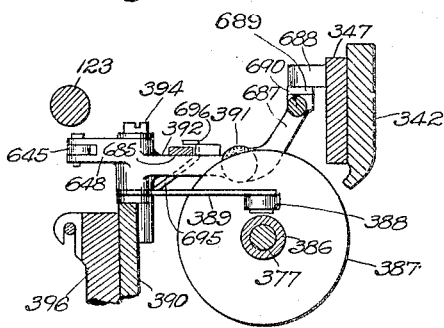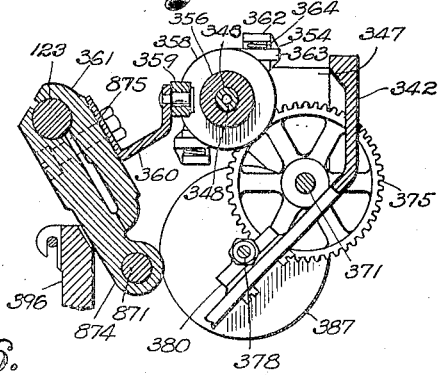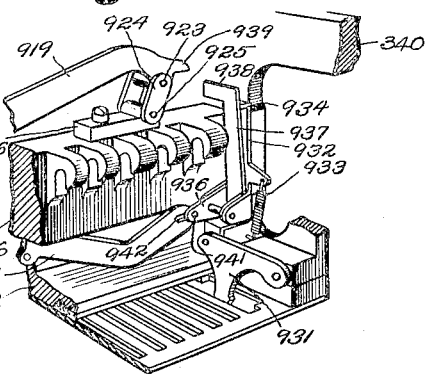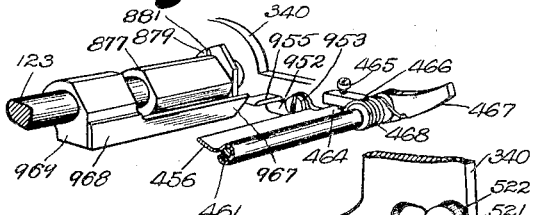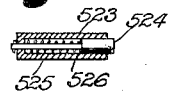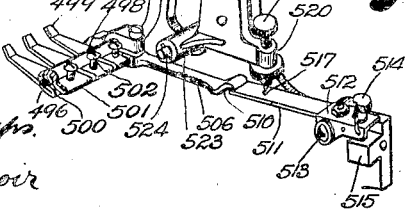

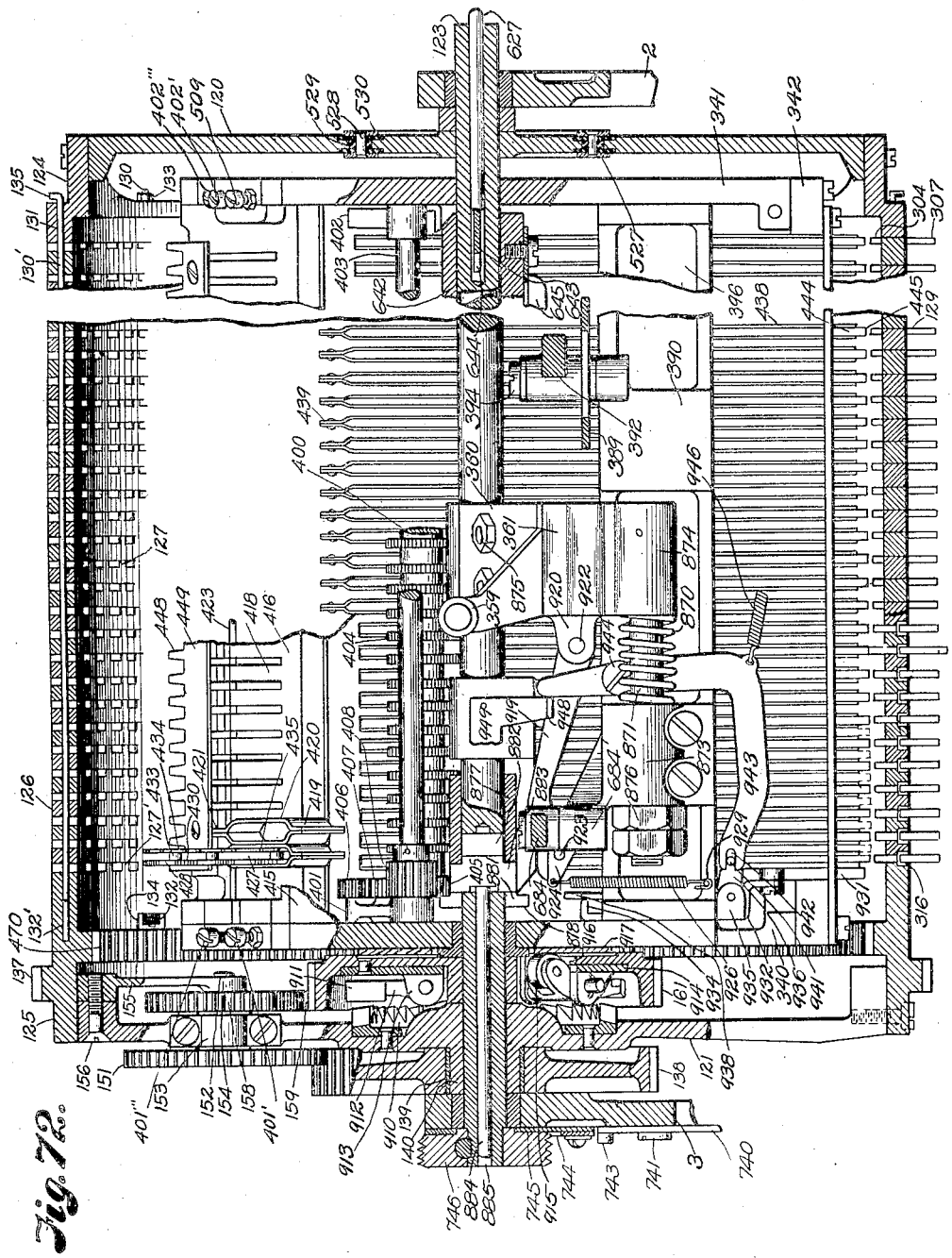

E. H. PIERSEN.
TELEGRAPH TRANSMITTER.
APPLICATION FILED JUNE 1, 1915.
1,359,463.
Patented Nov. 16, 1920.
27 SHEETS—SHEET 20.
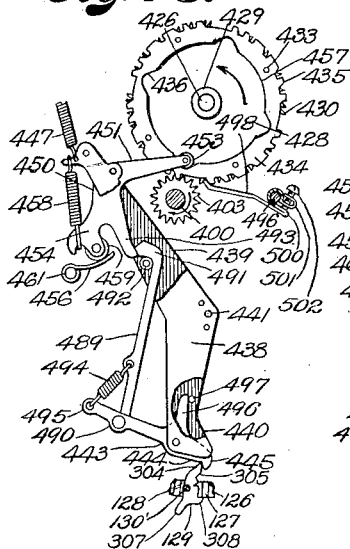
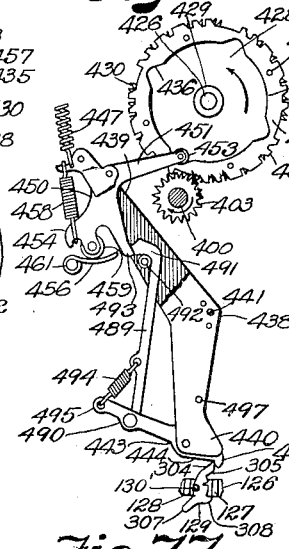
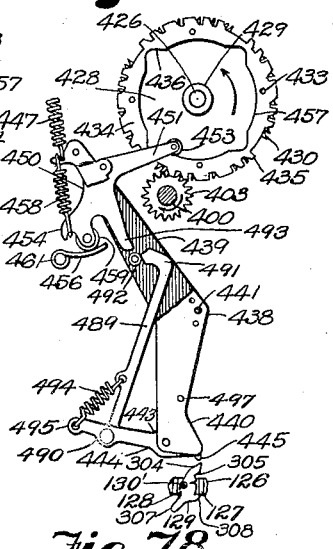
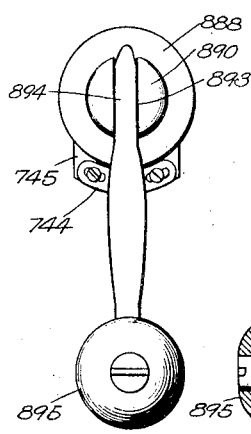
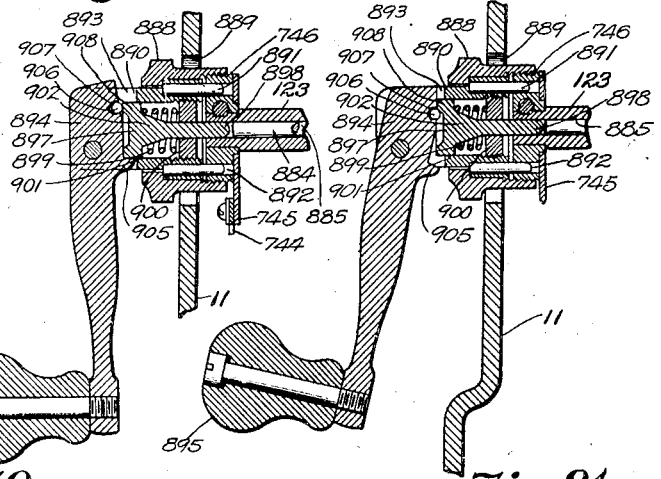
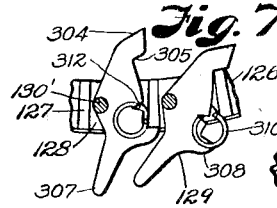
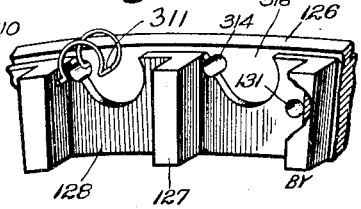
WITNESSES.
Arthur W. Caps.
Milton Lenoir
INVENTOR.
Edwin H. Piersen.
BY
Arthur E. Brown
ATTORNEY E. H. PIERSEN.
TELEGRAPH TRANSMITTER.
APPLICATION FILED JUNE 1, 1915.
1,359,463.
Patented Nov. 16, 1920.
27 SHEETS—SHEET 21.
Fig. 82.
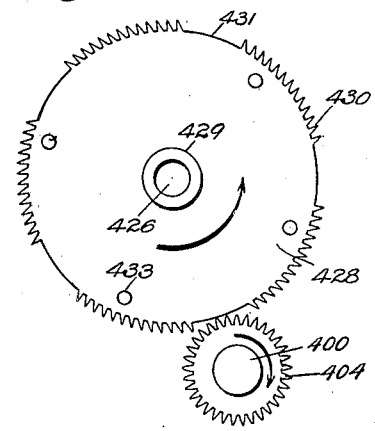
Fig. 83.
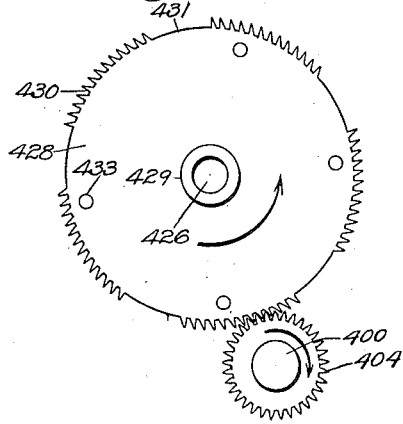
Fig. 84.
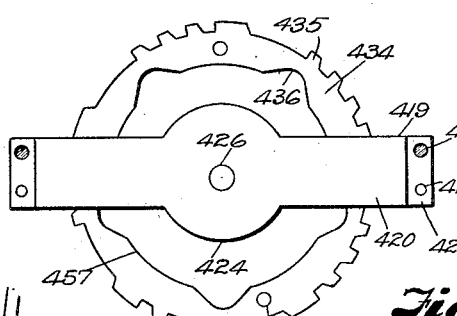
Fig. 85.
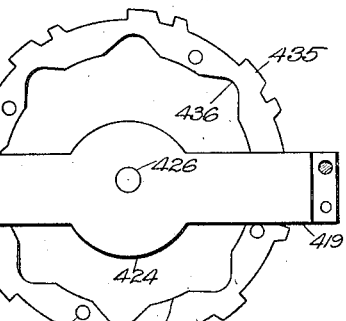
Fig. 87.
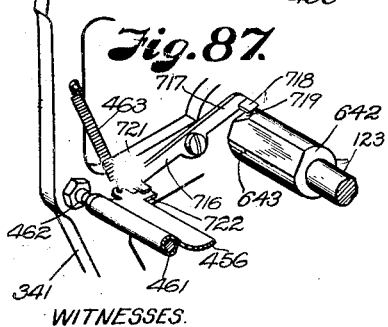
Fig. 86.
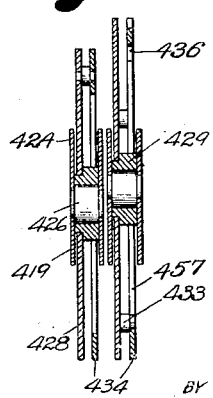
Fig. 110
WITNESSES.
Arthur W. Caps.
Milton Lenoir
INVENTOR
Edwin H. Piersen.
BY
ATTORNEY.

E. H. PIERSEN.
TELEGRAPH TRANSMITTER.
APPLICATION FILED JUNE 1, 1915.

1,359,463.

Patented Nov. 16, 1920.
27 SHEETS—SHEET 22.

WITNESSES
Arthur W. Caps.
Milton Lenoir

INVENTOR
Edwin H. Piersen.
BY
Arthur C. Brown
ATTORNEY

E. H. PIERSEN.
TELEGRAPH TRANSMITTER.
APPLICATION FILED JUNE 1, 1915.

1,359,463. Patented Nov. 16, 1920.
27 SHEETS—SHEET 23.

WITNESSES.
Arthur W. Caps.
Milton Lenoir

INVENTOR
Edwin H. Piersen.
BY
ATTORNEY

E. H. PIERSEN.
TELEGRAPH TRANSMITTER.
APPLICATION FILED JUNE 1, 1915.

1,359,463.

Patented Nov. 16, 1920.
27 SHEETS—SHEET 24.

WITNESSES
Arthur W. Caps.
Milton Lenoir

INVENTOR
Edwin H. Piersen.
BY
Arthur C. Brown
ATTORNEY

E. H. PIERSEN.
TELEGRAPH TRANSMITTER.
APPLICATION FILED JUNE 1, 1915.
1,359,463.
Patented Nov. 16, 1920.
27 SHEETS—SHEET 25.
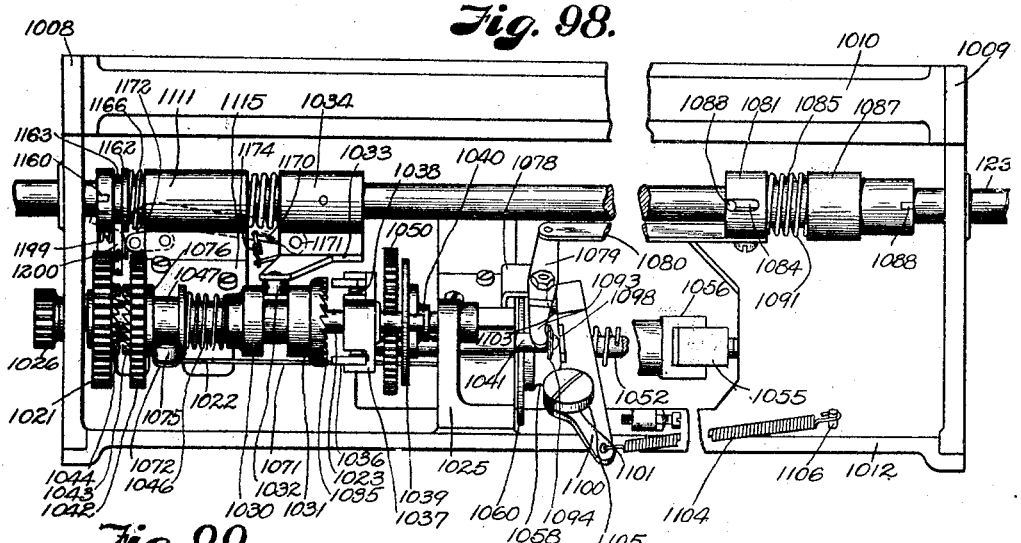
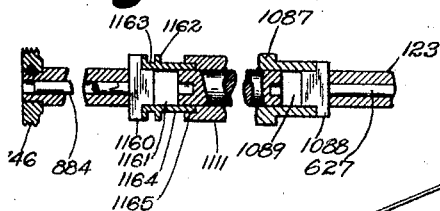
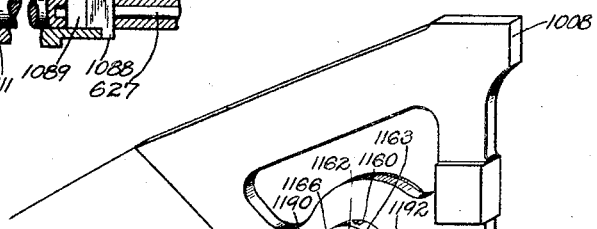
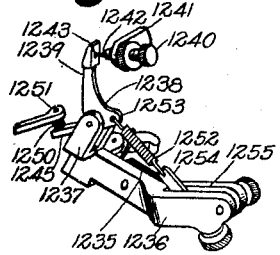
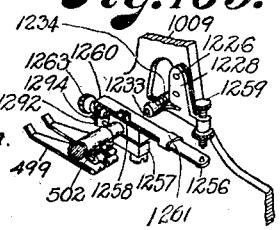
WITNESSES
Arthur W. Capes
Milton Lenoir
INVENTOR
Edwin H. Piersen.
BY
Arthur C. Brown
ATTORNEY E. H. PIERSEN.
TELEGRAPH TRANSMITTER.
APPLICATION FILED JUNE 1, 1915.
1,359,463.
Patented Nov. 16, 1920.
27 SHEETS—SHEET 26.
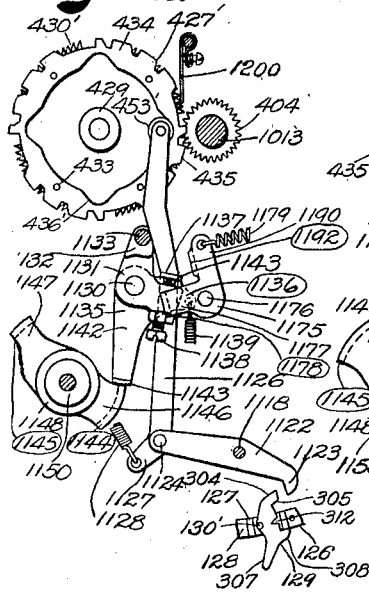
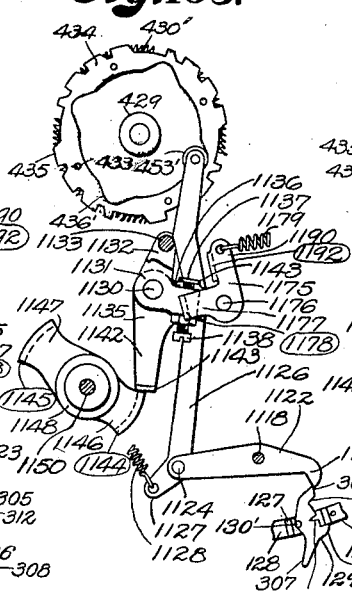
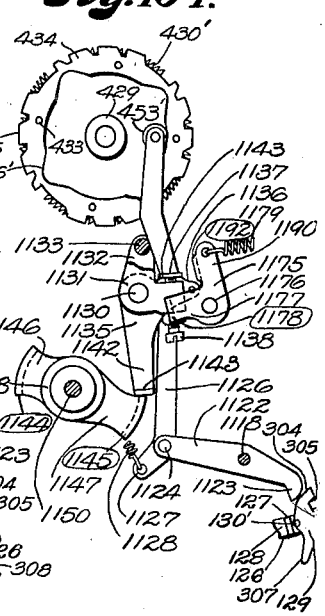
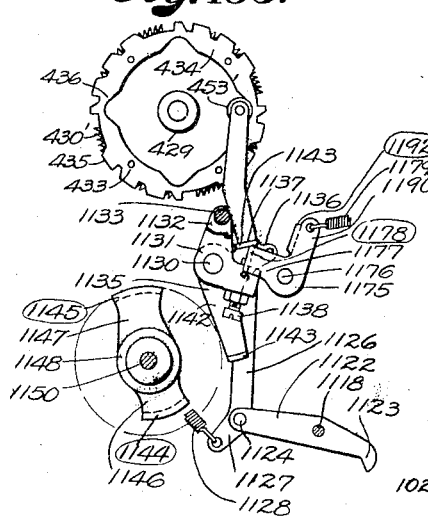
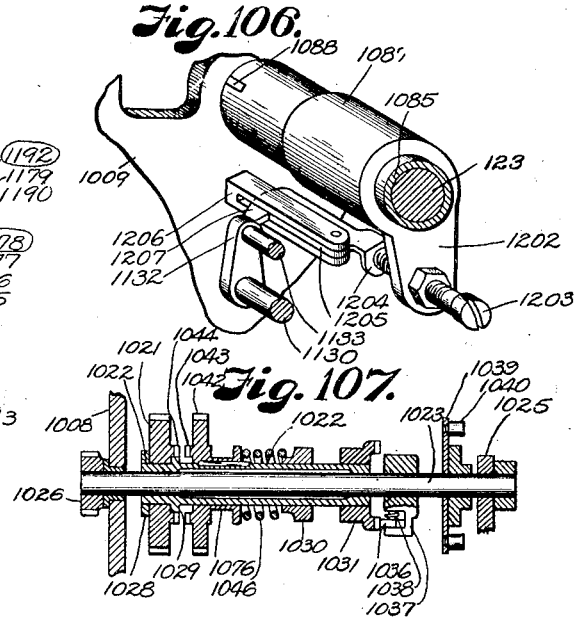
WITNESSES
Arthur W. Caps.
Milton Lenoir
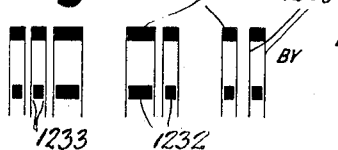
INVENTOR
Edwin H. Piersen.
BY
Arthur C. Brown
ATTORNEY.

E. H. PIERSEN.
TELEGRAPH TRANSMITTER.
APPLICATION FILED JUNE 1, 1915.

1,359,463.

Patented Nov. 16, 1920.
27 SHEETS—SHEET 27.

WITNESSES.
Arthur W. Capr.
Milton Lenoir

INVENTOR.
Edwin H. Piersen.
BY
ATTORNEY.

UNITED STATES PATENT OFFICE.

EDWIN H. PIERSEN, OF TOPEKA, KANSAS, ASSIGNOR TO THE PIERSEN MANUFACTURING COMPANY, OF TOPEKA, KANSAS, A CORPORATION OF KANSAS.

TELEGRAPH-TRANSMITTER.

1,359,463.   Specification of Letters Patent.   Patented Nov. 16, 1920.

Application filed June 1, 1915. Serial No. 31,453.

*To all whom it may concern:*

Be it known that I, EDWIN H. PIERSEN, a citizen of the United States, residing at Topeka, in the county of Shawnee and State of Kansas, have invented certain new and useful Improvements in Telegraph-Transmitters; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to telegraph transmitters, and more particularly to one wherein a keyboard, operating in conjunction with a motor, is adapted for moving character-forming elements into operative relation with a circuit making and breaking device to produce telegraphic impulses, the principal object of the invention being to provide a machine wherein the movements of the key levers are mechanically recorded in a storage element and subsequently used to trip the character forming elements into functional position.

It is also an object of the invention to provide means for differentially operating the storage and character elements whereby the latter are actuated in the proper time and sequence irrespective of the speed or regularity at which the keyboard is operated.

A further object of the invention is to provide means whereby the character forming elements may be moved independently of the storage element to repeat or eliminate a message without further operation of the keyboard.

Still another object of the invention is to provide means whereby one or more characters recorded in the storage element may be erased immediately following the depression of the key lever and the correct character substituted without interrupting or interfering with simultaneous operation of other character forming elements.

In accomplishing these objects I provide a plurality of character forming elements that are revolubly mounted in a storage cylinder and differentially connected with a motor so that the character forming elements and storage cylinder are normally tensioned in opposite directions; a storage cylinder which is released to the tension of the motor by the keyboard through an escapement, and a trip member which is set up simultaneously with each movement of the cylinder to position mechanism for releasing the character forming elements to the action of the motor at measured intervals.

In the further accomplishment of these objects I have provided improved details of structure, the preferred forms of which are illustrated in the accompanying drawings, wherein:—

Figure 1 is a perspective view of a telegraph transmitter containing my invention.

Fig. 2 is a side elevation of the machine, the casing being in vertical section.

Fig. 3 is a similar view of the opposite side of the machine.

Fig. 4 is a plan view of the device, the casing and storage cylinder being removed for better illustration.

Fig. 5 is a detail section of the escapement and parts connecting the same with the key levers, the parts being shown in normal position.

Fig. 6 is a similar view with the escapement about to be released.

Fig. 7 is a perspective view of the escapement, the adjacent gearing and trip setting cam.

Fig. 8 is a detail section of the key lever mechanism and its connection with the escapement and trip setting devices.

Fig. 9 is a detail section of the erasing mechanism.

Fig. 10 is a similar view of the parts in position for imparting the excess movement to the trip setting device.

Fig. 11 is a detail view showing the erase key in its maximum position.

Fig. 12 is a similar view showing the disposition of the plunger as the erase key descends to its normal position.

Fig. 13 is an enlarged perspective view of the escapement gearing and adjacent parts, showing means equivalent to a lock for disengaging the erase mechanism when the character forming mechanism is in home or neutral position.

Fig. 14 is a vertical section of the hand key.

Fig. 15 is a plan view of the same, parts being broken away for better illustration.

Fig. 16 is a detail perspective view of the hand key locking cam.

Fig. 17 is an enlarged detail perspective view of the trip setting mechanism.

Fig. 18 is a detail perspective view of the latch plate for controlling the trip setting mechanism.

Fig. 19 is a plan view of the same, parts being in section.

Fig. 20 is a vertical section on the line 20—20, Fig. 4, showing the stop, start and speed control mechanisms, a portion of the casing and the speed controlling cam and indicator.

Fig. 21 is a detail elevation of the speed control cam as it appears when the character elements are in inoperative position.

Fig. 22 is a similar view showing the position of the cam when the parts are running at a moderately slow speed.

Fig. 23 is a detail perspective view of the speed control indicator.

Figs. 24 to 27 are diagrammatic views showing different positions taken by the trip setting mechanism in setting up and wiping out the trips in the storage cylinder, the path of the slide and slide frame being shown by graphs in Fig. 24.

Fig. 32 is an enlarged vertical section of the compensator, switch and speed reducing gearing on the line 32—32, Fig. 4.

Fig. 33 is a face view of the automatic switch.

Fig. 34 is a perspective view of the same, the operating cam being removed for better illustration.

Fig. 35 is a longitudinal sectional view of the switch booster.

Fig. 36 is a detail perspective of the inner face of the operating cam.

Fig. 37 is a longitudinal section of the brush mounting.

Fig. 38 is a detail elevation of the differential gear train from the compensator to the transmitting element.

Fig. 39 is a plan view of the same.

Fig. 40 is a face view of the compensator on the line 40—40, Fig. 32.

Fig. 41 is a vertical section of the same on the line 41—41, Fig. 32.

Fig. 42 is a vertical section of the speed reducing gearing, on the line 42—42, Fig. 32.

Fig. 43 is a rear elevation of the front plate of the machine, showing the indicator parts.

Fig. 44 is a vertical section on the line 44—44, Fig. 43.

Fig. 45 is an end view of the front plate, showing the indicator setting levers in normal position.

Fig. 46 is a similar view, showing the parts in operative position.

Fig. 47 is an enlarged detail elevation of a portion of the indicator dial, showing an indicator stop and spring in position.

Fig. 48 is an enlarged detail section of the same.

Fig. 49 is an enlarged detail perspective of the indicator stop spring.

Fig. 50 is a detail perspective of an indicator stop.

Fig. 52 is a view of the opposite end of the transmitting element.

Fig. 54 is a side elevation of the opposite side of the transmitting element, a part being removed.

Fig. 55 is a transverse section on the line 55—55, Fig. 53.

Fig. 56 is a detail perspective of the transmitting element escapement.

Fig. 59 is still another view of this mechanism, together with a portion of the differential gearing, showing the position of the parts when the transmitting element is moved laterally to repeat a message.

Fig. 60 is a longitudinal section of the drive shaft and gearing connecting the governor and character members.

Fig. 61 is a detail perspective of the clutch dogs and mounting.

Fig. 62 is a face view of the clutch for holding the differential gearing when the transmitter is moved into repeat position.

Fig. 63 is a transverse section of the transmitting element, on the line 63—63, Fig. 59.

Fig. 64 is a similar view on the line 64—64, Fig. 59.

Fig. 65 is a section on the line 65—65, Fig. 59.

Fig. 66 is a detail view of the transmitting element toggle, showing the parts to be in locked position.

Fig. 67 is a detail perspective view of mechanism for preventing the transmitting element, when in repeat position, from being moved back to normal position except at the beginning of a word.

Fig. 68 is a similar view of the same taken from the opposite side.

Fig. 69 is a detail perspective view of the device for releasing the transmitting element escapement when the parts are in repeat position.

Fig. 70 is a detail perspective view of the circuit making and breaking device.

Fig. 71 is a longitudinal sectional view of the circuit breaker brush, taken on the line 71—71, Fig. 52.

Fig. 72 is an enlarged, vertical, sectional view of the cylinder and transmitting element, parts being broken away and others removed for better illustration.

Figs. 73, 74 and 75 are diagrammatic views of the character lever mechanism, indicating movement of the character member into engagement with its driving gear when the lever engages the trip of the storage cylinder.

Fig. 76 is a face view of the repeat crank.

Fig. 77 is a vertical sectional view of the same.

Fig. 78 is a similar view, showing the parts in operative position.

Fig. 79 is a detail view showing two of the cylinder trips and their springs at each limit of travel.

Fig. 80 is enlarged detail perspective of a portion of the storage cylinder viewed from a direction opposite that shown in Fig. 79, and showing one of the springs in position.

Fig. 81 is a similar view of the opposite side of one of the cylinder rings.

Fig. 82 is a detail view of one of the character members, showing the relation of the character and clash gears in neutral position.

Fig. 83 is a similar view showing the position of the parts after the character member is drawn into the clash gear.

Figs. 84 and 85 are detail views showing the variation in size and placement of the character members.

Fig. 86 is a sectional view of two adjacent character members, showing the offset relation of the centers.

Fig. 87 is a detail perspective view of a device for locking the transmitting element while an unfinished character is running out.

Fig. 88 is a detail view of the case lock.

Fig. 89 is a detail perspective view of the keyboard lock.

Fig. 90 is a detail sectional view of the keyboard safety lock.

Fig. 91 is a detail perspective view of the character key indicator mechanism.

Fig. 98 is a similar view showing the parts in repeat position.

Fig. 99 is a detail longitudinal sectional view through the ends of shaft 123, showing the modified form of mechanism for shifting the transmitting element.

Fig. 100 is a detail perspective view of the modified form of escapement and adjacent parts.

Fig. 101 is a detail perspective of a modified form of circuit breaker.

Figs. 102, 103 and 104 are diagrammatic views showing different positions taken by the parts in throwing a character into functional position and operating the escapement.

Fig. 105 is a similar view showing the escapement parts when the transmitting element is in repeat position.

Fig. 106 is a detail perspective view of the escapement locking device.

Fig. 107 is a longitudinal sectional view of the drive shaft and gearing connecting the governor and character members.

Fig. 108 is a diagrammatic view showing the effect of the circuit breaker adjustment of the signals of the characters.

Fig. 109 is a perspective view of a modified form of circuit breaker.

Fig. 110 is a diagrammatic view of a portion of the character member and brush, showing the method of obtaining half units between characters.

Figure 111:
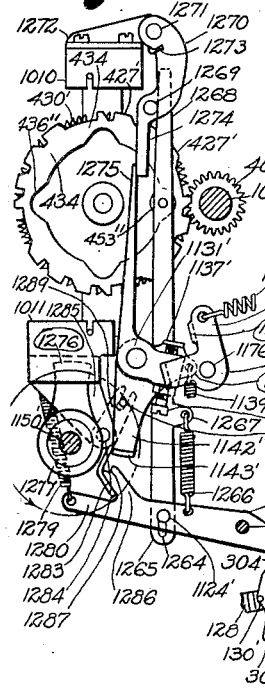
Figure 112:
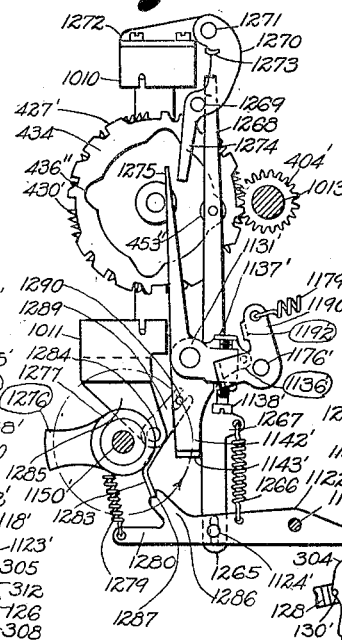
Figure 113:
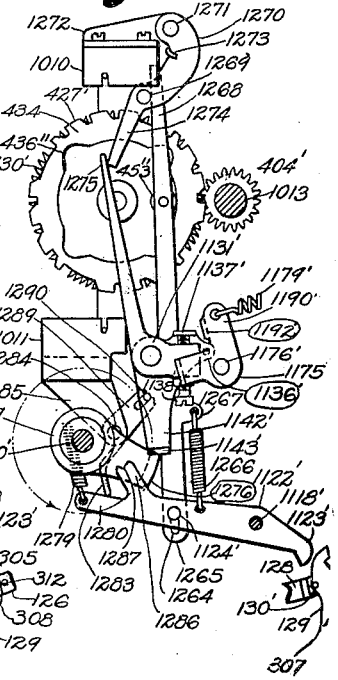

Figs. 111 to 113 inclusive are diagrammatic views of another form of character member control in which the transmitting element escapement makes only one movement between the trips on the storage cylinder.

Figure 114:
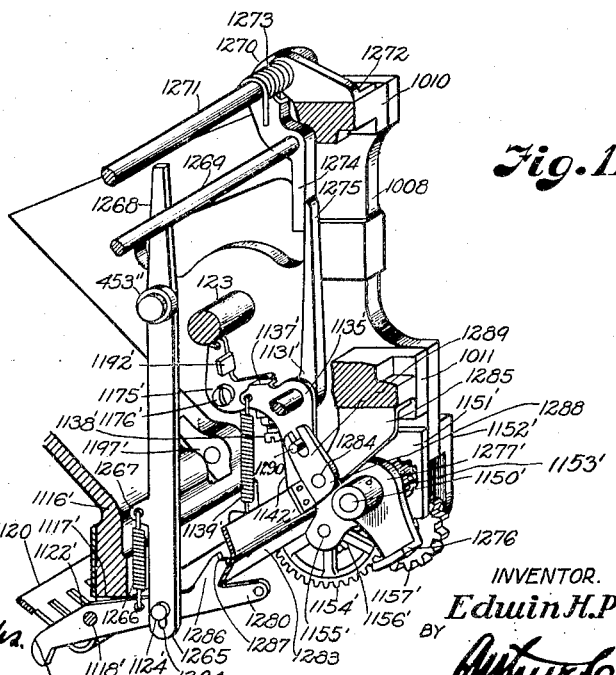

Fig. 114 is a perspective view of this form of escapement and adjacent parts.

Figure 94:
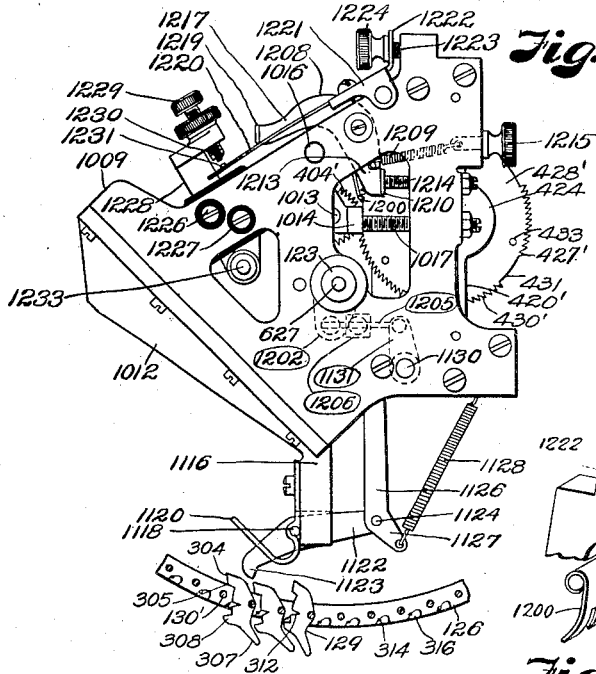
Fig. 94 is an opposite end view of the modified form of transmitting element.
Figure 115:
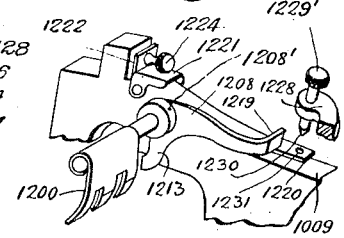
Figure 95:
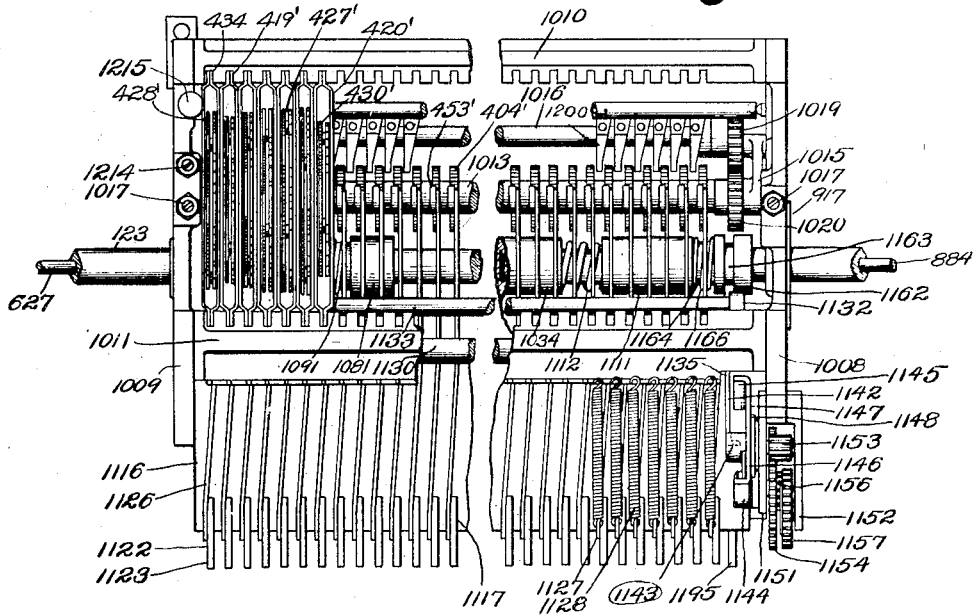
Fig. 95 is a view of the modified form of transmitting element from the side opposite that shown in Fig. 93, parts being broken away for better illustration.
Figure 96:
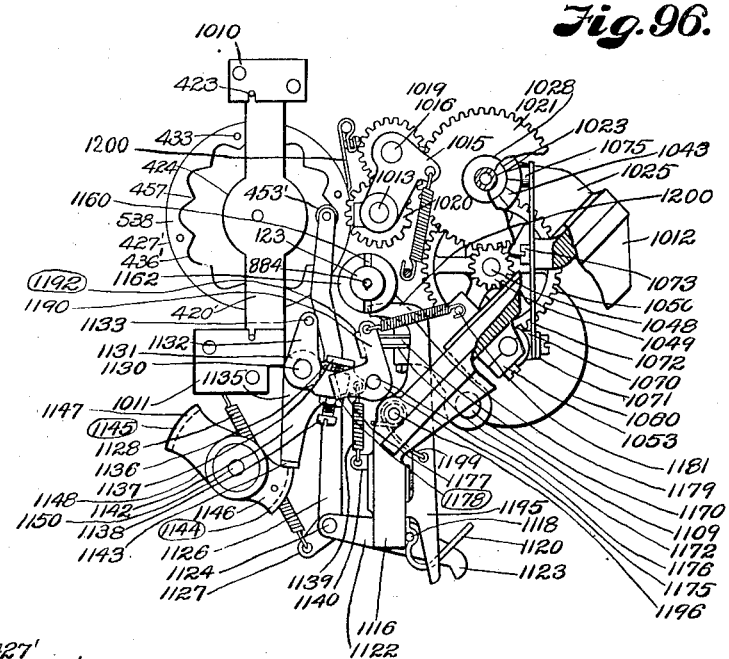
Fig. 96 is an end view of the transmitting element parts shown in Fig. 92, the side frame being removed for better illustration.
Figure 97:
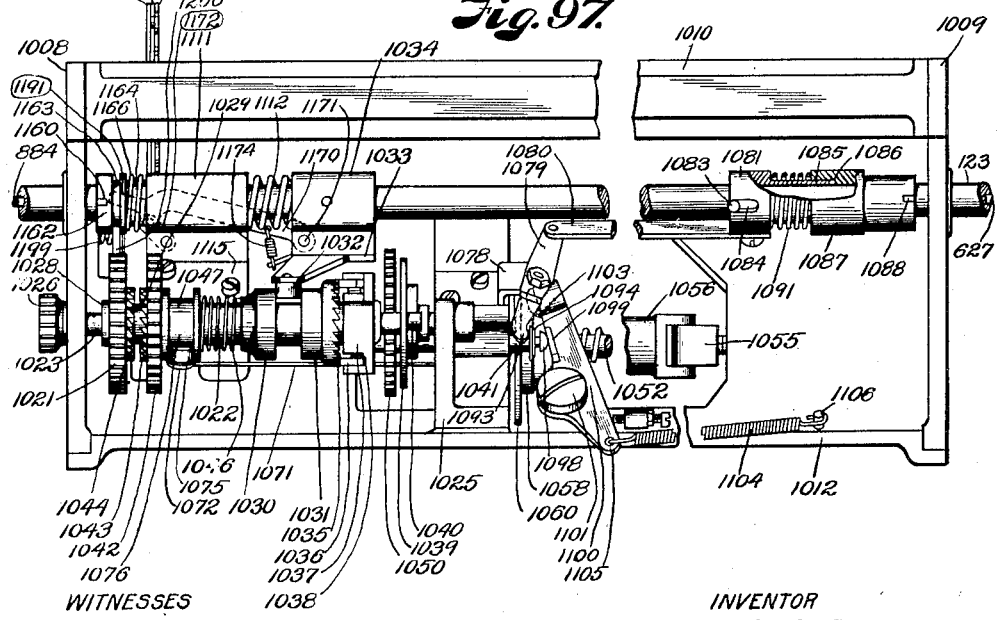
Fig. 97 is another side view of the modified form of transmitting element, showing the parts in neutral position.

Fig. 115 is a detail perspective view of the contact mechanism shown in Fig. 94.

Referring more in detail to the parts:

The operative parts of the machine are mounted in a contained skeleton frame comprising a base 1 and side plates 2—3 that are mounted on the base and are connected by a rear tie rod 4, an intermediate cross frame 5 and a front plate 6; the latter being inclined upwardly and rearwardly from the base 1 and all of the cross members being provided for counteracting internal strains and forming a rigid supporting structure.

At each rear corner of the base 1 is a boss 7 (Fig. 17) that carries a plunger 8 which is normally, yieldingly projected by a spring 9 which is located in a chamber 7' in the boss and bears against the base of the chamber and against a shoulder 8' on the plunger to yieldingly project the latter, and has a knob 10 at its inner end for pulling the plunger back against the tension of the spring to remove the latter from its seat in a suitable socket of a casing 11 that incloses the supporting frame and the parts carried thereby.

The casing 11 is pivotally mounted on the plungers so that it may swing upwardly and backwardly to expose the contained parts, but when in normal position is supported by the plungers at the back and by cushion stops 12 at the front, which latter rest on shelves 13 that project laterally from the base 1. (See Fig. 88, Sheet 2.) The front of the case is locked to the frame by latches 14, each of which is pivotally mounted on a stud 15 on the casing and urged rearwardly by a spring 16 that is carried on the stud and latch to project a hook 17 beneath the shelf 13, each of the latches having a laterally turned finger grip 18 that may be reached from beneath the edge of the casing but is protected by the latter, and each of the latches being also provided with an arm 19 that extends over the shelf to position for engaging a threaded stud 20 which is carried by the shelf and adapted for adjustment by a key 21 so that the stud may be projected to such height that it will be engaged by the latch arm 19 to prevent movement of the latch to releasing position and thereby insure against the machine being opened by a person not in possession of the key.

Arranged longitudinally within the frame are key levers 24; the rear ends of which project through a slotted plate 25 that is mounted on and rises from the base 1, and are pivotally mounted on a rod 26 that is mounted on said plate by a keeper plate 27; the forward ends of the key levers being projected through the front of the casing and provided with upturned ends 28 which are banked within the space inclosed by a rail-like projection 29 in front of the casing and carry buttons 30 bearing designating characters, such as letters, numerals or other insignia. (See Figs. 1 and 8.)

Each of the key levers projects through an individual slot 32 in a plate 33 that is mounted on and extends across the front of the supporting frame and is held yieldingly in an elevated position against a cushion 34 in the channel 35 at the top of plate 33 by a spring 36 which is attached to the key lever and to a finger plate 37 on the intermediate cross - bar 5; the forward ends of the levers having lips 38 that travel in the slots 32 to form an extended bearing that serves to retain the levers in proper alinement and prevent buckling.

Fixed to the base 1 and covering a transverse groove 40 therein is a combined bearing and keeper plate 41 having grooves 42 therein and which supports a rod 43. Pivotally mounted on the rod 43 are hammers 44 which extend upwardly and rearwardly through slots 45 (Figs. 8 and 17) in the back plate 25 and have laterally turned lips 46 on their forward ends that project into slots 47 in the key levers; there being a hammer for each key lever and the rear end of each hammer being yieldingly retained in upper position by a spring 48 which connects the hammer with its key lever. (See Fig. 8.)

The slots 47 in the key levers are of greater width than the thickness of the hammer lips, so that the latter play in the former and the tension of the spring 48 is greater than the friction of the hammer mounting and the resistance of the bar operated by the hammer, so that when a key lever is lowered the hammer is raised by the tension of the spring until the rear arm engages the inclined edge 49 of a plate 50 that is adjustably mounted on upturned lugs 51 on the base 1, where the hammers are detained while the key levers continue to descend to the limit of their stroke, so that when a key lever is depressed the part operable by the hammer is first actuated, and other parts may then be actuated by a continued movement of the key lever after the movement of the hammer is interrupted. The parts actuated by the hammer are those controlling the setting of the trips for selecting the desired characters to be sent from the machine, and will be later described in detail.

Pivotally mounted on center screws 53 (Figs. 2, 3, 4, and 7) in the base frame 1 is a shaft 54 (Figs. 5, 6 and 7), and rigidly secured to said shaft are spaced arms 55, in the outer ends of which is revolubly mounted a roller 56 that extends under all of the levers 24 except those for the stop, start, space and erase keys, so that when any of the character key levers are depressed it engages the roller and rocks the arms 55 and shaft 54.

Loosely mounted on the shaft 54, adjacent one of the arms 55 is an arm 57, and mounted on the shaft 54, between the arms 55 and 57, is a spring 58 which urges the arms 55 to hold the roller 56 toward the key levers and urges the arm 57 in the opposite direction; the arm 57 having a laterally directed stud 59 thereon extending in alinement with the roller 56 for a purpose presently described, and having a laterally directed boss 60 on its opposite face that extends beneath the arm 55 and carries an adjusting screw 61 which bears against the under side of said arm 55, so that when the roller and its arm are lowered the arm 57 is rocked through engagement of the arm 55 with the set screw.

Integral with the arm 57 is an arm 62 that is connected by a link 63 with a cylinder escapement mechanism, and comprises a turn buckle 63′ whereby the length of the link may be adjusted to provide proper co-operation between the key levers and the escapement; the front end of the rod having a laterally turned point hooked into an aperture in the arm 62, and the rear end of the rod having a laterally turned point, hooked into an aperture 64′ in a link 64 that is pivotally mounted on a pin 65 that is revolubly mounted in a yoke 66 on a platform 67 that is supported in a recess 68 in the base 1 by ears 69 that are secured to the under side of the base. (See Fig. 13.) A yoke 70, similar to the yoke 66, is mounted on the rear of the platform in alinement with the first yoke, and pivotally mounted in the yoke 70 is a pin 71 that carries a link 72, which is yieldingly tensioned toward the rear by a spring 72′ and supported by the links 64 and 72 is a frame 73, comprising spaced side members that are pivotally connected with the forward and rear links, so that when the forward link is actuated by the rod 63 the frame is moved forwardly and back.

Pivotally mounted in the frame 73 is a pawl 74 which projects into the frame and is yieldingly urged to operative position by a spring 75 that is mounted on a pin 76 which extends between the frame side plates and engages one of the side plates and the rear of the pawl, the projection of the pawl being limited by a pin 77 on the frame to hold the escapement cam 79 presently described.

Fixed on the rear end of the frame, in alinement with the pawl 74, is a tooth 78 which is adapted for holding the escapement cam after it has been released by the front pawl and is moved through an operative cycle.

The cam 79 which is controlled by the pawl and tooth is fixed on a pinion 80 that is revolubly mounted on a shaft 81 journaled in the standards 82 and 82′ on the platform 67, (see Figs. 4, 5, 6, 7, and 13) and has a gear wheel 83 also revolubly mounted thereon; the gear wheel 83 being driven from a storage motor presently described, and the pinion and gear wheel meshing with a gear wheel 80′ and pinion 83′ respectively, that are fixed on a shaft 85 which is also journaled in the standard 82 and in the standard 82″ on the platform 67.

Fixed on the shaft 85, so that it will turn therewith when the gearing is released by the escapement, is a star wheel 86 having five points 87 provided with rollers 88 which work within and engage the inner surface of a cam 89 that is eccentrically mounted on the standard 82″ (see Figs. 7 and 17) by a stud 90 so that when the star wheel is revolved, the cam is rocked up and down; the ratio being such that the cam 79 will turn a third of a revolution and the star wheel one-fifth of a revolution for each complete movement of the cylinder escapement.

Pivotally connected with the cam 89 by a pivot pin 89″ is a beam 89′ which extends to the front of the machine and is there connected with a lever 91, which is pivotally mounted on a shaft 92 that is in turn pivotally mounted on point bearings 93 (Figs. 2 and 3) in the base frame 1 and has a latch plate 94 pivotally mounted thereon and extending beneath the key levers; the latch plate being urged rearwardly by a spring 95 which is carried by the shaft and engages the plate and lever 91; the rearward movement of the plate under influence of the spring being limited by a set screw 96 which is carried on an ear 97 on the inner edge of the lever 91. The upper edge of the plate 94 has a backturned lip 98 that is adapted for engagement by a tooth 99 on the under edge of each of the key levers, so that when the lever is depressed the inclined edge 100 on the tooth 99 forces the plate forwardly against the tension of its spring until the tooth has passed the lip, when the plate is moved rearwardly to locking position on the tooth by its spring; the locking position of the tooth being assumed before the key lever has reached the lower limit of its travel, and is stopped by a cushion 101 on the crossbar 102 on the base frame 1 and before the escapement is released.

The escapement mechanism is not released until the lever has reached the lower limit of its travel, but it would be possible for the roller 56 to be shot downwardly by a sharp blow from the key lever and thereby prematurely release the escapement unless some means were provided for retarding the roller to insure its travel only with the key lever; the means which I prefer to use for retarding the roller comprising a dash-pot 104 (see Fig. 6) that is mounted in the base 1 and opens downwardly to receive a loosely fitting plunger 105 operable from a lever 106 which is pivotally mounted on a yoke 107 that is suspended from the base and is pivotally connected with a lever 110 that is fixed on the shaft 54, so that when the key lever is lowered the roller is pushed downwardly in constant contact therewith, excess lowering of the roller turns the shaft and lifts the lever 110 and lever 106 to move the plunger into the dash-pot; the plunger and dash-pot being so arranged that they do not necessarily retard the movement of the shaft while insuring against a too free movement thereof.

Storage cylinder.

Referring now to the storage cylinder wherein the trips that position the character members, corresponding with the depressed key levers, are carried:—

120—121 designate spiders (Fig. 72) which are revolubly mounted on a shaft 123 which is journaled in bearings in the rear portions of the frame side plates 2—3 at the rear of the machine.

Fixed on the spiders 120—121 are end rings 124—125, and located between the end rings are rings 126 (Figs. 79, 80 and 81), each of which has radial lugs 127 projecting laterally from one of its side faces, and abutting against the flat face of an adjacent ring to form a rectangular slot 128 within which the individual trip members 129 are located; the end ring 125 being also provided with lugs 127' for forming slots between same and the adjacent ring 126; the rings 126 fill the space between the end rings 124 and 125 to form a solid cylinder except for the slots and are held together by bolts 130 which extend through transverse apertures 131 in the rings, and carry nuts 133 and 132 at their opposite ends, which bear against the outer faces of the rings 124—125 respectively; one end of each of the rods terminating in a recess 134 in the ring 125 and the other end being exposed at the end of the ring 124. The apertures 131 open into the slots 128 so that the rods 130 project through said slots to provide mounting for the trips 129 that are located in said slots, but as the slots are arranged in such close relation about the cylinder that they exceed in number the number of bolts 130 required to hold the cylinder together, I limit the number of bolts and provide separate pivot rods 130', which extend through the ring slots not penetrated by the bolts; one end of each of the rods 130' terminating in a socket 132' in the ring 125 and having a hooked end 135 overlying the outer end of the ring 124.

The ring 125 has external gear teeth 137 which mesh with the escapement gear wheel 83, heretofore described, so that when the cylinder is revolved by mechanism hereinafter described, the rotation of the cylinder is controlled by the escapement, so that it may move but one predetermined space for each depression of a key lever and thereby limit the release to but a single character member in the transmitting element. The cylinder is driven through a gear train comprising a gear wheel 138 that is revolubly mounted on a bushing 139 on the extended hub 140 of the spider 121, and meshes with a gear wheel 141 that is revolubly mounted on a stub shaft 142 which is mounted on and projects inwardly from the frame side plate 3. (See Fig. 2.)

Also revolubly mounted on the stub shaft 142 (see Fig. 38) and fixed to the gear wheel 141 is a pinion 143 which meshes with a gear wheel 144 that is revolubly mounted on a second stub shaft 145 on the side plate 3, and, in turn, meshes with a driving gear wheel 146 of a compensating device 147 which receives power through a speed-reducing gearing 148 from a motor 149, so that when the compensating device is actuated by the motor, the storage cylinder is revolved through the gear train when released by the escapement when the latter is actuated by the key levers.

The transmitting element which will presently be described in detail is slidably mounted on the shaft 123 and works within the cylinder but independently thereof, although driven by a differential train from the gear wheel 138; such train comprising a gear wheel 151 which meshes with gear wheel 138 and is fixed on a shaft 152 which is journaled in a bearing 153 on the spider 120 and in a bearing 154 on an arm 155 which is fixed to the spider by a screw 156.

Also fixed on shaft 152 is a gear wheel 158 which meshes with an idle pinion 159 that is revolubly mounted on a stub shaft 160 and meshes with a gear wheel 161 that is revolubly mounted on the shaft 123 and drives the transmitting element through a connection hereinafter described; it being apparent that as the gear wheel 138 is revolved from the driving train it not only revolves the gear wheel 151, by reason of the tooth connection of the wheels, but that it further pushes against the wheel 151 to revolve the cylinder, and it being further apparent that while the gear wheels 151, 158 and idle gear 159 are carried about on the cylinder spider they also revolve to drive the gear wheel 161 that is mounted on the shaft 123 concentrically with the primary drive wheel 138, so that the transmitting element, which is slidable on the shaft 123, within but independently of the cylinder, may be turned on its axis independently of the movement of the cylinder.

Constant tension.

It has been found from experience that better results can be secured if the storage cylinder and transmitting element are driven by substantial, constant or even force. While an electrical motor alone would be a satisfactory medium for this purpose if the operation of the machine were constant, it is apparent that the operation is intermittent, and, as the parts are controlled by an escapement, the constant tension of such a motor would induce strain on the working parts. It is also apparent that if the parts were driven by a spring motor alone, the tension would be uneven, as when the spring were freshly wound there would be a high tension, and as the spring played out the tension would be proportionately reduced, so that there would be too great a difference between the extremes.

In order to obviate the disadvantages of these types of mechanisms I have provided a combined electrical and spring motor and connected the elements so that the spring is wound by the electrical motor and the electrical motor automatically cut out and in at fixed periods relative to the condition of the spring, so that while the storage cylinder and transmitting element are driven by the spring motor the tension of the motor is maintained within fixed limits by means of the electrical motor. In Figs. 32 to 37 inclusive, Figs. 4 and 42 I have illustrated the preferred type of mechanism of a combined motor of this type, wherein 149 designates an electrical motor which may be conveniently mounted on the cross bar 5 in the supporting frame and has a drive shaft 163.

Fixed on the shaft 163 is a coupling 164, having pins 165 projected from its outer face into pockets 166 in a leather disk 167 in a coupling 168 that is fixed on a transmission shaft 169 that is revolubly mounted in bearings 170 and 171 in the housing 172 of the speed-reducing device 148 which is also mounted on the crossbar 5. The shaft 169 has a worm 173 which works in a worm gear wheel 174 that is fixed on a shaft 176 within a chamber 177 in the housing 172 and revolves in bearings 178 and 179 in a vertical bore 180 within the housing; the lower end of the chamber being closed by a cap 181 at the bottom of the housing and the bearing 179 being closed at its upper end and provided with a ball 182 which bears against the top of the shaft to reduce friction of the shaft within the bearing.

The shaft 176 has a worm 184 meshing with a worm gear wheel 185 within a chamber 187 in said housing, and which is fixed on a shaft 188 that is journaled in a bushing 189 in said housing; the outer end of the chamber 187 being provided with upper and lower apertures 191 and 192 through which lubricant may be supplied to the gearing just described.

The upper aperture 191 is closed by a screw plug 194 which may be removed when the lubricant is supplied.

Fixed on the end of the shaft 188 exterior to the housing 172 is a gear wheel 196 which meshes with a pinion 197 on the spring motor shaft 198, which latter is journaled in a bushing 199 in the housing 172 and in a bushing 200 (see Fig. 2) on the side frame 3.

Revolubly mounted on the shaft 198 is a spring motor drum 201 comprising a chamber 202 that contains the motor spring 203; the outer end of the spring being fixed to the rim of the drum by a pin 204, and the inner end of the spring being fixed to the shaft 198 by a pin 205, so that when the drum is held through its gear connection with the storage cylinder and escapement, and the drum shaft rotated by the motor, the spring is wound on the drum shaft and the spring tensioned. The end of the drum facing the electrical motor is closed by a cap 206 which carries an automatic switch, presently described. The drum also carries an insulation ring 207, of fiber or like material, which comprises a base 208 which lies along the outer edge of the drum rim and is shouldered at 209 to receive the edge flange 210 of the cap 206; screws 211 passing through the cap flange and ring base into the drum rim to hold the parts together.

Fixed to opposite sides of the ring 207, adjacent the periphery thereof, are collector rings 212—212', having attaching rivets 213; the heads 214 of which are seated in sockets 215 in the sides of the insulation ring to hold the collector rings thereto without passing current through the insulation ring to the separate collector rings.

Eccentrically mounted on the face of the cap 206 by a pivot pin 216 is a cam 217 having a cut-out chamber 218 provided with inwardly projecting, spaced teeth 219, and having a slot 220 opposite the pivot pin 216 through which a stud 221 is projected and fastened to the cap 206, so that the cam is guided in its travel and its travel limited to the extent of the slot.

Pivotally mounted on the cap 206 is an arm 223 which projects beyond the cam and into a space 224 between the collector rings that is formed by cutting away a part of the insulation ring 207, and has a knife plate 223' at its end for projection between the plates 225—225' on the respective collector rings to form a switch for closing a circuit therebetween and eventually through the motor in order to energize the latter; the arm 223 being provided with an insulation joint 227 to limit its conductivity to the knife blade portion and prevent short-circuiting through the arm and cap.

Located adjacent the insulation and collector rings is an insulation block 228, having a cut-out portion 229 within which said rings travel, and mounted in the block at opposite sides of the recess are sockets 230—231, each having a carbon or like contact point 232—233 slidably mounted therein and urged to contact with the collector rings 212—212' by springs 234—235; the socket 230 being in conductive relation to the point and provided with a binding post 236, having a wire 237 leading to the motor; the other wire 241 of the motor being connected to a binding post 240 in the insulation block.

The service lines (not shown) for supplying current to the motor are connected with the binding posts 238 and 239 respectively; the binding post 238 being in conductive relation to the post 240, to which a wire 241 from the motor, is attached and the post 239 being in conductive relation to the contact point 223, so that when the switch 223'—225—225' is closed the motor receives its current and the drum shaft is rotated to wind the spring.

In order to automatically control the opening and closing of the switch I provide the cam 217 with pins 243—244, which are spaced on opposite sides of the arm 223, so that when the cam moves in one direction it forces the switch arm between the contact plates, and when it is moved in the other direction it displaces the switch to break the contact; movement of the arm away from the contact plates being limited by a pin 245 on the cap 206.

As the cam moves with the drum and travels slowly, there might be a tendency to arc under some conditions when the circuit is made or broken, and to obviate this I provide the cam with a booster comprising a plunger 247 (Fig. 35) having a collar 248 and a socket ball 249; the latter mounted in a socket 250 in a collar 251 that is adjustably mounted on the hub 252 on the drum cap 206. The plunger 247 works in a cylinder 253, having a collar 254, and a socket ball 255, which latter is mounted in a socket 256 on a plate 257 that is attached to the cam; a spring 258 surrounding the cylinder and plunger and bearing against the collars 248 and 254 to yieldingly project the cam.

With this construction, as the cam moves past its meridian the booster cylinder is forced outwardly by the spring 258 to shoot the cam forwardly and make or break the circuit instantaneously; it being apparent that the booster will act as the cam is moved in a direction to throw the knife blade switch either into or out of contact with the contact plates on the collector rings.

Owing to the spaced position of the pins 243—244 it will be seen that the knife is thrown only after the booster has passed the meridian, so that the circuit is made or broken instantly.

In order to properly adjust the cam to locate the meridian so that the booster will act at the proper point, I provide the collar 251 with a leaf 260 having a slot 261 through which a screw 262 is projected into the drum cap so that the leaf may be tightened onto the face of the drum to hold the collar in position for proper projection of the booster.

With a drum and switch of the construction and arrangement described, when the spring is under proper tension, the knife blade will be free from the collector ring contacts and the cam in the position illustrated in Fig. 33. As the operative parts are moved under tension of the spring, the drum revolves in the direction of the arrow and brings the upper cam tooth into engagement with an arm 265 on a collar 266 which is fixed on the drum shaft 198.

As the arm is stationary at the time of contact, travel of the cam is interrupted while the drum continues to revolve; the switch plate being attached to the drum travels therewith and contacts the pin 244, whereby it is also held, and turns on its pivot so that the collector ring blades are moved thereover to close a circuit through the motor; the booster acting as the cam passes its meridian to shoot the cam backwardly and making a quick contact between the switch members. When the circuit is closed, the motor is energized and drives the shaft 198 and winds the drum spring back to its operative tension.

When the shaft has revolved sufficiently to properly tension the spring, the arm 265 engages the other cam point 219 and rocks the cam back to its original position, movement of the cam carrying the pin 243 into engagement with the switch arm to move the arm out of contact with the collector ring blades to break the circuit through the motor and stop the winding of the shaft.

As it may be desirable to operate the spring under different tensions I provide for adjusting the tension by adjustment of the arm 265; the preferred means consisting of mounting the collar 266 loosely on the drum shaft and providing the collar with a set screw 269, having a point 270 adapted for seating in pockets 271 in the shaft; it being apparent that by locating the arm at a greater distance from the primary cam point the cam must travel a greater distance before being rocked by the arm and increase the tension of the spring, and that thereafter the arm must travel the same distance between the cam points to break the circuit; in this way allowing the spring to work under a higher or lower tension according to the position of the arm 265.

Should the drum spring unwind and throw the knife switch between the blades 225—255' without a circuit being closed through the terminals 238—239, the automatic movement will not take place, but when the cam point 219 is carried about until it engages the arm 265 on the shaft 198 the cam will be stopped and thereby prevent the spring from running down. With the parts in the last named position, when the current comes on, it flows through the motor, so that the latter is energized to wind the spring as before. It will be seen, therefore, that the switch is entirely automatic and that the spring cannot be used beyond the predetermined limit, even if anything should happen to prevent the proper closing of the circuit.

In order to insure a constant driving tension on the operative parts for all positions or conditions of the spring, and thereby obviate the variation which would be present between the limits of the spring movement, I have provided an equalizing device which is interposed between the operative mechanism and the spring motor and which is adapted for receiving power from the motor and transmitting the same to the operative mechanism, so that each movement of the operative parts is imparted under the same tension. This equalizing device comprises a collar 273 which is loosely mounted on an upstanding flange 274 on the drum 201 and on a ring 275 which is fixed on the end of a flange 276 that projects outwardly from the base of the drum case; the collar 273 having a centering boss 277 that projects into the channel formed between the flange and ring to guide the same without interfering with the free movement of the collar, and the collar being further provided with peripheral ratchet teeth 280 which are engaged by a tooth 281 on a plunger 282 that is mounted in a socket 284, so that while the ring is free to move in one direction it is held against movement in the other direction. The ratchet teeth 280 are provided so that when the movement of the cylinder is reversed during the erase action, presently described, the compensator and switch will be free to reverse independent of the speed reducing device.

Located in the collar channel is a band 285 (Fig. 41) which is pivotally mounted on a pin 286 that extends between the flange 274 and ring 275 and is split at the side opposite the pivot and provided with bearing heads 287—288.

Pivotally mounted in the flange and ring are bearing portions 289—290 of a cam 291 which is located between the pivot heads, and is of oval shape, so that when it is in vertical position the band is in normal position and out of contact with the collar 273, but when turned out of vertical position its ends will engage the pivot heads and expand the band to induce contact thereof with the inner face of the collar and lock the parts together.

On the outer end of the cam is a lever 292 (Fig. 40) which projects into the path of one of the pins 293—294 that project inwardly from the inner face of the transmission gear wheel 146 so that the pin may be engaged by the lever to effect operation of the cam. Each of the pins 293—294 carries one end of a spring 295; the opposite end of which is hooked onto a pin 296 on a floating ring 297 that surrounds the shaft 198 within the drum flange 276; the said floating ring being also provided with radial stops 298—299 which are adapted for engagement by adjusting screws 300—301 that are carried in threaded bosses 302—303 on the ring 275 of the drum case, so that when the drum case revolves the adjusting screws engage the stops on the floating ring to tension the springs 295.

With this arrangement, when the gear wheel 146 is held by the escapement and the drum is rotated under tension of the spring motor, the adjusting screws engage the stops on the floating ring and move the ring around; tensioning the springs 295 which are held by the gear wheel 146. When the escapement releases, the springs 295 draw the pins forwardly and move the gear wheel so that the latter is actuated under tension of the springs 295 and not directly from the drum spring. When the escapement again takes hold and holds the gear wheel, pins 293 and 294 are held rigidly in place and the drum moves about until the lever 292 engages the pin 293. This engagement causes the lever to rock on the pivotal mounting on the cam 291 so that the cam is moved out of the vertical position and spreads the split ring so that the latter locks against the drum collar 273 and stops the drum; it being apparent that each escapement movement permits an advance of the operative parts and that such advance is induced by the relatively weak springs 295, and the drum is locked by the split band instead of by the escapement, so that there is no undue tension on either the escapement or the operative mechanism, and that there is no waste of tension in the spring motor. The equalizing and compensating mechanisms just described form the subject matter of my copending applications, serially numbered 43,118 and 43,119.

*Setting element.*

Referring again to the revoluble cylinder that carries the trips for positioning the character members, it will be noted that there are as many individual rings 126 as there are character members in the machine, and that there are as many trips for each character member as there are slots 127 in each cylinder ring, as it may be necessary to repeat a character member a number of times during a complete revolution of the cylinder; it being necessary, therefore, for a trip for each character member to be in position adjacent the setting device when the setting device for that particular character is actuated.

Each of the trips 129 comprises a body member which is pivotally mounted on the rod 130 or 130' within one of the slots 128, and has a toothed head 304 that projects into the interior of the cylinder and has a stop face 305 adapted for engagement with the adjacent radial lug 127 to limit the pivotal movement of the trip; the body also having an arm 307 that projects exteriorly to the cylinder and is engaged by a selecting device when the latter is projected to operative position in order to swing the trip to position for positioning the character member; the arm 307 having a stop boss 308 for engaging the outer edge of the lug 127 to limit movement of the trip under the action of the selecting device.

In order to hold the trip in set or idle position, I provide the same with a spring 310, comprising a single piece of spring wire bent upon itself and formed with spaced sides, and a connecting hook bar 311 (see Fig. 80), which latter is seated in a notch 312 at about midway of the body 129 and at the edge opposite the pivotal mounting of the trip; the ends of the spring being turned laterally and projected into apertures 314 in the adjacent rings.

In order that the trips may seat snugly within their slots, and to provide space within which the side members of the springs may move, I recess the opposite faces of the slots 128 to form curved pockets 316, within which the sides of the spring may freely operate.

With a trip of this construction, and provided with the spring described, the ends of the spring being anchored to the rings, will exert tension on the trip that will tend to hold the trip in idle position—B in Fig. 24. When the positioning device has engaged the outer trip arm and the trip is rocked on its pivot to functional position, the spring is carried beyond the center of its pivotal mounting and urges the trip in the opposite direction; it being apparent that with this construction a single spring will yieldingly hold the trip at either limit of its travel.

*Selecting mechanism.*

The positioning mechanism whereby the trips are moved to functional position and returned to idle position comprises a channel frame 317 (Figs. 17 and 24 to 27 inclusive) having trunnions 318 spaced rearwardly from the rear edge of the frame, and revolubly mounted in bearings 319, which are rigidly secured to torsion rod 319′ and which are pivotally mounted at 320 on point bearings 320 in the side frames 2—3.

Slidably mounted in apertures 321 and 321′ in opposite rails of the channel frame 317 are slides 323 which project forwardly and back from the rails, and are yieldingly projected rearwardly by springs 324 which bear against the front rail of the channel frame and against shoulders 325 on the slides; the rear ends of the slides being adapted for engagement by the hammers 44 that are actuated upon the lowering of the key levers through the springs 48; the slide frame being so mounted that when the slides are advanced by the hammers the rear edges of the hammers are in line with the extended axis of the frame bearings, so that pivotal movement of the frame will not vary the projection of the slides, and the slides being of such length that when advanced by the hammers their forward ends will lie in the path of the trip arms 307, so that movement of either the slide frame or cylinder will induce contact of the slides with the trips to move the trips to functional position.

Fixed on one of the frame trunnions 318 is a lever 326, and mounted on the lever is a yoke 327 in which is pivotally mounted a block 328.

Slidably projected through the block 328 is a rod 329; the lower end of which carries a yoke 330 that is pivotally connected with the ring cam 89 by a pin 331; the outer end of the rod being provided with lock nuts 332 which bear against the end of the block 328 to hold the rod to the block when the cam is moved downwardly, so that the lever 326 is rocked therewith to rock the slide frame.

A spring 332′ surrounds the rod 329 and bears against the yoke 330 and block 328 to form a cushion that will provide play between the parts should a slide or trip arm 307 be of extraordinary length and thereby obviate damage to the machine.

With this arrangement, when a key lever is lowered it first throws the hammer up into engagement with a relative slide 323 and moves the slide forwardly into position for engaging a relative character trip. Directly following the movement of the hammer, continued movement of the key lever releases the escapement so that the cylinder and cam 89 are free to move. When the cam 89 is released it moves downwardly and pulls the rod 329 and rocks the lever 326 so that the slide frame is moved downwardly to induce engagement of the slide with the trip and move the latter to functional position, so a relative character member may be set up in a manner presently described.

As the trips are arranged in close relation to each other, it is necessary to move the slide quickly in order to set up a trip to functional position or reset another to neutral position during the travel of the cylinder. This movement of the slide is effected by pivoting the bearing members 319 on the point bearings 320′ independently of the pivotal movement of the frame on its trunnions, the pivotal movement of the bearing members being effected by the following mechanism:

Fixed on the bearing member 319 by a set screw 334, which projects through a slot 335 therein into the bearing member, is plate 336 which extends downwardly to near the base 1 and has outstanding lips 337—338 on its front and rear edges between which the head 339 on the lever 326 is adapted to travel and against which the said head abuts to limit travel of the lever in either direction and to effect movement of the plate when engaged by the lever head.

Mounted on the frame 341 on the base 1 (see Figs. 17 and 18), beneath the bearing member 319 and at the inner side of the plate 336, is a shaft 342, and pivotally mounted on said shaft are the arms 343 of a latch member 344 which is held yieldingly toward the plate 336 by a spring 345 (Figs. 9, 10, 18 and 19), which is wound on the shaft and engages the frame 341 and latch member 344.

Adjustably attached to the latch member 344 by a screw 346 is a V-block 347 which projects into the path of a conical stop 347' on the rear of the plate 336, so that under normal conditions the V-block will prevent the pivotal movement of the plate 336 but will permit the same to pass when the plate is urged in either direction with sufficient force to overcome the spring 345 and permit the latch member to move backwardly against the tension of the spring.

With the selecting mechanism comprising the plate 336 and associated parts, when the cam 89 has moved downwardly a sufficient distance to induce engagement of the proper slide with its character member trip, and the trip has been rocked, further movement of the cam will cause the head of the lever 326 to engage the rear lip 337 on the plate 336 and move said plate rearwardly, so that its conical stop is forced against the V-block on the latch member 344 and moves the latch member out of the way, so that the plate may pivot on its mounting. The arrangement of the point bearing support for the plate and slide plate bearing is such that when the parts are pivoted on the point bearings the slide frame is moved downwardly, carrying the projected slide with it to set up a trip, this movement being shown graphically in Fig. 24.

When the key lever is released and is moved back to its normal position under tension of its spring, and the cam is lifted, the cylinder will have been actuated to bring the trip members in the next following row into position adjacent the slides. As the cam starts on its return movement, it pushes the lever 326 so that it rocks on its mounting 319 and turns the slide frame, so that any of the slides in the frame may engage any of the said trips to rock them back to initial position, a further movement of the cam causing the lever 326 to engage the forward stop 338 on the plate 336 and rock said plate on the pivot 320, this movement causing the bearing 319 to rock on the pivot 320 and throw the slide frame back to move the slides from the paths of the cylinder trips and thereby prevent interference with the cylinder.

*Transmitting element.*

Referring now to the transmitting element (see Figs. 57 and 72) which comprises the character members, it will first be noted that the entire transmitting element is located within the storage cylinder and comprises means for transmitting characters represented by the several key levers, and which are set up by the cylinder trips when the parts are brought into proper relation; the entire transmitting element being slidably mounted on but adapted to turn with the shaft 123 upon which the cylinder spiders are mounted. The transmitting parts are contained within frame ends 340—341 which are connected by crossbars hereinafter described, and a cross-plate 342, within which are revolubly mounted the character members, a clash gear for actuating the members, and governed driving mechanism that is operated from the differential gear 161.

Referring first to the driving mechanism whereby the clash gear is actuated from the storage cylinder (see Figs. 59 and 60), 348 designates a hollow shaft which is revolubly mounted in a bushing 349 in the frame end 340 and in a bearing 350 on the end of a bracket 346' that is fixed on the cross-frame 342; the inner end of the shaft being closed and the outer end provided with a restricted orifice 348' through which lubricant may be supplied to a wick 349' contained within the shaft so that the lubricant may pass through apertures 350' in the shaft to the bearings of members that are revolubly mounted on the shaft.

Fixed to the outer end of shaft 348 is a pinion 352 which meshes with a gear wheel 161 that forms a member of the train of the differential gear and is revolubly mounted on the shaft 123 on the storage cylinder to revolve the hollow shaft when the governor control, presently described, is freed to permit the shaft to move. It may be stated at this time that the shaft 348 is mounted eccentrically within the storage cylinder so that while it may be rotated through the differential gear when the governor control permits, it offers enough resistance to the differential train that the entire transmitting element may be rotated at times, and that movement of the transmitting element is in a direction opposite that in which the cylinder travels.

Rigidly mounted on the shaft 348 is a clutch member 354, having an elongated hub 355 upon which a clutch collar 356 is revolubly mounted; the collar being provided with spaced flanges 357—358, between which is located a roller 359 that is carried on a bracket 360 on a block 361 on the shaft 123. The clutch 354 is provided with yokes 362, and pivotally mounted in said yokes are pawls 363 having springs 364 bearing against the yokes and against the outer edges of the pawls, whereby the latter are urged to contact with teeth 365 on the clutch collar flange 358, so that the clutch collar is driven with the clutch member when the shaft 348 is revolved and the clutch collar is in position for such engagement. The opposite clutch collar flange 357 has outwardly directed tongues 366 which are adapted for taking into grooves 367 in the hub 368 of a gear wheel 369 that is revolubly mounted on the shaft 348, so that it will turn with the clutch and clutch collar.

Figure 51:
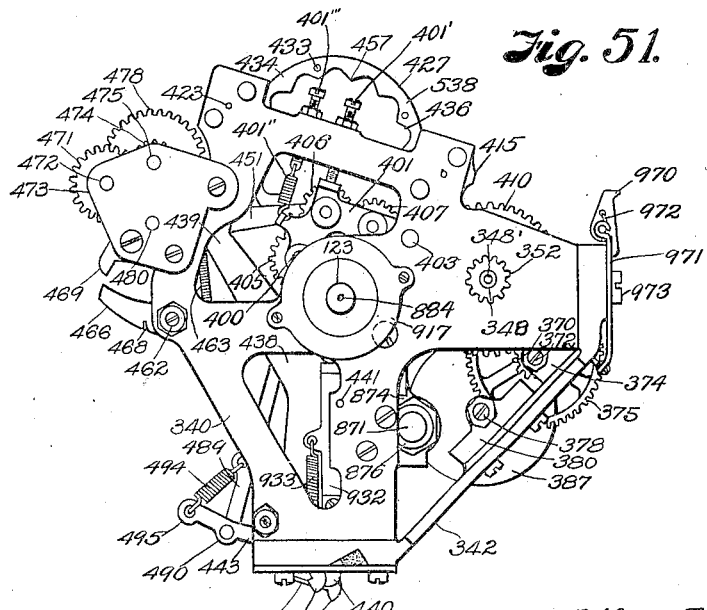
Fig. 51 is an end view of the frame for supporting the character forming devices.

Meshing with the gear wheel 369 is a pinion 370 that is fixed on a shaft 371 which is revolubly mounted in point bearings 372—373 on brackets 374 and 347 respectively (see Figs. 51, 57, 58, and 59), both of which are mounted on the cross-frame 342 (see Figs. 51 and 59).

Fixed on the shaft 371 is a gear wheel 375 which meshes with a pinion 376 on the governor shaft 377 that is revolubly mounted in point bearings 378 and 379 on brackets 380 and 381 respectively that are also carried by the cross-frame 342. (See Fig. 53.)

Fixed on the shaft 377 is a head 383 to which the governor weight arms 384 are pivotally attached, so that the arms may spread under centrifugal force, and pivotally connected with the weights are links 385 which connect respectively with a block 386 (Fig. 53) that is slidably mounted on the shaft 377 and carries a disk 387 which is adapted for engagement at one side by a roller 388 on an arm 389 of a bracket 390, which will presently be described more in detail, and on the opposite side by a brake button 391 on an arm 392 which is pivotally mounted on a stud 394 carried by the bracket 390 on a crossbar 396 which connects the ends 340 and 341 of the transmitting element frame 340 and 341; the block 386 being keyed to the shaft 377 by a pin 398, so that it may slide along the shaft and be held against rotation thereon, and the said block being held extended and the governor weights in close relation by a spring 399 which bears against the block, extends through a central chamber in the governor arms, and bears against the head 383 that is fixed to the governor shaft. The mechanism for controlling the brake will be described more in detail in relation to the start and stop mechanism, but from the foregoing it is apparent that with the parts arranged as described, the shaft 348 is actuated from the differential gearing, and, in turn, actuates the governor shaft, so that rotation of the shaft 348 and the governor shaft are controlled by the governor.

The clash gear, heretofore mentioned as provided for actuating the character members individually, comprises a shaft 400 which is revolubly mounted in the free ends of arms 401—402, that are rigidly mounted at opposite ends of the transmitting element frame on a torsion shaft 403 which is journaled in the transmitting element frame ends 340 and 341, the said arms being held yieldingly against adjusting screws 401'—402' on the spiders by springs 401'''—402''' which are secured to adjustable posts 401''—402''. The clash gear comprises individual gear wheel members 404 that are formed integrally with the shaft 400 and are adapted for engagement by the gear wheels of the individual character members when the latter are moved to functional position.

Fixed on the clash gear shaft is a gear wheel 405 which meshes with an idle gear wheel 406 that is mounted on a torsion shaft arm 401 and which in turn meshes with a second idle gear 407 that is also mounted on said arm, the last named gear wheel in turn meshing with a pinion 408 on the torsion shaft 403, and the pinion being in constant mesh with the gear wheel 410, which is revolubly mounted on a bushing 411 on the shaft 348; the gear wheel 410 being provided with clutch pins 412 whereby the gear wheel and its shaft are driven from a clutch 413 on the shaft 348 which has keyed connection with the gear wheel 369 and which will presently be described more in detail, so that when the machine is in operation and the clutches 412 and 413 in operative relation, the clash gear will be actuated to actuate the character members when the latter are set.

*Character members.*

Referring now to the character members, and the controlling mechanism therefor, 415 and 416 designate crossbars that are supported on the frame ends 340 and 341, and extend transversely across the frame in spaced relation to each other; each of the crossbars being provided with facing ribs 417—418 with the ribs on the same bar spaced to form slots corresponding in number and arrangement to the annular rows of trips in the storage cylinder.

Seated in each of the cross-bars 415—416, and secured to the adjacent rib 417 or 418, is a character wheel frame 419, each comprising side plates 420 having offset ends 421 held together by rivets 422, and fixed to the adjacent ribs 417 and 418 by rods 423 which extend entirely across the transmitting element frame, so that one rod will support all of the character wheel frames at each side of the bank of character wheels.

Each of the side members 420 has an enlarged boss 424 at its center, and extending between and mounted in the bosses in each frame is a stud 426 upon which the character member 427 for that frame is mounted; there being, as before stated, one character member for each lever on the keyboard and a separate character member for a word space. Each of the character members comprises a gear disk 428 having a bushing 429 whereby the disk is revolubly mounted on its stud 426, and having a plurality of sets of gear teeth 430 arranged in equally spaced relation on its periphery and adapted for meshing with the clash gear to rotate the character member; the sets of gear teeth on the several character member disks varying in number and extent, but all having equal spaces 431 between the sets.

Rigidly secured to and spaced from one face of disk 428 by studs 433 (Fig. 86) is a character ring 434, having teeth 435 on its periphery that vary in extent to correspond to the dots and dashes of a telegraphic code, and having pockets 436 in its inner edge corresponding in number and arranged in a definite relation to each set of character teeth.

In the present machine, a circuit is opened and closed by a circuit closer that is actuated by the dot and dash teeth on the character members, a single circuit closer being used, which is adapted for actuation by all of the character members. The point of contact between the character member teeth and the circuit closer must necessarily, therefore, be in a direct, transverse line so that the character members must either be of the same diameter or so arranged as to bring the contact point into such a line; this arrangement being also essential in view of the fact that the clash gear extends in a direct, transverse line and is engaged by the disk teeth for each of the character members. It has been found, however, that disks of the same diameter could not be divided accurately into sets of character teeth owing to the fact that some sets of teeth are longer than others, and also for the reason that the time element between dots and dashes in the sets of character teeth is extremely short, and must necessarily be accurate to leave even spaces between the end teeth of adjacent sets. I, therefore, have constructed the character member disks and rings of varying diameters (Fig. 53); the diameter of the disk being kept as near to a standard as possible, but in each case being such that the dots and dashes and the spaces between the character sets are the same length in every instance; the character sets being repeated on the character rings as many times as they can occur on the periphery of the ring, and the sets of gear teeth on the disks being arranged to correspond with the sets of character teeth.

To better explain the arrangement, it may be stated that I have taken the telegraphic dot tooth as a unit basis, so that a dot may equal one unit, a dash two units, and the space between the teeth one-half of a unit. On this basis, the character A, which is represented by a dot and dash, is three and one-half units in length, and it has been found that eight sets of A characters can be placed on the periphery of a disk of the desired diameter and leave a space of the predetermined length between each set.

Figure 53:
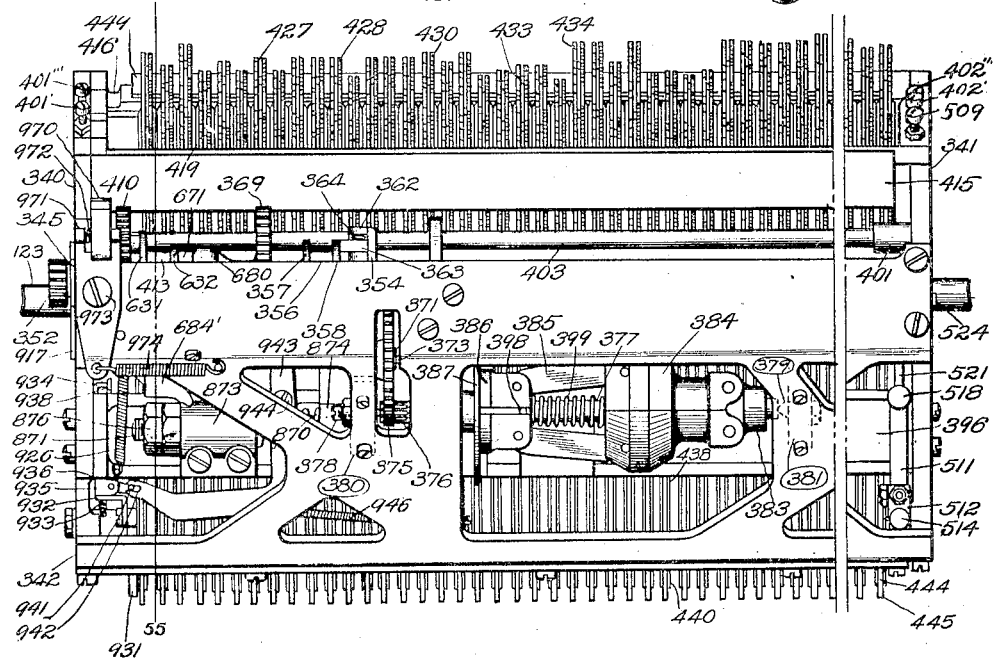
Fig. 53 is a side elevation of one side of the transmitting element, a part being removed.

As the character B consisting of a dash and three dots, or six and one-half units, requires more space on the ring but five sets are arranged on the B ring. The five character sets equally spaced on the ring could not be spaced on the periphery of the same diameter as the A ring without making a slight difference in the spacing between the sets. Instead of using a ring of the same diameter with unequal spacing between the sets, I have, therefore, reduced the diameter of the B ring, so that the character sets could be equally spaced thereon. This arrangement is carried out throughout the entire number of character members, the diameter of the disks and rings varying as indicated in Fig. 53, and the number of sets of character teeth on the several rings varying from thirteen characters on the E ring to three on the dollar mark ring, necessitating quite a variation in the diameter of the disks and rings, but resulting in an even arrangement and spacing of the character sets and permitting alinement of the character members relative to the clash gear and circuit breaker, with the general result that the sending of the telegraphic characters is constant and regular so that a receiving operator has no difficulty in reading a message.

In grouping the gear teeth on the disk 428 and forming the character signals in the character ring 434 the disk must be of the same diameter as the character ring, the teeth must bear a certain relation to the character ring in position, grouping and number, the number of characters on a wheel must be an exact multiple of the number of teeth in the gear, and the notches on the inner face of the character ring must bear a fixed relation to the characters and gear both in position and number, and particularly the space between signals, which is one-half unit, must be formed so that the arcuatile movement of the brush will produce an impulse at the circuit breaker equal to one-half a unit.

In the case of the Morse E, I desire to add a space equivalent to one unit on each side of the dot so that when this short character is transmitted to line, it will not be lost to the ear but will be separated slightly or stand out in relief.

The signals or dot and dash teeth on the character ring are formed with an inclined side and a straight side so that the brush will pass easily up the inclined side when the character wheel is revolved and break the current sharply at the end of the signal.

The gear teeth 430 in the disk 428 are formed so as to have a straight face and an inclined face which is placed oppositely to the inclined face of the character signals and which does not present such an abrupt surface to the clash gear as the character wheel is thrown into mesh.

The spaced characters such as "O," "R," etc., are formed so that the space equals one and one-half units, otherwise the wheels are formed the same as the others.

The mechanism for setting the characters into operation by bringing their gear disk into mesh with the clash gear comprises an individual trip frame 438 for each character member, consisting of spaced side plates and having upper and lower arms 439—440 extending at an angle to each other, and the frame being pivoted on a rod 441 that is carried in the crossbar 396 that is mounted on and extends between the ends 340 and 341 of the transmitting element frame 440 and 341.

Pivotally mounted in the lower portion of each of the trip frames is a three-arm lever 443 (Figs. 73-75) one arm 444 of which has a hook end 445 that is adapted for engagement by the head 304 of a trip dog 129 when the trip dog has been set following the actuation of a key lever for the character represented by the particular character member for that trip frame, and when movement of the transmitting element, under rotative tension from the differential gear wheel 161, brings the trip hook into position for engaging the trip dog.

When the trip dog is engaged as described, it turns the frame 438 on its pivotal mounting and against the tension of a spring 447 which is connected with the upper arm of the trip frame and with a tooth 448 on a plate 449 that extends across the transmitting element frame and is fixed on the crossbar 416.

Pivotally mounted in the upper end of the trip frame is a second three-arm lever 450, one arm 451 of which extends along the relative character member and has a roller 453 mounted on the side face of its character member, and normally located in one of the pockets 436 in the character ring, the location of the roller in the pocket holding the character ring in set position so that the gear teeth on the character member disk are out of mesh with the clash gear, when the trip frame is in normal position. When the trip frame is rocked, however, the lever 450 is drawn back and pulls the character member around until the gear teeth mesh with the clash gear, so that the character member is revolved as long as the clash gear meshes with the gear teeth in that particular set, and which is sufficient to carry the character member around for one phase of operation.

*Transmitting element escapement.*

The transmitting element, as before stated, rotates within the storage cylinder under normal conditions because of the rotative tension from the differential gearing, but in order to obviate confusion in the sending of the characters it is essential that the rotation of the entire transmitting element be interrupted while each individual character member is being revolved through the sending period. This interruption is accomplished through an escapement operable by the lever 450; a second arm 454 of which overlies an escapement plate 456 so that when the character member is revolved and the roller 452 moved out of its pocket onto the inner rim 457 of the character ring, the lever is rocked on its pivot against tension of a spring 458 which yieldingly urges the roller outwardly against the inner edge of the character ring and toward its pocket engagement, and throws the arm 454 toward the escapement plate, so that a roller 459 on the lever arm 454 engages and rocks the plate. The plate 456 is fixed on a shaft 461 which is pivotally mounted in point bearings 462 on the ends of the transmitting element, so that the plate may turn under force of the lever and against a spring 463 (Fig. 87) which normally, yieldingly retains the plate in the direction of the lever.

The plate 456 has an extension 464 (Figs. 69, 51–59) at the end opposite the spring 463 which is engaged by an adjusting screw 465 on an extension 466 of a pawl 467 that is pivotally mounted on the shaft 461; the pawl and extension being urged to induce contact of the screw with the plate extension, by a spring 468 on said shaft and the pawl 467 being adapted for engagement by the pawl 469, which forms part of the locking member of the escapement. This locking member comprises a train of gear wheels; the first of which—471—meshes with the internal gear 470 of the storage cylinder and is revolubly mounted on a stud 472 which projects laterally from the plate 473 that is attached to the transmitting element frame end 340; the gear wheel 471 in turn meshing with a pinion 474 on a shaft 475 that is revolubly mounted in the plate 473 and in a mating plate 476 on the other face of the frame end 340.

Also fixed on the shaft 475 is a gear wheel 478 which meshes with a pinion 479 on a stub shaft 480 which is likewise carried on the plates 473 and 476.

Fixed on the shaft 480 (see Fig. 56) is a mounting 481 having an arm 482 to which the pawl 469 is pivotally connected, and having a forked arm 484 within which said pawl is guided; the pawl being yieldingly retained in its seat in the forked arm by a spring 485 which connects the pawl with a third arm 486 on the mounting; the said pawl having a tooth 487 which is adapted for engaging the pawl 467 when the escapement plate is moved by a lever 450 by one of the trip frames 438; it being apparent that under normal conditions meshing of the escapement gear 471 with the internal gear on the storage cylinder will cause the pawl 469 to revolve freely while the transmitting element frame floats within the storage cylinder, but that when the escapement pawl 467 is moved into the path of the pawl 469 engagement of the pawls will stop the free movement of the pawl 469 and lock the transmitting element frame to the storage cylinder, thereby holding the transmitting element when one of the trips has set its character member into operative relation with the clash gear, and holding the parts in this locked relation until engagement of the character member with the clash gear has ceased, or until the character represented by that particular character member has been transmitted through the circuit breaking mechanism hereinafter described.

In order to release the transmitting element so that it may continue its floating travel and induce the setting up of a succeeding character member, I provide the trip frame with what may be termed a floating link 489 (Figs. 73–75); the lower end of which is pivotally mounted on an arm 490 of the three-arm lever 443 while its upper end has a head 491 hooked over a roller 492 on the upper arm 439 of the trip frame 438 in position for engagement by an arm 493 of the three-arm lever 450; the position of the floating link on the roller being yieldingly maintained by the spring 494 which connects the link with an extension 495 on the arm 490 of the three-arm lever 443; the upward movement of the arm 490 being limited by engagement of a third arm 496 on the lever 443 with a stop 497 on the frame.

With this arrangement, when the trip dog engages the hook 445, the trip frame is moved on its pivotal mounting to advance the character member to engagement with the clash gear and the hook will hold the transmitting element until the clash gear moves the character member and lifts the lever arm 451 out of its pocket and rocks the head of the floating link off of its roller, so that the trip dog may rock the hook lever to enable the dog to pass; the escapement being thrown in prior to the release of the trip dog to lock the transmitting element to the storage cylinder; the escapement being locked as long as the plate 456 is retained depressed by its lever, which is as long as the roller 453 is held in elevated position on the edge of the character ring. As soon as the character ring has been advanced through a complete phase so a complete character has been sent therefrom, the clash gear leaves its contact with that set of teeth and the roller drops into a succeeding pocket 436, thereby lifting the rear arm 454 of said lever and permitting the escapement plate to rise and break the contact between the escapement pawls 487 and 467, so that the transmitting element is released and the gear train resumes its idle travel until the escapement is locked by the operation of another trip frame by a succeeding trip dog; the floating link being returned, however, to its set position by the spring 494 as soon as the trip dog has left its contact with the trip hook on the lever 443.

*Circuit maker and breaker.*

Referring now to the circuit maker and breaker whereby dot and dash impulses are sent from the transmitting element to make up the telegraphic messages, 496 (Figs. 52 and 70) designates a shaft which is pivotally mounted on point bearings 496' in the transmitting element frame ends and extends across the transmitting element adjacent the row of character members, and fixed on said shaft is a brush 498 comprising a strip of conductive metal slit transversely to provide the individual contact fingers 499 that are adapted for individual contact with the teeth on the character members when the latter are moved to operative position and rotated by the clash gear. The specific construction of the brush preferably comprises the sheet metal strip having the finger slits at one edge and corresponding slits at the opposite edge, with the fingers bent back beneath the shaft and folded thereon to form bosses 500, and the fingers at the opposite edge of the strip being bent upon themselves to form lugs 501; set screws 502 being carried on the lugs and in engagement with the bosses to provide individual adjustment of the contact fingers that will insure proper coöperation thereof with the teeth of the individual character members.

Adjustably mounted on one end of the shaft 496 by a clamp 504 and screw 505 is an arm 506, having a foot 507' thereon (Fig.

52) that carries a spring 503 that is connected with an adjusting screw 507 on a bracket 508 on the transmitting element frame end 341, so that the foot is yieldingly tensioned against an adjusting screw 509 that is carried on the transmitting element frame, such yielding tension holding a hook 510 on the arm against a contact spring 511, so that the spring is tensioned to retain it out of contacting position. The spring 511 is fixed to a block 512 which is pivotally mounted on a stud 513 on the frame end 341, and provided with an adjusting screw 514 that is threaded into a boss 515 on the frame end to secure the initial tension of the spring toward its coöperating contact member and partially neutralize the torsion of the spring 503 to effect a light action of the brush with the character wheels and positive electrical contact. The spring 511 is fixed when held by the brush arm and has a point 517 which is arranged to engage a contact screw 518 when the spring is released by the brush arm to complete a sending circuit; it being apparent that the brush is held yieldingly toward the character members by its spring 503, but that when the brush fingers are engaged by the character teeth, the brush is rocked to move the brush arm away from the contact spring, so that the latter may move under its own tension to engage its contact screw, and that the periods of contact are relative to the length of the character teeth on the character members. The contact screw 518 is mounted in a boss 520 on a bracket 521 which is attached to the frame end 340 and insulated therefrom by a fiber or like sheet 522, and has a barrel 523 containing a plunger 524 (Fig. 71) that is urged outwardly by a spring 525 contained within the barrel and bearing against the bottom thereof and against a shoulder 526 on the plunger, so that the plunger is yieldingly held in wiping engagement with a collector ring 527 (Fig. 72) on the spider 120 of the storage cylinder.

The collector ring 527 is fixed to the spider 120 by rivets 528 which extend through insulated collars 529 in the spider and also serve to hold an outer collector ring 530 to the outer face of the spider.

Contacting with the outer ring 530 is a brush 531 (Fig. 4) preferably composed of a strip of spring brass which is fixed on an insulated block 532 on the side frame 3 and provided with a reinforced arm 533 that carries a binding post 534 to which one of the telegraph line wires 535 is attached; the other line wire 536 being attached to a binding post 537 that is grounded on the machine frame so that when the circuit maker and breaker is actuated by the character members and the contacts are made as described, a circuit is closed through the circuit maker and breaker, through the collector rings on the transmitting element frame end, to the brush on the main frame, and through the grounded connection of the parts on the frame, so that the impulses corresponding to the dot and dash arrangement on the character members are sent over the telegraph line.

*Word space.*

In order to distinguish between the termination of one word and the beginning of another, it is necessary to provide a space, which, according to code, is four units in length. This spacing is accomplished by means of a word space member 538 (Figs. 51 and 55) which corresponds in construction to the character members, except that it has no character teeth for actuating the circuit maker and breaker brush. It is, however, mounted on the stud 426 in the same manner as are the character members, and is actuated by one of the end rows of trips 129 that is carried in the storage cylinder. It has a special space key 539 comprising side bars 540 and 541 which are located at the sides of the bank of key levers and are pivotally mounted at the rear of the machine on the rod 26 that carries the character key levers; the front ends of the bars being joined by a finger bar 543 so that the space key corresponds with a like member on an ordinary typewriter keyboard.

In order to prevent the side bars from buckling under twisting strain I provide the same with links 544 (Fig. 5) which are pivotally connected with the bars and with levers 545 which are mounted on a torsion shaft 546 that is carried by point bearings 547 in the base frame 1, one of the bars being provided with a hook 99 for engaging the latch plate 94 in the same manner as the key levers, but being arranged over the stud 59 on the lever 57 instead of over the roller 56, so that the roller 56 is not lowered from the bank of key levers when the space key is operated to set up its trip 129; the space key releasing the escapement directly from the lever 57.

It may be noted at this time that the spring 58 operates against the spring 72′ on the escapement and substantially balances the same, so that the space key is tensioned principally by its spring 36, and that the spring 58 holds the roller 56 against the bank of key levers while the lever 57 is being operated, so that the spring 58 may be said to be a self-contained element that does not add tension that will resist touch on the key levers.

*Erase.*

I have also provided means for correcting the error should an operator depress a wrong key, by providing mechanism for returning the erroneously set trip to inoperative position, or, as I will hereinafter describe it, erasing the trip.

This mechanism (Figs. 2 and 8 to 12 inclusive) comprises an erase key lever 549 which is pivotally mounted on a shaft 550 (Fig. 9) that is mounted in the bosses 551 on the base 1; the end of the key lever being provided with a finger piece 552, bearing the title to the key, and the forward part of the lever being slidably mounted in a slot 553 in the front plate 33 and held yieldingly in its upper position by a coil spring 554 which is connected with the lever and with a post 555 (see Fig. 2) on the side frame 2.

Fixed to the lever 549 by a yoke 556 (see Fig. 4) is an extension 557 which extends rearwardly and has a rear end 558 normally bearing against a plate 559 on the subframe 69 and yieldingly held to contact with the plate by the spring 554.

Pivotally mounted in the bifurcated lever end 558 is a pawl 562, having a tooth 563 normally spaced from the ratchet wheel 564 that is rigidly attached to the gear wheel 83 on the shaft 81 by a leg 565 which bears against the plate 559; the pawl being loosely mounted on its pin 566, so that when unrestrained by its supporting leg, it will fall toward and engage the ratchet wheel.

With the parts so arranged, when the erase key is depressed, the lever extension 557 is lifted from the plate 559 and the pawl falls into engagement with the ratchet wheel; the gravitational movement of the pawl being preferably assisted by a spring 567 that urges the pawl toward the ratchet, so that the ratchet is revolved, and being rigidly attached to the gear 83, revolves the said gear and the shaft 85 through its gear connection in a direction opposite to that taken by the parts when the escapement is released by the character key levers; this backward movement carrying the escapement cam 79 against the inclined face of the pawl 74 which moves against the tension of its spring to allow the cam to pass; it being apparent that after the cam has passed and the cam and cylinder parts are released, the pawl will hold the cam to prevent retrograde action of the gearing and cylinder.

The back movement of the escapement gearing carries the star wheel 86 about in a direction reverse of that imparted by the differential gearing when the escapement is released by depression of one of the key levers, but this reverse movement causes the star wheel to act on the cam to move the cam downwardly in the same direction as for the ordinary key lever escapement movement; i. e., the cam 89 moves from its uppermost to lowermost position, rocking the arm 326 on its pivot 318 and rotating the slide frame 317 to throw the ends of the slides downwardly, pivotal movement of the slide frame continuing until the head of the arm 326 engages the ear 337 on the plate 336 when the movement on the slide frame and pivot is stopped, and the parts swing on the pivot 320; it being noted that actuation of the erase key has no effect on the slide hammers 44, so that none of the slides are projected from their frame, although they all move en masse.

As the cylinder has been cleared by the return movement of the slides during the next previous operation of the slide frame following its depression by the actuation of a character key lever of the trips in the horizontal row, indicated by letter B, (Figs. 28-31 inclusive) all of the trips in that row are in initial or inoperative position so that the slides when moved downwardly en masse will miss all of the trips in that row. After the slide frame has moved down to the limit of its travel, the backward movement of the cylinder carries the erroneously set trip above the slides, and the slide frame is then drawn forwardly beneath the projecting trip arm, so that when the slide frame is shot upwardly it will engage the trip arm and rock the trip back to its initial position. In order to throw the slide frame forwardly it is necessary to rock the bearing 319 on the pivot 320 farther than is permitted by the ordinary escapement movement. This action is made possible by providing an additional or extension shoulder 569 (Fig. 18) on the latch 344, and providing mechanism for moving the latch so that the projection 570 on the plate 336, which would ordinarily engage the shoulder 571 on the latch plate to limit the ordinary travel of the plate is limited by the shoulder 569 after the additional travel.

The mechanism for actuating the latch and the bearing plate comprises a barrel 573 (Fig. 9) which is pivotally mounted on a stud 574 on the extension 557 of the erase key lever, and yieldingly tensioned against a stop 575 on said extension by a coil spring 576 which connects a hook arm 577 on the barrel with a stud 578 on the lever extension.

Slidably mounted in the barrel is a plunger 580 having a shoulder 581 (Figs. 11 and 12) against which a spring 582 that is contained within the barrel yieldingly urges the plunger forwardly against an inclined plate 583 on the subframe 69.

Figure 28:
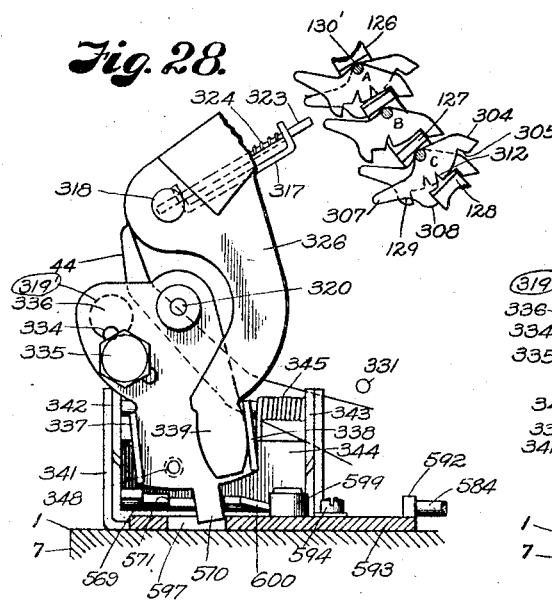
Figs. 28 to 31 are diagrammatic views showing the different positions taken by the trip setting mechanism in erasing a trip, the path of the slide member being shown graphically in Fig. 28.
Figure 29:
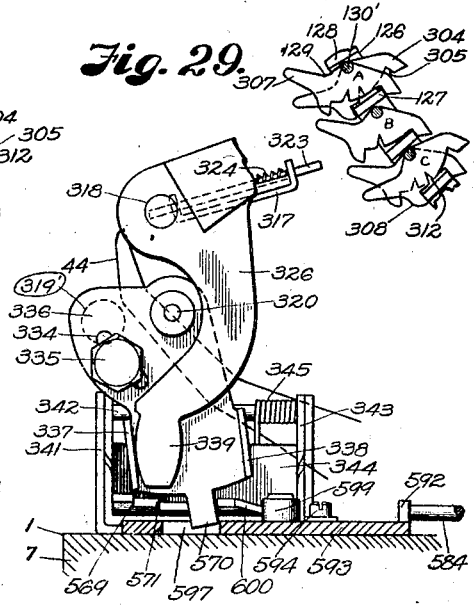
Figure 30:
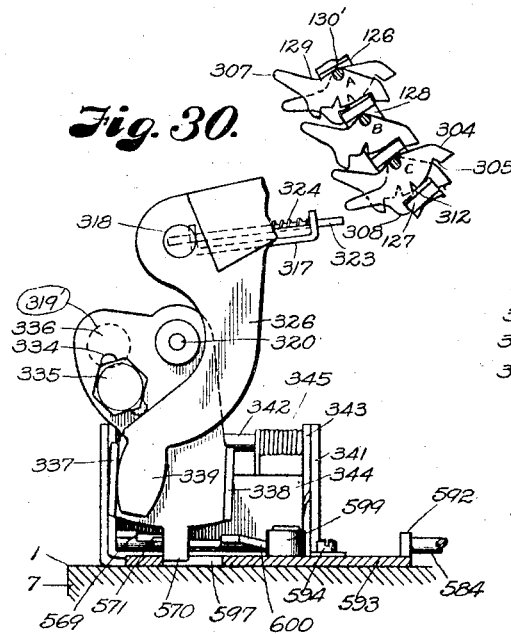
Figure 31:
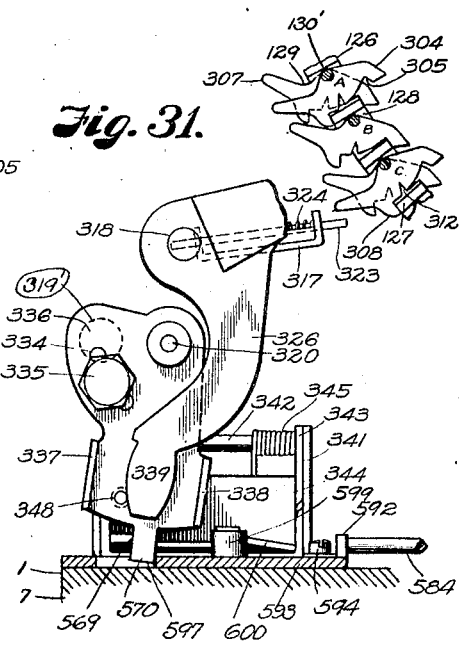

As the erase key is depressed the end of the plunger rides up the inclined plate and is moved back against the tension of its spring until the end of the plunger passes over the end of the plate and is shot rearwardly against the end of a rod 584 that is slidably mounted in the standard 82' of the frame 69 and in a boss 585 on the frame; the rod being held against rotary movement in its bearing by a screw 588 that is carried on the boss and overlies a flat face 589 on the rod, so that a flat face 590 at the forward end of the rod may face upwardly at all times. Rearward movement of the rod carries the same against the upturned foot 592 of a slide 593 (Fig. 17) which is mounted on the base 1 and held thereto by a stud 594 that projects through a slot 595 in the slide into the base, so that the slide may move longitudinally under the force of the pin; the slide being guided at its rear end by the extension 570 on the plate 336 which extends into a slot 597 in the slide. The slide 593 carries a horizontal roller 599 which is adapted for engagement with the inclined face 600 at the rear of the latch bar plate 344 so that as the slide moves rearwardly the front edge of the slot 597 engages the extension 570 to move the plate 336 back on its pivot, and as the extension approaches the latch shoulder 571 the roller 594 engages the inclined face 600 and rocks the latch plate so that the extension may pass beyond the shoulder 571; the latch being rocked only far enough to permit the extension to miss the first shoulder, but not sufficiently to carry the second shoulder 569 out of the path of the extension, so that the movement of the plate is limited by contact of the extension with the second latch plate shoulder. This movement of the plate 336 in excess of the ordinary movement under the action of the character key levers is sufficient to carry the bearing 319 about on the pivot 320 sufficiently to advance the slide frame 317 in substantially a horizontal path toward the storage cylinder and move the projecting ends of the slides into such position that the erroneously set trip 129 lies above its relative slide; the excess movement also rocking the rod 329 on its pivotal connection 331 with the escapement cam 89 to permit such movement. The return movement of the cam, i. e., the movement from its lowermost to its uppermost position throws the slide frame up more rapidly than the cylinder is traveling; the upward movement of the cam first rotating the slide frame on the pivot 318, which is a short radius, and during this initial movement the end of the proper slide engages the projecting end of the trip and rocks the trip back to initial position or erases the trip; the short radius movement continuing only until the head 339 of the arm 326 engages the forward ear 338 of the plate 336, continued movement of the cam causing the parts to move on the long radius pivot 320 and returning the slide frame to initial position, with the slides traveling along the longer return part of the graph (Fig. 28).

Going back now to the plunger 580, after the plunger has shot the rod 584 forwardly to advance the slide plate and rock the slide along the horizontal part of the graph, continued movement of the lever extension 557 lifts the plunger out of contact with the end of the rod, so that the return movement of the slide may return the rod to initial position without interference from the plunger; the flat face 590 at the forward end of the rod passing under the plunger; it being necessary to carry out the proper timing of the device for the trip setting mechanism to return to normal position by the time the escapement is locked, so that the key lever does not reach its lower limit until after the return of the setting mechanism to normal position. When the key lever is released and the extension 557 is lowered, the plunger 580 engages the forward end of the rod 584 and slides therealong as the barrel pivots on its mounting against the tension of the spring 576, the pivotal movement of the barrel continuing (Fig. 12) until the plunger has moved over the end of the rod and again contacts the inclined plate 583, when the tension of the spring 576 returns the barrel to initial position and the plunger is again shot forwardly by its spring until its travel is stopped by the pin 601 (see Figs. 4, 9, 10, 11, 12, and 13) that is fastened to the forward end of the plunger and engages the forward end of the barrel to limit the plunger movement. After the erase of the trip as described, the parts are in normal position, so that succeeding key levers will be actuated to set up the character trips as presently described.

As it is desirable to limit the backward movement of the storage cylinder when effecting the erasure of the erroneously depressed trip, I have provided means for accomplishing this object comprising a stop for the key lever 549. This stop preferably comprises a set screw 603 (Fig. 9) which is threaded into the base frame 1 from the bottom so that its upper end 604 may be engaged by the lower edge of the key lever when the lever has been lowered to the desired limit of travel; the position of the set screw being assured by the location of a lock nut 605 thereon, so that the screw may be projected to a desired height and held in a fixed position.

*Stop and start.*

The entire mechanism may be locked to hold the parts inoperative when the machine is to be out of use for a considerable time and may also be locked for short periods. Separate mechanisms, having some parts in common, are provided for engaging the long and short locks, and the short lock being effected through a key lever 607 (Figs. 3 and 4) which is pivotally mounted on the rod 26 at the rear of the machine, as are the other key levers, and has a button 608 on its upturned forward end bearing the word "Stop," and being tensioned upwardly by a spring 36, as are the other key levers.

Pivotally connected with the lever 607, by a link 610 (Fig. 20) is a lever 611 which is pivotally mounted on bracket 609 and connected with the lower end of a barrel 612 by a pin 613. The barrel 612 has an apertured cap 615 at its lower end, and located within the barrel is a plunger 616, having a head 617 yieldingly urged outwardly by a contained spring 618 that bears against the bottom of the barrel and against the base of the plunger head, so that the head is normally, yieldingly held in engagement with the inner surface of the cap 619 of the barrel. The cap 619 is adjustable so that the relative position between the plunger and barrel may be varied, and thereby determine the point at which the key lever 607 starts its functional movement.

The plunger also comprises an extension 620 which is slidably projected through apertures 621 in a bracket 622 on the side frame 2 and an aperture 623 in a guide member 624 on said bracket.

Fixed on the upper end of the extension is a head 625, having a cam face 626 directed toward and adapted for wiping engagement with a rod 627 which is slidably mounted in the shaft 123 upon which the transmitting element is mounted.

The key lever 607 has an upturned ear 628 (Fig. 3) at its forward end, and pivotally mounted on a stud 629 on the ear is a trip 630, having a key 631 thereon bearing the word "Start"; the trip having an arm yieldingly held forward against the stop 632 on the key lever 607 by a spring 633, and having a hook 634 at its lower end adapted for engagement with a lip 639 on the plate 33 on the forward end of the frame, so that when the start key is depressed it is rocked back against the tension of the spring and wipes the lip 639 until the hook has passed below the lip, when the hook takes hold of the lip and retains the key lever 607 in lowered position.

As the key lever is lowered by pressing on the start key, the barrel 612 and its plunger are lifted to move the cam 625 against the end of the rod 627, so that the rod is forced inwardly within the shaft 123. The shaft 123 carries a collar 642 (Figs. 57, 58 and 72) which is slidable on the shaft and has a key 643 slidably mounted in a slot 644 in said shaft and against which the pin 627 is moved to slide the collar when the start key lever is depressed. A link 645 is pivotally connected with the collar, so that when the collar moves along the shaft, following the depression of the start key, the link moves longitudinally against the tension of the spring 646 that connects the link with a hook 647 on the crossbar 396 and rocks the lever 392 with which the link is connected through an extension 648 to move the governor brake away from the disk 387 to release the governor and permit the governor and driving mechanism shafts to revolve.

*Starting speed.*

As the initial movement of a mechanism controlled by a governor of this character is relatively slow and gains momentum until the maximum speed of the governor has been reached, there would be a variation in the speed at which the telegraphic impulses were forwarded, were the transmitting element permitted to actuate immediately upon the release of the governor. In order, however, to obviate this variation in speed I have provided means for preventing actuation of the transmitting element until the governor has reached a predetermined speed. This mechanism comprises a clutch collar 413 which is slidably mounted on the transmission shaft 344 and has a dog 413' on its side face adapted for engaging a like dog 412 on the gear wheel 410, whereby motion is imparted from the transmission shaft to the clash gear; the clutch collar being urged toward its gear wheel 410 by a spring 679 which bears against the collar and against the hub 680 of the gear wheel 369; the clutch being connected with the hub by lips 671 that slide in grooves 672 in the gear wheel hub so that the clutch collar revolves with the gear wheel. The clutch collar comprises paired side flanges 681—682; the former of which carries a clutch dog, and located between the collars is a roller 683 mounted on an arm 684 which is pivotally mounted on a bracket 684' on the cross-bar 396. Pivotally connected with the arm 684 is a bar 685 which extends along the transmission and governor mechanism, and has a hook 686 that is held against a stop 687 on the lever 392 by a spring 685' that is connected with the bar and with the bracket 347, so that when the lever 392 is moved by depression of the start key the bar 685 is moved longitudinally to throw the clutch dogs on the slide collar 681 and the gear wheel 410 out of contact, so that while the transmission and governor are free to move, they do not drive the clash gear.

Figure 57:
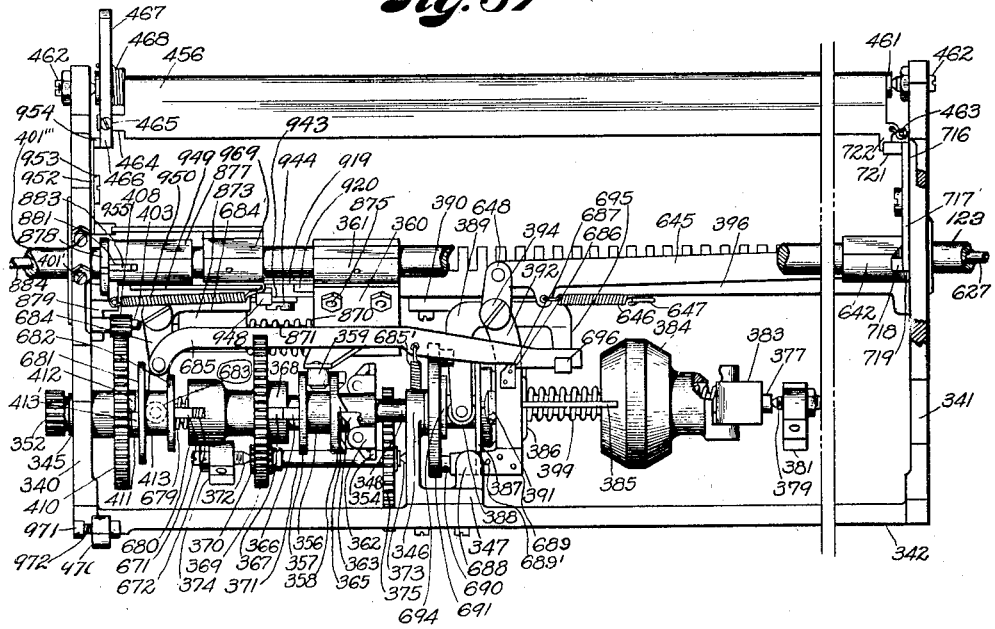
Fig. 57 is a plan view of the transmitting element, the character members and other parts being removed for better illustration and the mechanism for driving the character members being shown in normal position.
Figure 58:
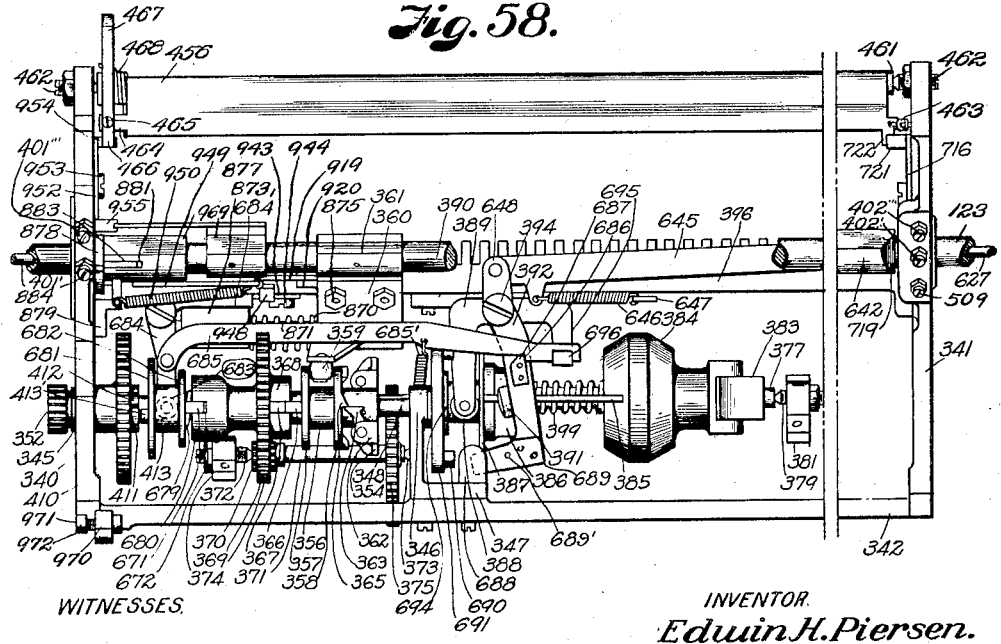
Fig. 58 is a similar view showing the governor brake open to permit the governor to accumulate a certain predetermined speed before the character members are thrown into operation.
Figure 92:
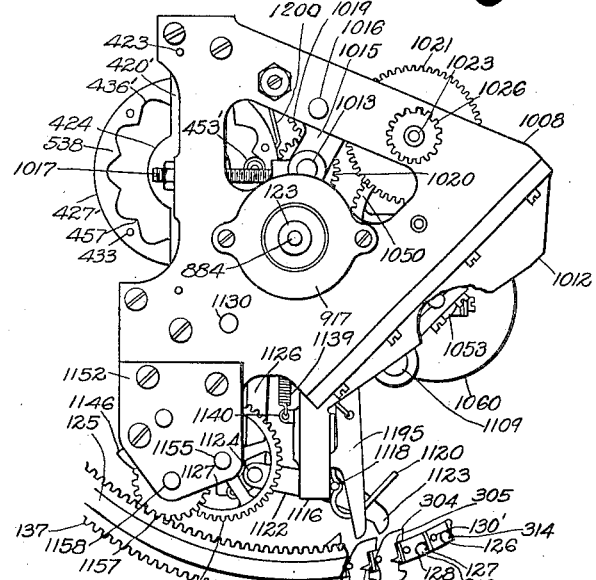
Fig. 92 is an end view of a modified form of transmitting element.

The arm 392 is yieldingly urged toward the governor by the spring 646, but its movement under the tension of the spring is limited by a pin 689' on an extension 689 of the arm 392 which engages a post 688 on the bracket 347; the end of the arm projecting into the path of a stop 690 on a disk 691 on the transmission shaft 344 when the parts are in inoperative position, so that when the lever is moved to start the machine the arm moves away from the disk stop to allow the disk and governor mechanism to revolve; the positive locking of the governor being acomplished by the extension 689 and the disk 691 rather than by the engagement of the flange 387 with the brake button 391, which, when the parts are in inoperative position, is spaced a short distance from the governor disk 387, as shown in Fig. 57.

When the transmission shaft has been released as just described, the transmission is driven through its connection with the differential gear and the transmission and governor revolved idly until they reach a predetermined speed, at which the governor weights have spread and draw the block 386 along the governor shaft. The block 386 is connected with the disk 387 and has a head 694 so that when the disk moves along the shaft it engages the roller 388 that normally bears against the head 694 on the disk and moves the roller and the arm, upon which the roller is carried, to rock the lever 389 on its pivotal mounting on the stud 394. The lever 389 has an arm 695 provided with a trough end 696 in which the end of the bar 685 is seated so that when the lever 389 is rocked it lifts the bar 685 to move the hook 686 off of the stop 687. When the hook leaves the stop the spring 679 pushes the clutch sleeve along the shaft to throw the clutch dog into the path of the coöperating dog 412 on the gear wheel 410, so that power from the transmission shaft is carried to the clash gear, to allow the latter to operate the character members when the latter are set. When the machine is to be stopped, the stop key lever 607 is depressed and moves the key 631 downwardly until the hook 634 is freed from the lip 637, when the spring 633 draws the arm back so that when pressure on the key lever is relieved, the spring 36 will lift the key lever.

*Character run out.*

When the key lever is raised, the barrel 612 and plunger 620 are lowered so that the cam is moved out of the path of the pin 627 and the spring 646 rocks the lever 392 to throw the brake button 391 into contact with the governor disk 387 to slow down the governor and eventually stop rotation of the governor shaft by engagement of the end of the arm 687 by the stop 690 on the disk 691. When the arm 392 has moved into its position it does not break the connection between the clutch collar 413 and the gear wheel 410, although the stop returns to its holding engagement with the notched part of the bar, so that the transmission continues to revolve under momentum of the governor. This arangement has been provided for the reason that the machine might be stopped before the transmission of a character has been completed, and it is not advisable to stop the machine in the middle of a character. In order to complete that character before the machine is actually stopped, I have provided the clutches 358—354; it being apparent that as the clutch dogs 363 are pivotally mounted in their brackets and the beveled faces of the dogs 358 may rock the dogs 363 against the tension of their springs, momentum of the governor will carry the clutch around and continue to rotate the transmission shaft and clash gear until the latter is stopped.

The mechanism for stopping the transmitting mechanism when a character has been completed comprises a rock bar 716 (Figs. 57 and 58) which is pivotally mounted on the frame end 341 and has an arm 717 lying adjacent the shaft 123 and provided with a lip 718 which is adapted for engagement by a beveled face 719 on the end of the slide collar 642, so that when the collar is moved outwardly to stop the machine the rock bar is actuated by engagement of the collar with the lip and rocks the second arm of the bar 716 to throw the lip 721 against a tongue 722 on the escapement plate 456, so that the plate is rocked to move the pawl 467 into the path of the escapement pawl 487 and lock the gear 471 in the internal gear 470 of the storage cylinder; the escapement pawl 487 being so arranged relative to the character members that it reaches its point of contact with the pawl 467 as the driving gear teeth on each character member reach the idle position, the parts remaining locked by this escapement until the collar 642 is again shifted on its shaft by manipulation of the start key. The brake button 391 on the lever 392 is so arranged that it is slightly spaced from the disk 387 when the buffer is in inoperative position in order to permit of the continued movement just described.

*Machine lock-speed regulator.*

The positive lock for the machine, and which also constitutes a speed regulator, comprises a cam 700 (Figs. 20 and 23) which is fixed on a shaft 701 that is journaled in a bushing 702 in the case 11 that carries a button 703 that is accessible from the outside of the case, so that the cam may be lowered into the path of the cam 625 and prevent the cam from lifting to actuate the slide rod that controls the governor mechanism; it being apparent that when the machine is to be stopped for a considerable time the button may be turned to lock the cam and thereby prevent operation of the machine.

As operators are accustomed to receiving transmission at certain speeds, it is advisable that the transmitter be set to send the messages at this speed. For the purpose of regulating the speed of transmission I provide the shaft 701 with a pointer 705 which moves over a scale 706 that comprises a sheet metal hood having numbers on its face over which the pointer 705 is adapted to travel to indicate the desired speed, and having a notched flange 707 projected inwardly from the hood and spaced from the case.

Frictionally mounted on the shaft is a plate 709 having an arm 710 (see Figs. 20 and 23) projected along the notched flange and having a tooth 711 adapted for engaging the teeth in said flange to hold the plate in fixed position. The arm 710 of the plate 709 has a finger 712 projected into the path of the pointer 705 so that when the pointer engages the finger it will be stopped to retain the cam 700 in a required position for regulating the governor to the speed indicated by the position of the regulator plate. The plate 709 has a second arm 714 provided with a finger grip 715 whereby the plate may be moved when a different regulated speed is desired. It is apparent that when the knob 703 has been turned to throw the cam 700 out of the path of the cam 625 the start key lever must then be depressed to shift the rod 627, by reason of the plunger cam engagement therewith. If the cam 700 is in its locked position, however, movement of the start key lever will not release the machine, as the cam 625 is held depressed by the cam 700, so that movement of the key lever merely tensions the barrel spring against the plunger without releasing the mechanism, so that in any event the lock cam 700 must be open to effect a release of the governor mechanism. The speed adjustment is effected by position of the cam 700, as it is apparent that with this cam partially raised it will be engaged by the cam 625 when the latter has been raised to the contact point so that the rod 627 is moved inwardly a distance proportionate to the length of the cam 625, and that the speed of the transmission may be varied within the limits of movement of the cam 700, and as indicated on the dial on the outside of the case.

*Home and maximum positions.*

While the transmitting element revolves freely within the cylinder it has certain definite limits of travel; the normal or home position being that wherein a trip hook on the transmitting element may be engaged by a trip dog on the cylinder on the next movement of the cylinder after the trip dog has been set up, and the maximum position of the transmitting element being closely adjacent the home position but on the reverse side of the trip setting mechanism; it being apparent that for the transmitting element to travel from the home to the maximum position it must have turned nearly a complete revolution within the storage cylinder.

The home and maximum positions are determined and maintained by mechanism (see Fig. 3) comprising a stud 724 that is mounted on the outer face of a beveled gear wheel 725 that is fixed on the center shaft 123 adjacent the side frame plate 2 and is adapted to engage the upper arm 726 of a lever 727 which is pivotally mounted on a stud 728 on said frame plate. The lower arm 729 of said lever extends downwardly past a plunger 730 which is slidably mounted in a bracket 609 on the frame plate and has a collar 731 fixed thereon to form a stop for a spring 732 which bears against the collar and against the bracket to yieldingly urge the plunger toward the lever arm; the projection of the plunger under tension of the spring being adjustable by lock nuts 733 on the forward end of the plunger that bear against the front face of the bracket. With this construction, when rotative tension from the cylinder rotates the transmitting element toward its home position, the stud 724 will engage the upper arm of the lever so that the lower arm is pushed against the plunger and the transmitting element yieldingly stopped in such home or initial position.

When the machine is operated more rapidly than the characters can be transmitted, the transmitting element is moved around to the right (Fig. 3) until the stud engages the opposite edge of the lever arm 726 and rocks said arm away from the plunger and into engagement with the end of a set screw 734 which is adjustably mounted in a boss 735 on the side frame 2, so that the lever is firmly held against the tension of the transmitting element. It is apparent that with this construction the home position may be adjusted by manipulation of the plunger lock nuts in order that the trip hooks of the transmitting element may approach the cylinder set-up position as closely as possible, and that the maximum position may be adjusted by the set screws 734 in order to give the transmitting element the fullest possible movement without interference with the set-up trips at the home position.

It is further apparent, however, that inasmuch as the cylinder is moved backwardly by the erase mechanism, should the transmitting element be in home position when the erase key lever is actuated the cylinder would tend to move back and carry the transmitting element therewith and strain the parts when the stud 724 engaged the lever 727 which determines the home position. In order to obviate this disadvantage I have provided means for rendering the erase mechanism inoperative when the transmitting element is in home position; such mechanism comprising an arm 736 (Fig. 13) provided with a crank part 737, which is pivotally mounted in a bracket 738 on the side frame 2. The arm 736 may be projected between the pawl 563 and the ratchet wheel 564 to prevent the pawl from engaging the ratchet wheel should the erase key lever be depressed when the buffer arm is in place.

The crank part 737 has an arm 739 which is pivotally connected with a link 740 (Fig. 2) that is slidably mounted on a stud 741 on the side frame 3 and held yieldingly in an elevated position by a coil spring 742 that is attached to the link and to the side frame; the upper end of the link having a laterally directed stud 743 adapted for engagement by a cam 744 that is adjustably mounted on a plate 745 which is fixed to a threaded collar 746 on the center shaft 123.

With this combination of elements, when the transmitting element is in home position the cam on the center shaft will move the buffer arm 736 between the ratchet and the pawl on the erase lever to interpose the buffer arm therebetween, so that when the erase key is lowered the pawl will move idly over the arm and will prevent the erasure which would otherwise occur.

I have also provided the machine with mechanism for locking the character and word space key levers to prevent their actuation when the transmitting element has reached the maximum position, in order to obviate strain on the machine. This mechanism comprises a lever 747 (Figs. 3 and 89) which is pivotally mounted on a stud 748 on the inner face of the side frame 2, and provided with a laterally turned lip 749 which projects through the frame and carries an adjusting screw 750 that is adapted for engagement by the lower arm of the lever 727 that limits the movement of the transmitting element at the home and maximum positions.

Pivotally connected with the lower end of the lever 747 is a link 751, the forward end of which has a pin and slot connection 752—753 with a bell crank lever 754 that is pivotally mounted on a block 755 on the side frame 2; the link being held yieldingly forward by a spring 756 that connects the link with the bell crank so that the link may have an initial rearward movement before actuating the bell crank, when the link and its carrying arm are moved rearwardly by engagement of the set screw with the position stop of the transmitting element.

One arm 757 of the bell crank lever extends substantially horizontally and has a hook 758 at its forward end for engaging a pin 759 on the side face of an arm 760 that is fixed to the shaft 54 that carries the roller 56 which is engaged by each of the key levers when the latter are depressed to actuate the escapement that controls movement of the storage cylinder, and the other or vertical arm 761 of said bell crank lever being provided with a similar hook 762 for engaging a pin 763 on an arm 764 that is fixed on the word space torsion shaft 546.

With this construction, when the transmitting element has reached its maximum position, the stop arm 729 will have engaged the end of the adjusting screw 734 and moved the lever 747 backwardly and revolved the bell crank lever 754, so that the hooks on the opposite arms of the bell crank have engaged the pins on the key lever abutment shaft 54 and the word space torsion shaft 546 and lock said shafts to prevent their rotary movement and consequently operative movement of the character key or word space levers; the strain that would result from attempted operation of any of the levers being in this way transferred from the cylinder and escapement parts to the bell crank lever 754 and the side frame; this preventive lock pulling directly from the block 755, so that the key lever and space key shafts are locked by the hooks 758 and 762 when the stop arm 727 has reached the limit of its travel; the initial locking position being that wherein the arm 729 engages its stop screw 734, and the spring 756 being provided so that if the hooks 758—762 start to engage while a key lever is down, the bell crank lever will yield and permit the key lever to take its normal position.

*Storage and sending indicators.*

In an apparatus of this character it is necessary for the operator to know how many characters are in storage and at what speed the characters are being transmitted to line, so that the position of the transmitting element may be shown on the indicator in order that the operator may maintain sufficient characters in storage to insure a constant transmission. This indication is provided by an indicator which is exposed through an opening 767 in the front of the case 11 so that it is in plain view of the operator. The indicator (Figs. 43 to 50 inclusive) comprises a dial 768 which is revolubly mounted on a tubular shaft 769 that is fixed on the front plate 6 of the machine frame. The dial 768 has a plurality of radially disposed peripheral slots 770 which register with like slots 771 in a ring 769' that is attached to and mortised in the rear face of the dial adjacent its periphery and is secured to the dial by screws 772 and a dowel 773. The dial may be rotated through a crown gear 774 that projects from the rear face of the ring 769' and meshes with the worm 775 on a shaft 776 (Fig. 43) that is journaled in bearings 777 and 778 on the front plate 6.

Fixed on the end of the shaft 776 opposite the worm is a beveled gear wheel 779 (Figs. 2, 4, and 43).

Meshing with the beveled gear wheel 779 is a similar gear wheel 780 on a shaft 781 which is journaled in bearings 782—783 on the side frame 3 and carries a beveled pinion 784 which meshes with a beveled gear wheel 785 on a shaft 786 that is journaled in a bearing 787 integral with the bearing 783. The shaft 786 carries a gear wheel 789 that meshes with the external gear 127 on the storage cylinder (Fig. 2) so that when the cylinder is revolved the indicator dial is moved synchronously therewith and relative to an arrow 790 that is fixed on the stationary indicator casing ring 791 and a movable pointer 792 that is operated from the transmitting element. The pointer 792 is fixed on a shaft 794 which is revolubly mounted within the tubular stud 769, and fixed on the rear end of said shaft is a worm gear 795 which meshes with a worm 796 on a shaft 799 that is journaled in bearings 797—798 on the rear of the front plate 6. The shaft 799 has a beveled pinion 800 on the end opposite the worm which meshes with a beveled gear wheel 801 (Fig. 3) on a shaft 802 which is journaled in bearings 803—804 on the side plate 2, and has a beveled pinion 805 fixed on its rear end that meshes with the beveled gear wheel 725 on the cylinder shaft 123, and which is operated with the transmitting element, so that when the transmitting element is rotating the pointer is moved synchronously therewith but in a direction opposite to the movement of the dial. The dial is provided with indicator trips; one of which is thrown up with each key lever actuation so that as the dial revolves with the cylinder the number of set-up characters is clearly disclosed to the operator, and as the transmitting element moves the pointer travels along the dial to indicate the condition of the transmitting element; it being apparent that for there to be any characters in storage the cylinder must move faster than the transmitting element. Movement of the transmitting element indicator reversely to the movement of the dial will show a constantly increasing accumulation while the transmitting element is continuing without interruption.

The indicator trips on the dial are substantially similar to the trips on the storage cylinder, each comprising a sheet metal body member 807 having a heel 808 pivotally mounted on a rod 809 that is nested in a seat 810 formed by grooving the periphery of the dial and forming a grooved tooth 811 on the ring 769'; the trips being set in slots 770 and in corresponding slots 771 in the periphery of the ring. The ends of the teeth 813, formed by slotting the periphery of the dial, have inwardly facing V-sockets 814, and seated in adjacent sockets are the outturned ends 815 of springs 816 that are constructed similarly to the springs 310 on the cylinder trips, with the connecting bar 817 of each spring seated in a notch 819 in the rear edge of its indicator trip; the mounting being such that as the indicator trip passes its meridian in either direction the spring will tension it to place so that it is yieldingly retained in normal or indicating position; the slots 770 being widened adjacent the springs to accommodate the body portions 820 of the springs. Each of the indicator trips further comprises a tooth 821 which projects outwardly from the dial into position for engagement by a setting hammer, and a lip 822 which is adapted for engaging a shoulder 823 on the front of the dial to limit the movement of the indicator trip.

The indicator trips are actuated by a hammer 825 (Fig. 91) which is pivotally mounted on a shaft 826 that is journaled in brackets 827—828 on the rear face of the front plate 6; the hammer normally resting back of the teeth 821 of the indicator trips 807 and in line with the stationary pointer 790 at the front of the indicator.

The hammer 825 is normally yieldingly retained away from the indicator trips and against a stop 830 on the frame by a coil spring 831, the front end of which is connected with the hammer and the rear end with a lug 832, on a slide bar 833 which is pivotally mounted on a lever 834 on the escapement shaft 54, so that when the shaft is oscillated by depression of the key levers the slide bar will move forwardly and back relative to the hammer. The front end of the bar 833 is slidably projected through a slot 836 in the hammer plate 837 and has a shoulder 838 adapted for engaging the hammer plate at the base of the slot, so that as the bar is moved forwardly the hammer is forwarded therewith to actuate the indicator trips.

The bar 833 has an inclined shoulder 839 in its under edge, back of the shoulder 838, which is adapted for engaging the trip 840 so that as the bar moves forwardly to actuate the hammer it is raised to release the shoulder 838 from the hammer plate and allow the plate to slide over the large portion of the bar, so that the hammer may be drawn back quickly under tension of the spring 831; the parts being so combined that the hammer bar is moved upon the initial movement of the key lever in order that the indicator trips may be set up and the hammer returned to initial position before the storage cylinder is actuated by the later movement of the escapement, with the result that the hammer is out of the way of following trips in the indicator before the indicator dial has moved.

In order to adjust the point in which the hammer is tripped back, the trip 840 is pivotally mounted on a stud 842 on the front plate 6, and comprises an arm 843 which lies along the frame and is fixed thereto by a set screw 844 which projects through a slot 845 (see Fig. 4) in the frame; it being apparent that when the screw is loosened the trip may be moved by manipulating a finger piece 846 on the arm 843 so that the height of the trip 840 may be adjusted to vary the release position of the shoulder 839 on the slide bar.

In order to clearly indicate the amount of storage by means of the indicator trips, the parts have been arranged so that the space key operates to throw the indicator trips in the opposite direction; it being apparent that it is not necessary to reset any of the indicator trips and if an indicator trip is up when it passes the point where the hammer operates, the hammer will operate just the same but not touch the indicator trip, but if the indicator trip comes to this point and the space key is operated the indicator trip will be thrown backwardly, thereby indicating that a word has been finished and the parts are in readiness to start a new one.

*Word space indicator.*

It is desirable to indicate word spacing on the indicator in order that the operator may better understand the amount and arrangement of characters in storage. In order to give this information on the indicator without complication of movable parts, I set back an indicator trip upon the actuation of the word space key in a similar manner as the active character keys, but return the hammer to initial position before the storage cylinder has moved the indicator disk away from the set-up position.

The mechanism for returning the indicator trip comprises a second hammer 848 which is fixed on the shaft 826 and is offset in order that it may lie directly in front of the hammer 825, so that when actuated, following the actuation of the setting hammer, it may engage the indicator trip that has just been moved by the set hammer and return the indicator trip to initial position before the disk has moved. The hammer 848 is fixed on the shaft 826 and the shaft is yieldingly tensioned by springs 850, presently described more in detail, so that it tends to hold the returning hammer outwardly away from the disk; the projection of the setting hammer being limited by a stop 851 that is fixed on the shaft and engages an extension 852 on the hammer stop 830.

Fixed on the shaft 826 by clamp screws 853 (Fig. 4) are arms 854 which may be adjusted in position on the shaft by loosening and tightening the screws, and pivotally mounted on the rear ends of said arms are hangers 855—856, having hooked free ends 857—858, the former of which is adapted for engagement with a laterally directed pin 859 on the word space lever, while the latter is adapted for similar engagement with a pin 860 on the erase key lever when said levers are lowered.

A coil spring 850 is attached to a hook 862 on the rear face of the front plate 6 and to one of the hangers 855—856, and acting to lift its hanger and the arm 854, upon which the hanger is mounted, rotates the shaft 826 to limit the movement of the return hammer; the mounting of the spring on the hanger causing the latter to tension backwardly so that its rear edge is held against the pins 859 or 860, as the case may be.

The normal position of the parts is that illustrated in Fig. 45, wherein the hook end of the hanger 855 is below the bar pin, but as the space or erase key lever is moved downwardly the pin 859 moves onto the hook 857 and draws the hanger downwardly against the tension of the spring 850.

This down movement of the hanger rocks the shaft 826 backwardly so that the hammer 848 is moved against the tooth of the previously set indicator trip 807 and moves the indicator trip back to initial position before the disk has moved out of position for engagement of the hammer with the indicator trip tooth, so that when operation of the active key levers sets up successive indicator trips, the indicator trip that is returned by the word space key will mark a space between words in storage. This action takes place during the down-stroke of the space key lever, and while the first half of the storage cylinder escapement is in operation.

As the space key is released the pin 859 is thrown upwardly against a shoulder 864 on the hanger 855 above the bottom of the hook and insures a more or less positive upward movement of the hanger in addition to the lift given by the spring 850. When the hanger is lifted to the proper point, an extension 865 thereon engages an ear 866 on a bracket 869 that is fixed on the rear of the front plate 6 and rocks the hanger so that the hooked part is moved away from the pin 859 to free the hanger so that it may rise quickly under tension of the spring 850 and before the final movement of the cylinder escapement to rock the shaft 826 by the toggle action of the hanger and arm 854, and thereby insure complete removal of the return hammer from adjacent trips before the disk is turned.

When an indicator trip has been set up by the operation of a wrong key and the cylinder trip is to be erased by actuation of the erase key the indicator trip on the indicator is erased by the same lever movement; the connections between the erase key and the shaft 826 being identical with those described relative to the word space key; the only difference in the operation being that the cylinder escapement is cut out during the operation of the erase key, but that, of course, has no bearing on the operation of the indicator parts.

*Repeat.*

It is frequently necessary or desirable in telegraphic work for all or a part of a message to be repeated, and I have provided means whereby a message may be repeated from the storage cylinder without the necessity for resetting any of the trips from the key board.

This mechanism primarily comprises means whereby the transmitting element is shifted laterally with respect to the storage cylinder in order that the hooks 444 may pass between the trips 129 on the storage cylinder, as indicated in dotted lines (Fig. 72).

The transmitting element frame is slidably mounted on the shaft 123 but is yieldingly tensioned to normal position by a spring 870 that surrounds a shaft 871; one end of which is slidably mounted in a boss 873 on the bracket 684' that is fixed on a cross-bar 442 in the transmitting element frame, and the other end of which is fixed in a block 874 which is rigidly clamped to the shaft 123 by screws 875 that extend through the block 874 and into the block 361 that carries the clutch arm 360 whereby the transmission shaft is connected with and disconnected from the governor shaft in the transmission driving mechanism.

In order to adjust the normal position of the transmitting element so that the hooks will bear the proper working relation to the cylinder trips 129, I thread the free end of the shaft 870 and project the same through the bracket 873, so that lock nuts 876 may be applied to the screw and bear against the end of the bracket to limit the projection of the transmitting element under tension of the spring 870.

Slidably mounted on the shaft 123 is a collar 877 (Figs. 67, 69, and 72) having a flange 878 spaced from and adapted for engaging a bracket 879 on the side frame 340 and having a transverse slot 881. Fixed in the collar slot and slidably mounted in a slot 882 in the shaft 123 is a key 883 which crosses the center of the shaft and is adapted for engagement by the end of a rod 884 which is slidably mounted in a bore 885 in said shaft, so that when the rod is moved inwardly it engages the key 883 and moves the collar 877 along the center shaft to shift the transmitting element to inoperative position through the connections between the collar 877 and the bracket 879 on the frame, and which will presently be more fully described.

Fixed to the shaft 123 (see Figs. 76 to 78 inclusive), outside of the side frame 3, is a collar 746, and removably mounted on said collar by a nut 888 that extends through an aperture 889 of the case 11 is a hub 890, having pins 891 that project into apertures 892 in said collar, and having a projecting outer end provided with a slot 893.

Pivotally mounted in the slotted part of the hub extension is the head 894 of a crank handle 895; the point of mounting being eccentric relative to the hub so that when the crank is moved outwardly away from the frame the head will move inwardly toward the frame and the transmitting element.

Slidably mounted in the interior of the hub 890 is a plunger 897 having a reduced extension 898 slidably projected into the bore of the shaft 123, so that when moved inwardly the plunger extension may engage the slide rod 884 that is located within the shaft; the plunger being normally held outwardly, however, by a spring 899 that bears against a diaphragm 900 within the hub and against a shoulder 901 at the back of the plunger head 902, so that the plunger is yieldingly urged outwardly to keep the head 902 in contact with the inner face of the crank head 894. The crank 895 has a stop 905 for limiting movement of the crank head away from the plunger, and has a ball 906 at the free end of the head that rests in a socket 907 in the crank head and engages a flange 908 on the plunger head 902, so that when the crank is pulled outwardly (Fig. 78) the crank head rocks on its eccentric mounting and the plunger is moved inwardly until the ball 906 passes over the flange 908 and along the edge of the flange so that it is interposed between the flange and the crank socket to hold the crank in the extended position. As the crank is moved outwardly it forces the plunger against the rod 884 so that the latter is moved against the key 883 and eventually moves the collar 877 along the center shaft and rocks the transmitting element through the abutment of the flange 878, against the bracket 879 on the frame. During the shifting movement of the transmitting element the clutch collar 356 on the transmission shaft 344 has remained stationary by virtue of its connection with the block 360 that is fixed on the shaft 123, so that as the transmission shaft is moved within the collar, the clutch connection with the collar is broken by the release of the clutch dogs with the dogs on the collar. The collar 642 remains stationary as the transmitting element is moved along the center shaft, so that the lever arm 392 is rocked on its pivot to move the extension 689 out of the path of the stop 690 on the disk 691 and releases the disk so that its shaft may revolve independently of the governor; the same motion breaking the clutch 412—413' that connects the transmission shaft of the clash gear train, so that the transmission is disconnected both from the governor and the clash gear upon the shifting of the transmitting element.

When the governor is disconnected from the transmission shaft and the transmission shaft is released by the break lever 392, the driving spring would run down quickly unless some means were provided for locking the same. The means for holding the spring during the repeat operation consists of a clutch comprising stationary teeth 910 (Figs. 59, 62 and 72) on the inner face of the cylinder spider 121, and adapted for engagement by the teeth 911 on dogs 912 that are pivotally mounted between the ears 913 on a plate 914 which is fixed to the web of the gear wheel 161 of the differential train; the ends of the dogs opposite the teeth being provided with rollers 915 (Fig. 59) which pass through apertures 916 in the gear wheel and are yieldingly held in contact with a race 917 on the transmitting element frame end 340 by springs 918 that yieldingly urge the rollers toward the race and the teeth toward the stationary teeth on the cylinder spider.

With this construction, when the transmitting element is shifted along the center shaft in order to throw the hooks out of position for engagement with the cylinder trips, the dog rollers automatically follow the transmitting element so that the teeth are thrown into clutch engagement with the cylinder and the differential train held to prevent waste of the spring power.

In order to lock the transmitting element in its shifted position I provide a toggle mechanism comprising a latch 919 (Figs. 67 and 68) which is pivotally mounted between the ears 920 on the block 874 by means of a pin 922, and on a pin 923 in the links 924 which are in turn pivotally mounted on a pin 925 in a bearing member 926 on the crossbar 396, so that when the frame is moved along the center shaft the link pin 923 will move to opposite sides of its center and be thrown to opposite positions by a spring 928 which connects one of the links 924 with a hook 929 on the crossbar. With the transmitting element shifted and locked by the toggle mechanism it may be revolved freely in either direction with its shaft by manipulation of the handle 895 until the indicator pointer 792 is directed to the position on the indicator showing the point from which the message is to be repeated. When the transmitting element has been turned to the repeat point the handle is moved inwardly to break the toggle and permit the transmitting element to come back to normal position under the influence of the spring 870; the return of the transmitting element to normal position being retarded, however, by the toggle until it has been revolved to a position where it will start the repeat with the beginning of a word; the return movement being automatic under tension of a spring, and the breaking of the toggle being automatic by engagement of the trip mechanism with a word space trip on the cylinder. This automatic control comprises a pawl 931 which is pivotally mounted on the inner face of the side frame 340 and arranged to lie slightly ahead of the plane of the hooks 445 that engage the trips 129 on the storage cylinder and in position for engaging a word space trip 129 (Fig. 51). The pawl 931 is pivotally connected with a slide 932 (Figs. 67, 68 and 72) that is movably mounted on the frame end 340 and is held yieldingly at the downward limit of its travel by a spring 933. The upper end of the slide 932 has a laterally turned end 934 and at the bottom of the slide are laterally turned ears 935 between which are pivotally mounted the ears 936 of a trip bar 937 which extends upwardly along the slide and has a laterally turned end 938 that normally lies beneath a tip 939 at the free end of the toggle latch 919.

Pivotally connected with one of the trip bar ears 936, by pin and slot connection 941—942, is a bell crank lever 943 which is pivoted on a stud 944 on the crossbar 396, and is tensioned inwardly by a spring 946 that is attached to the lever and to the crossbar 342. The upper, free end of the bell crank lever 943 is adapted for abutment against the laterally turned lip 948 of an arm 949 that is fixed on the collar 877 which is yieldingly urged toward the frame end 340 by a spring 950 that is connected with the arm and with the bracket 879 on the frame end 340.

With this mechanism when the collar 877 is moved along the shaft 123 as a preliminary step in the shifting of the transmitting element, the laterally turned lip on the arm 949 engages the free end of the bell crank lever 943 and rocks the lever to move the latch 937 against the laterally turned end 934 of the slide 932 and out of position for engagement with the toggle tip 939 so that when the toggle is moved to lock the transmitting element against movement on its center shaft, should the pawl 931 engage one of the cylinder trips, it will rock under the engagement and lift the slide idly; the end of the latch 937 passing along the end and out of contact with the toggle lip.

With this mechanism, when the transmitting element is to be reset so that it may be moved forwardly in the usual manner, the crank 895 is reset to normal position to relieve the pressure on the rod 884 so that the transmitting element may be shifted back to operative position. The shifting of the transmitting element does not occur immediately upon the return movement of the crank, however, as the connection between the crank and transmitting element is not positive but through the spring 870, and the spring is not free to act until the toggle has been broken by shifting the toggle latch bar 919 to the opposite side of the center pin 925. This shifting of the toggle is accomplished by engagement of the laterally turned end 938 of the latch 937 with the toggle lip 939. When the crank is lowered the collar 877 is moved along the shaft independently of the transmitting element frame so that the arm 949 moves out of the path of the bell crank lever 943 and allows the lever to rock under the tension of its spring; this movement pulling the slide 932 back to initial position and placing the laterally turned end 938 of the latch 937 beneath the toggle lip 939.

With the parts in this position when the pawl 931 is engaged by a word space trip on the cylinder the pawl is rocked and moves the latch 937 so that its end 938 engages the toggle lip and carries the toggle about its center, so that the transmitting element frame is released and may be moved back to normal position under tension of the spring 870 and in position relatve to the cylinder trips to pick up the active trip hook 445 at the beginning of a word.

It would be possible unless preventive means were provided to stop the machine prior to repeating a message before a character had completely run out, because of the locking of the governor upon the shifting of the transmitting element; this locking action resulting from the fact that one of the rollers 453 (Figs. 73-75) was, when the machine was stopped, riding on the rim of the character ring instead of being located in one of the ring pockets, so that the plate 456 was held depressed by the character member lever 450, thereby enabling the tooth 467 (Figs. 69 and 55) to engage the tooth 487 that travels with the escapement gear train having the gear wheel meshing with the internal gear on the storage cylinder. In order to prevent this engagement irrespective of the position of the character lever 450 relative to its ring, I provide a trip 952 (Figs. 57, 58, 59 and 69) which is pivotally mounted on a stud 953 on the frame end 340, and has laterally turned end lips 954 and 955; the latter of which is adapted for engaging the extension 466 on the tooth 467 and the former for engagement by the inclined end 967 on a bar 968 which is rigidly mounted on a collar 969 which in turn is rigidly fixed on the shaft 123 so that when the transmitting element is thrown into repeat position the bar 968 is engaged by the lip 955 on the trip 952 and rocks the trip so that the lip 954 engages the extension 466 and rocks the tooth 467 out of position for engagement with the escapement tooth 487, thereby preventing the locking of the transmitting element on the cylinder and the resultant rotation of the transmitting element in its operative path.

It is apparent that when the transmitting element is shifted back to its normal position the trip 952 will be moved away from the bar 968 so that the bar will not affect the locking mechanism.

In order to prevent the transmitting element from being moved backwardly after it has been returned to operative position following the repeating of character members I provide a safety pawl 970 (Fig. 51) which is pivotally mounted in an arm 971 on the transmitting element frame and held yieldingly in engagement with the internal gear 470 of the storage cylinder, by a spring 972 which engages the arm 971 and the pawl to throw the pawl to its engaging position; the arm 971 being pivotally mounted on a stud 973 and held in functional position by a spring 974 (as shown in Fig. 53), so that when the transmitting element is returned from repeat position the pawl will enter the gear and prevent retrograde movement.

*Hand key.*

I have also provided the machine with a hand key which may be used should the keyboard machine become inoperative. This hand-key (Figs. 14 and 15) is mounted at the front right hand corner of the casing 11 and comprises a bar 975 which is pivotally mounted on point bearings 976 in a bracket 977 on the casing and extends forwardly to the key position; the front end of the bar being provided with a post 979 which extends freely through a bushing 980 in the case and carries a finger piece 981 that is exposed to the exterior of the machine; the bar being provided with a contact point 982 which is exposed at the bottom to meet a contact point 983 on a screw 984 that is carried in a plate 985 on an insulator 986 on the casing. The bar 975 is yieldingly held upwardly to break the contact by a spring 988 which seats on an arm 989 integral with the bracket 977 and the arm extends downwardly through an aperture 990 in the bar so as to provide a lower seat for the spring; the spring seating on the offset part 991 of the bracket and bearing against the under side of the bar. The spring 988 holds the arm upwardly against the lower end of the bushing 980 and into position for engagement with the cam 993 that is fixed to the bushing and rotatable therewith; the cam having an inclined face 994 adapted to ride over the top of the bar so that when the bushing is turned by the finger grip 995 the bar is lowered to force the contact point 982 into engagement with the point 983 on the screw 984, so that when it is desired to close the line the cam may be actuated by the finger grip to bring the points 982 and 983 together. The contact screw 984 is in conductive relation to a binding post 997 on the plate 985, and a wire 998 leads from said binding post to the post 534 at the rear of the machine through which current is conducted to the line.

Key-board lock.

I provide the machine with a safety lock whereby the entire keyboard may be held against actuation; this lock comprising a bar 1000 (Fig. 90) which is slidably mounted in the groove 1001 at the lower edge of the plate 33 and has a plurality of fingers 1002 which are adapted for movement across the slots 32 in the plate 33 so that when the bar is moved to locking position the upper ends of the fingers will interrupt travel of the key levers before they have reached operative position and thereby prevent operation of the machine by manipulation of the keys. The bar 1000 is movable in its mounting by finger grips 1004 that project from the side of the base frame but which are partially secreted beneath the edge of the casing in order that they may not be readily observed, although they are easily accessible from either side of the machine.

Copy holder.

For the convenience of the operator I preferably provide a copy holder, which comprises a panel 1005 (Fig. 1) on the top of the case 11 and a clip bar 1006 at the base of the panel having lips 1007 beneath which the copy may be slipped to be held securely in view of the operator of the machine.

Modifications.

While the transmitting element herein described has been found to be effective, the scope of the invention includes the following modification of the details of structure of that part of the machine, and which, being in some respects of simpler construction, may constitute the preferred form of that part of the machine.

The modification of the transmitting element relates to the escapement mechanism whereby the transmitting element is intermittently locked to and released from the storage wheel in order that the transmitting element may move forwardly to take up the cylinder trips and be held to the cylinder while the character elements are forwarding the characters through the circuit breaking mechanism, and until the character had run out, when the escapement is released and the transmitting element allowed to move forwardly to take up the next character.

The present modification relates to a double escapement whereby the transmitting element is held at both limits of the intermittent movement.

Another feature of the modification is the trigger mechanism whereby the transmitting element is returned from the repeat position. Other parts of the transmitting element and governor control are also shown in the modified forms presently described in detail. In this modified form the transmitting element comprises Figs. 92 to 108 inclusive.

1008 and 1009 designate the side frames which are freely mounted on the axle 123 and connected by the longitudinal cross-members 1010, 1011 and 1012. Fixed in and extending between the cross members 1008 and 1009 are character frames 420' that carry the character members 427'; the supporting frames and character members being identical with the preferred form hereinbefore described and operating in the same manner, so that the gear teeth 430' mesh with the clash gear 404' when the character members are moved about through the trip connection with the storage cylinder. The clash gear 404' comprises a shaft 1013 which is revolubly mounted in the free ends of arms 1014—1015 which are fixed on a shaft 1016 that is revolubly mounted in the side frames 1008—1009 and held in position by adjusting screws 1017.

Revolubly mounted on the shaft 1016 is an idler 1019 which meshes with a driving gear wheel 1020 on the clash gear shaft 1013 and with a gear wheel 1021 on a sleeve 1022 that is revolubly mounted on the transmitting element shaft 1023 that is journaled in bearings in the side frame 1008 and in a bracket 1025 on the cross member 1012 of the transmitting element frame; the outer end of the shaft having a pinion 1026 fixed thereon and meshing with a gear wheel 161 of the differential train that drives the storage cylinder; the gear wheel 1021 being anchored against longitudinal movement on the sleeve by collars 1028—1029 which hold the wheel against lateral movement without interfering with its rotation on the sleeve.

Also fixed on the sleeve 1022 are collars 1030—1031, and located between the collars is a roller 1032 which is carried by an arm 1033 on a block 1034 that is fixed to the shaft 123 so that when the transmitting element frame is shifted transversely to repeat a message, the sleeve and parts carried thereby are held stationary.

The collar 1031 has laterally facing clutch teeth 1035 for engagement by the clutch dogs 1036 that are pivotally mounted on a collar 1037 that is fixed to the transmission shaft and yieldingly urged to engagement with the coöperating teeth on the collar 1031 by springs 1038, so that the transmission sleeve is actuated when the shaft is moved in one direction but idle when the shaft is moved in the opposite direction.

A disk 1039 is also fixed on the transmission shaft and provided with laterally directed bosses 1040 which are adapted for engagement by the end of a plunger 1041 that is slidably mounted in the bracket 1025 and controlled from the governor control mechanism, so that when the plunger is in locking position its end will engage the disk positions to hold the shaft and lock the differential gear; the shaft being rotatable from the pinion 1026 and the sleeve on the shaft being rotatable from the clutch dogs 1036 so that when the shaft is in motion and the dogs in place the sleeve is rotated with the shaft and carries the gear wheel 1042, which has a feather connection with the sleeve, about therewith; the gear wheel 1042 having clutch teeth 1043 on one face adapted for engagement with the teeth 1044 on the face of the gear wheel 1021 that drives the clash gear so that power is applied first to the shaft and back on the shaft through the sleeve to the gear wheel 1021.

The gear wheel 1042 which is keyed to the sleeve on the transmission shaft is normally yieldingly urged toward its mating clutch gear 1021 by a spring 1046 that surrounds the sleeve 1022 and bears against the collar 1030 at one end and the grooved hub 1047 of gear 1042 at the opposite end, so that unless restrained the gear wheel clutches mesh and connect the driving mechanism with the clash gear. The connection between the clash gear clutches 1043 and 1044 is, however, controlled from the governor, so that they will only engage when the governor is traveling at a certain predetermined speed, thereby limiting the initial movement of the clash gear to a time when it is traveling at a proper sending speed. This connection is established through a shaft 1048 that is journaled in the side frame 1008 and in the block 1025; the said shaft having a pinion 1049 fixed thereon and constantly meshing with the gear wheel 1042 that is keyed to the sleeve on the transmission shaft.

Also fixed on the shaft 1048 is a gear wheel 1050 which constantly meshes with the pinion 1051 on the governor shaft 1052 which is journaled in bearings 1053 on the crossbar 1012. The governor proper comprises a collar 1055 which is fixed on the governor shaft near the side frame 1009, and hingedly connected with the collar are weights 1056 which are adapted to spread under centrifugal force when the shaft is revolved. The governor links 1057 are in turn pivotally connected with a block 1058 that is keyed to the governor shaft by a pin 1059 to allow the block to move longitudinally along the shaft but without rotation thereon. The block 1058 carries a brake disk 1060, and fixed to the disk is a collar 1069 which forms an abutment for a sliding collar 1070 that is freely movable on the governor shaft and carries a link 1071 that is pivotally connected with the lever 1072 which is pivotally mounted on a stud 1073 on the crossbar 1012 and carries a roller 1075 within the groove 1076 in the hub 1047 that is integral with the clutch gear wheel 1042, so that when the governor is opened under operation of the transmission the collar 1069 will move away from the link collar 1070 to permit the lever 1072 to move, so that the spring 1046 on the transmission sleeve may force the gear wheel 1042 along the shaft to engage the clutch on the gear wheel 1021 that drives the clash gear. Reversely, when the governor weights close the link collar is moved along the shaft by engagement from the governor collar and the lever rocked to move the gear wheel 1042 back against its spring and break the driving connection to cut off the power to the clash gear.

Movement of the transmitting element is controlled through the governor mechanism by the stop and start key in the following manner:

Fixed on the crossbar 1012 is a bracket 1078, and pivotally mounted on said bracket is an arm 1079, having a link 1080 pivotally connected therewith and, in turn, connected with the collar 1081 that is slidably mounted on the shaft 123, so that when the collar is shifted it is guided on the shaft by a pin 1083 that projects from the shaft into a slot 1084 in the collar. The outer end of the collar has a reduced extension 1085 slidable in a socket 1086 in a collar 1087 that is also slidably mounted on the shaft, and has a key 1088 extending through a slot 1089 in the shaft, so that when the plunger 627 is moved inwardly by manipulation of the start and stop key it will engage the key 1088 to move the collar 1087 along the shaft to force the collar 1081 along the shaft and rock the arm 1079 and pull the plunger 1041 out of the path of the posts on the stop disk of the transmission mechanism.

The collar 1081 is normally spaced from the collar 1087 by a spring 1091, so that the outer collar may be moved slightly prior to the movement of the inner one. The arm 1 that is actuated from the shaft collars, has a tip 1093 that normally engages a flange 1094 on the plunger 1041 to draw the plunger outwardly and release the transmission when the collar 1081 is rocked inwardly on the shaft to move the plunger out of its clutch engagement with the transmission disk.

The plunger 1041 is movable positively to released position by the lever arm from the start and stop key, but is normally yieldingly urged to stop position by a plunger 1096 which seats on a spring 1097 in a longitudinal bore in the plunger 1041 and has a head 1098 at its outer end that bears against a lip 1099 on a brake arm 1100, that is pivotally mounted on a stud 1101 in a frame cross member 1012, and has a leather button 1103 on one end that is adapted for engagement with the governor disk 1060 to brake the governor and limit the actuating speed of the transmission; the brake button being held yieldingly in position by a spring 1104 that connects with the arm 1105 of the brake lever and with a post 1106 on the cross member 1012. The spring 1104 is stronger than the spring 1091 that spaces the shaft sleeves 1081 and 1087 so that the brake arm can only be rocked by a positive action on the shaft sleeves.

The block 1034 that is rigidly mounted on the shaft 123 and serves to anchor the clutch collar 1031 has a boss 1107 provided with a bore 1108, and slidably projected through said bore is a rod 1109 which is fixed in a boss 1110 on a block 1111 that is slidably mounted on the shaft 123, and spaced from the block 1034 by a spring 1112 the rod 1109 having lock nuts 1113 adapted to bear against the inner face of the block 1034 to limit the projection of the block 1111 on the shaft under tension of the spring 1112. The block 1111 has a bracket 1115 integral therewith, and fixed on the transmitting element crossbar 1012, so that when the transmitting element frame is shifted in the storage cylinder the bracket 1111 moves against the tension of the spring 1112, and when pressure on the parts is relieved, the spring will tend to automatically return the transmitting element to initial position.

Referring now to the character member control whereby the said members are thrown into operative engagement with the clash gear to transmit characters, 1116 designates a bearing plate having a plurality of slots 1117 and carrying a rod 1118 on its side face that extends across the slots 1117 and is held in place by a slotted bar 1120 that is fixed to the bearing plate 1116.

Pivotally mounted on said rod, within each of the slots 1117, is a bar 1122 having a trip hook 1123 that is adapted for engagement by a set cylinder trip 129, and carries a stud 1124 at its opposite end.

Pivotally mounted on each of the studs 1124 is a link 1126 that extends along a relative character member 427′ and has a laterally directed roller 453′ adapted for seating in one of the pockets 436′ of the character member; the lower end of the link having an extension arm 1127 equipped with a spring 1128 which is mounted on the crossbar 1011 to yieldingly urge the long arm of the link to position for holding the roller in the character member pocket, so that the character member is held in initial position that will throw the character member teeth into mesh with the clash gear when the bar 1122 is rocked from the storage cylinder.

In order to compensate for any inequalities in the several links, and to insure an immediate driving connection with the clash gear at the proper releasing period, I incline one edge of each of the links and provide an escapement mechanism that is operable from the inclined edge. This mechanism comprises a shaft 1130 which is revolubly mounted in the side frames 1008—1009.

Fixed to the shaft 1130, near each end thereof, is a bell crank lever 1131, and fixed in the ends of the arms 1132 of said levers, and extending across the transmitting element is a rod 1133 which is adapted for actuation by the inclined edge of any of the links 1126 to rock the bell crank levers when the link is lowered by the trip mechanism.

Pivotally mounted on the rod 1130, adjacent the side 1008 and the adjacent bell crank 1131, is a bell crank lever 1135, one arm 1136 of which has a laterally turned lip 1137 held yieldingly against an adjusting screw 1138 on the bell crank 1131, by a spring 1139, that connects with the arm 1136 and with a post 1140 on the transmitting element frame.

The other arm, 1142, of the bell crank 1135 has a laterally-turned lip 1143 that is adapted for engagement with the edges of the laterally turned lips 1144 and 1145 on the short and long arms 1146 and 1147 of an escapement bar 1148.

The bar 1148 is fixed on a shaft 1150 which is journaled in plate 1151—1152 on the side frame member 1008 and carries a pinion 1153 which meshes with a gear wheel 1154 on a shaft 1155. The shaft 1155 carries a pinion 1156 which meshes with a gear wheel 1157 on a stub shaft 1158 mounted on the frame plate 1152 and which, in turn, meshes with the internal gear 470 of the storage cylinder, so that when the transmitting element is revolved with the shaft 123 within the storage cylinder through the driving connection of the gear wheel 1026 with the differential gear, the escapement gear wheel 1157 will revolve in mesh with the internal gear on the cylinder when the escapement is free, but when the escapement is locked by engagement of the bell crank lever lip 1143 with either of the lips on the escapement member 1148, the escapement gear wheel 1157 locks to the internal cylinder gear and the transmitting element is carried about the shaft in fixed relation to the cylinder.

It is apparent that with this escapement mechanism the transmitting element may move relative to the cylinder and in a direction opposite the cylinder's travel to pick up the trips and set the character members, and that during the fixed period of the transmitting element, the character members are actuated to send the characters; the locking of the transmitting element to the cylinder obviating any interference with a character member while it is sending.

With the modified form of transmitting element, when all of the link rollers are in the character member pockets, the locking lip 1143 is in holding engagement with the short arm of the escapement, and under normal conditions the cylinder and transmitting element are stationary. When the key lever is depressed the cylinder moves forward and a trip is thrown up and engages the trip hook 1123, so that the trip hook is moved; the initial travel lowering the inclined edge of the link 1126 against the shaft 1133 and rocking the lip 1143 to a point on the escapement member where a slight additional movement will free the escapement and throw the character member about until the character member teeth mesh with the clash gear.

When the clash gear operates the character member it moves the link roller up onto the rim of the character member and rocks the link to free the holding lever from the short arm of the escapement bar and into the path of the long arm of the bar. The escapement is then actuated to throw the long arm into locking engagement with the lever, and under this engagement the escapement is held to lock the transmitting element until the character has been completed.

When the character is completed the link roller drops into a succeeding pocket in the character member, the escapement is broken to allow the transmitting element to advance and again stopped by the short arm of the escapement bar to hold the parts at the instant the cylinder and transmitting element trips engage, to relieve the parts of strain; the succeeding action of the cylinder successively actuating the transmitting element from the proper trips as long as the machine is working.

It is apparent that if the keys are actuated faster than a message is sent, the cylinder will accumulate and the transmitting element will take up the characters in the regular order.

In repeating a message with the modified form of transmitting element, the transmitting element frame is moved longitudinally on the shaft 123 by manipulation of the crank and plunger that pushes the rod 884 inwardly to move the frame along the axle, so that the hooks 1123 may pass between the trips on the storage cylinder. In this modified construction, the rod 884 engages a key 1160 that is slidably mounted in a slot 1161 in the axle and engages a collar 1162 which is slidably mounted on the axle and comprises an annular groove 1163 and restricted neck 1164, which latter bears against and is nested in a recessed portion 1165 in the block 1111 that is slidable on the shaft 123; the said collar being urged outwardly along the shaft by a spring 1166 which surrounds the restricted neck and bears against the collar and the block 1111 at its opposite ends.

As the block 1111 is fixed on the transmitting element frame, the frame is moved longitudinally with the block when the crank is moved away from the machine and against the tension of a spring 1112 which surrounds the axle and bears against the blocks 1111 and 1034; the spring yielding to permit the transmitting element to shift and expanding to return the transmitting element when the crank has been returned to normal position and the trigger mechanism that locks the transmitting element in shifted position has been actuated to release the toggle lock.

The toggle lock for holding the transmitting element in shifted position comprises a lever 1170 (Fig. 100) which is pivotally mounted on a pin 1171 on the block 1034 (Fig. 98), and has pivotal connection near its opposite end with links 1172 which are, in turn, pivotally mounted in a slot 1173 in the block 1111; a spring 1174 being connected with the toggle and with the bracket 1033, so that the toggle is yieldingly urged to closed or open position according to the position of the links, and the mounting being such that when the transmitting element frame is shifted to repeat position the toggle lever is thrown past one side of the link center and held in that position by the spring, and when returned to normal position is shifted past the opposite link center and held in that position. The toggle not only serves to lock the transmitting element frame, but when shifted to the repeat position it actuates mechanism for freeing the escapement, so that the transmitting element frame may be rotated in either direction on the shaft by manipulation of the crank. This mechanism comprises a bell crank lever 1175 which is pivotally mounted on a stud 1176 on the transmitting element frame and has an arm 1177 provided with a laterally turned lip 1178 (Fig. 105) that is urged to engagement with the lip 1137 on the escapement bell crank 1135 by a spring 1179 that connects a second arm 1190 of said lever with a stud 1181 on one of the frame crossbars so that the lever when unrestrained will rock the escapement lever to free the member 1148, so that the escapement may turn freely and allow free travel of the transmitting element. The bell crank lever 1175 is normally held, however, by the toggle mechanism when the transmitting element is in normal position to prevent its influencing the escapement bell crank; an extension 1191 on the toggle lever engaging a lip 1192 on the second arm 1190 of the lever 1175 to hold the last named lever against the tension of its spring.

When the toggle member is rocked upon the shifting of the frame, the extension 1191 moves away from the lever lip so that the spring acts to rock the lever and thereby shift the escapement bell crank out of engaging position and free the escapement.

The modified form of transmitting element acts like the preferred form in that when the transmitting element has been shifted the crank will be returned to normal position, while the transmitting element is held in shifted position until released by engagement of the trigger mechanism with a word space trip in the storage cylinder, and thereby insure the return of the transmitting element to operative position at a time when the transmission will be resumed at the beginning of a word; thereby obviating the confusion which might result from starting the transmission in the middle of a word.

This trigger mechanism comprises a trigger 1195 which is pivotally mounted on a pin 1196 arranged in the slot 1197 in the transmitting element frame; the slot being of substantially greater width than the trigger, so that the latter may have play in the former, but the trigger being urged yieldingly toward one side of the slot and against the face of a washer 1198 by a coil spring 1199 (Fig. 93) which surrounds the pin and also serves to yieldingly urge the trigger to engagement with the crossbar 1116; the outer end of the trigger lying to one side of the cylinder trips when the transmitting element is in normal position, but being shifted to position for engaging the word space trips when the transmitting element is shifted.

Figure 93:
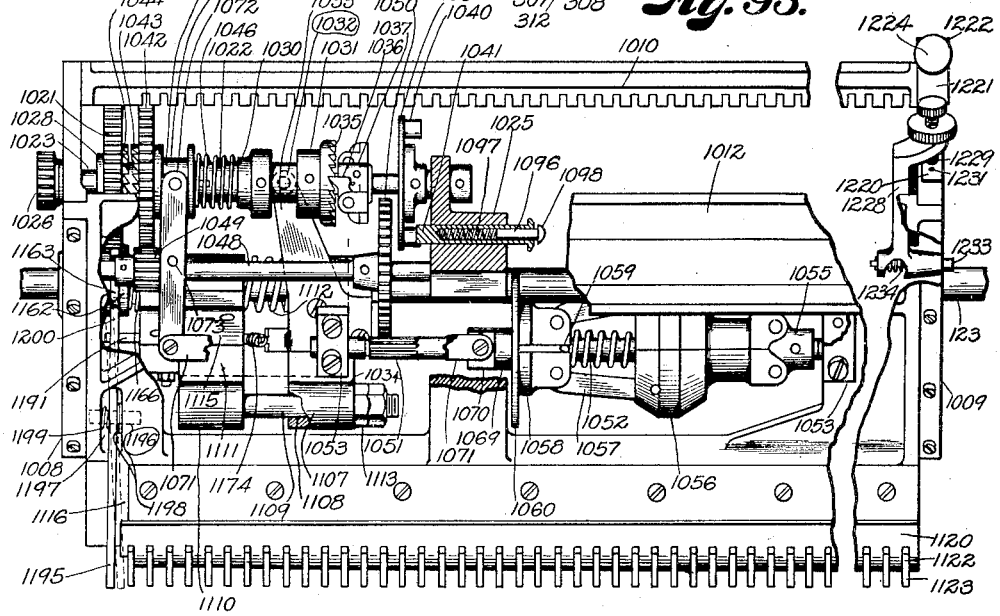
Fig. 93 is a side view of the same, parts being broken away for better illustration.

The shifting of the trigger is accomplished by providing its upper end with a hooked end 1200 that rests in the peripheral groove 1163 in the collar 1162, so that when the collar is shifted to repeat position the trigger is carried therewith, but when the repeat crank is returned to normal position the collar 1162 is returned under the influence of its spring and moves the trigger to the angle position, illustrated in dotted lines in Fig. 93, so that when the transmitting element is moved forwardly by the crank to cause engagement of the end of the trigger with a word space stop, engagement of the trigger by the stop will rock the trigger against the extension of the toggle lever and break the toggle to permit the transmitting element to be returned to normal position by the spring 1112.

In order to permit the transmitting element to revolve freely when in repeat position, the governor is automatically disconnected from the transmission when the transmitting element frame is shifted, by reason of the fact that the block 1034 is fixed on the stationary shaft 133, so that the sleeve 1022 is moved along the transmission shaft when the transmitting element frame moves laterally, thereby breaking the connection between the clutch members 1035 and 1036; the plunger 1041 also moving away from the disk posts to break the positive lock and entirely free the transmission from the governor. It is necessary, therefore, to provide some means for moving the escapement arm 1142 into locking engagement with the escapement member 1148 when the transmitting element is shifted to prevent momentum of the governor running out a character and throwing in other characters. This mechanism (Fig. 106) comprises a lug 1202 which is integral with the collar 1087 and carries an adjusting screw 1203 which bears against the lip 1204 on a bar 1205 which is pivotally mounted in a bracket 1206 on the side frame 1009; the end of the bar opposite the lip 1204 having a tooth 1207 for engaging an arm 1132 of the escapement mechanism, so that as the collar 1087 is given its excess motion by the spring 1091 after the governor brake and positive stop have been actuated, the adjusting screw 1203 will rock the bar 1205 against the escapement lever and throw the escapement member 1135 into the path of the escapement member 1148 and lock the transmitting element.

The circuit closer used with this modified form of transmitting element is similar to the one used in the preferred form, except for certain details which make possible a greater movement of the contact point.

In the modified form (Figs. 94 and 109), the brush 1200 (Fig. 115) is rigidly connected by means of pin 1208' with a bell crank lever 1208 which is yieldingly held in functional position by a spring 1209 that retains a lip 1210 on one of the lever arms 1213 against an adjusting screw 1214 on the transmitting element frame; the tension of the spring being adjustable by a post 1215 that is also carried in the frame and carries one end of the spring. The other arm 1217 of the bell crank lever has a laterally turned lip 1219 which overlies a flat spring 1220 that is mounted in a bracket 1221 which is pivotally mounted on the transmitting element frame and has a lip 1222 through which an adjusting screw 1223 is projected into the frame, the said screw having a head 1224 that bears against the bracket lip to adjust the position of the bracket and the tension of the spring against the lever lip.

Rigidly fixed on the transmitting element frame by screws 1226, which are insulated from the frame by collars 1227, is a bracket 1228, having a contact screw 1229 provided with a contact point 1230 which may be engaged by a point 1231 on the spring 1220 when the spring is released by the bell crank lever in order to close a circuit through the contact points.

The bracket 1228 Fig. 109 also carries a plunger 1233 which is yieldingly urged outwardly by a spring 1234 so that its free end wipes the collector ring 527 on the cylinder spider 120.

With this arrangement, when the adjustable spring post 1215 has been adjusted to tension the spring 1209 to hold the brush to the character wheels, the adjusting screw 1224 may be tightened to raise the flat spring 1220 against the lever lip 1219, so that the springs 1209 and 1220 may substantially balance each other and provide a free action for the character wheels and a very positive action on the contact screw 1229.

The character wheels move the brush an equal distance each time for each operation and the impulses transmitted by the character members are of certain length and have different spacing. It is apparent that the contact screw 1229 may be positioned to close a circuit before the flat spring 1220 has reached its upper limit, thereby stopping the travel of the spring and permitting the bell crank lever to continue to the limit of its stroke. This adjustment is provided to allow a spaced movement before and after the impulses are started, that is graphically illustrated in Fig. 108, in which the dot and dash signals are shown to be of certain length and the comparative length of the same signals is shown after the adjusting screw has been raised.

In explanation of Fig. 108, let us assume the vertical lines 1230 to be spaced so as to represent the code signals U N O with the proper spacing between the elements of each character and between the characters themselves and with the proper length of dot and dash. The black spaces 1231 at the top of the figure shall represent the dots and dashes, which make up the letters just referred to. Now if the contact screw 1229 is positioned at a point near the lower limit of its travel, the dots and dashes will appear as in the upper part of the figure because as the length of movement of the brush arm 1208 is constant, the contact spring 1220 will make contact with the adjusting screw near the first part of the stroke and contact with the adjusting screw 1229, while the brush arm 1208 raises the full limit of its stroke and returns to break the contact again. Now if the contact screw 1229 is raised, it is apparent that the contact spring 1220 will not contact with said contact screw until the brush arm 1208 has almost finished its upward stroke so that the interval between the time the brush arm leaves the contact spring, completes its stroke and returns to the contact spring to break the contact, is very materially shortened so that the dots and dashes will appear graphically as shown at 1232. This adjustment has the effect of providing a short interval of space 1233 at the front and rear of the shorter dots and dashes 1232. To the ear of the receiving operator, this adjustment has the effect of increasing the space between the elements of the character which in some cases lends clearness to the transmission and provides means for compensating for various line conditions.

This construction of the circuit breaker may be modified, as shown in Fig. 101, wherein the movable parts are mounted on an insulated member 1235 and comprises a block 1236 which is rigidly mounted on the side frame of the transmitting element and insulated therefrom by the insulated member 1235, one end of the block being provided with a yoke 1237 in which a three-prong lever 1238 is pivotally mounted. One arm 1239 of the bell crank lever is adapted for engagement with an adjusting screw 1240 which is carried by a lug 1241 on the side frame, and has a point 1242 adapted for engagement by the point 1243 on the lever arm to complete the circuit when the circuit maker and breaker is actuated. A second arm 1245 of the lever is adapted for engagement by the insulated point 1250 on an arm 1251, which is connected with the circuit maker and breaker brush; the contact arm being yieldingly urged toward its point and the arm 1245 being yieldingly urged toward the brush arm by a spring 1252 which is connected with a third arm 1253 on the lever 1238 and with a post 1254 that is adjustably mounted in a slot 1255 in the block 1236.

As a modification for the circuit maker and breaker heretofore shown, I provide the device shown in Fig. 109, in which the contact spring 1256 is rigidly secured to a block 1257, on the brush shaft by rivets 1258; the block being adjustably clamped on said shaft, so that the spring may be adjusted relative to the contact screw 1259.

As in the other cases, the tension of the spring must be varied, for instance when changing from duplex to quadruplex working, and the method here employed comprises a comparatively stiff piece of sheet metal 1260, having a loop 1261, slidably mounted on the spring 1256, a shank lying along the body of the spring and a laterally turned end member 1292 provided with an adjusting screw 1263 and guide pin 1294, both of which enter the block to provide means for moving the metal piece longitudinally with respect to the spring.

It is apparent that as the loop 1261 is moved forward or back on the spring 1256, that the tension of said spring is measured only by that portion projecting from the loop, so that as the brush rocks to bring the contact spring and screw together, they will meet with a greater or less force.

As a modification of the character member control shown in Figs. 100 and 102 to 104 inclusive, I have provided another means for moving the character member into operative position with the clash gear and which consists in providing a single point escapement which operates to permit the transmitting element to move sufficiently to draw the hook entirely over the trip at one intermission, instead of occupying two steps to accomplish the same result as in the former device.

The advantage of this device is that should the trips or hooks be slightly out of alinement, the hooks in passing over the trips will move a certain predetermined distance and draw the character wheel into functional position, whereas in the other type, the hook is poised at a certain point on the trip during the intermediate step of the intermission and until the clash gear moves into mesh with the character wheel.

More specifically (Figs. 111 to 114 inclusive), this modification of details comprises the bar 1122' similar to the bar 1122 which is pivotally mounted on the rod 1118' and in the slots 1117' in the bearing plate 1116' and which has a hooked end 1123' adapted for engagement by the trips 129 of the storage cylinder and a stud 1124' near the opposite end which is slidably mounted in a slot 1264 of a link 1265 and held yieldingly at one limit of the slot by a coil spring 1266 that connects with the bar 1122' and with a projection 1267 on the link in such a manner that the roller 453" which is revolubly mounted on the link 1265 is yieldingly held in one of the notches 436" in the character wheel to hold the character in normal position.

The links 1265 have extensions 1268 that extend to a point adjacent the cross bar 1010 and are adapted for engagement by a universal bar 1269 which is carried in the free ends of arms 1270 that are rigidly mounted on the torsion shaft 1271.

The torsion shaft 1271 is revolubly mounted in bearings 1272 on the cross frame 1010 and encircling said shaft is a spring 1273 that bears against one of the arms 1270 and against the cross frame to tension the bar 1269 against the link extensions 1268 and further hold the rollers 453" in the notches.

One of the arms 1270 has an extension 1274 which engages the extended arm 1275 of the bell crank lever 1131' the other arm being provided with an adjusting screw 1138' adapted to engage the laterally turned lip 1137' of the bell crank lever 1135', the said lever having an arm 1142' provided with a laterally turned lip 1143' which is yieldingly held in one direction by a coil spring 1139' and which is adapted for engagement by the laterally turned end 1276 of an escapement member 1277 which is fixed on the shaft 1150' and driven from gearing 1153', 1154', 1156' and 1157', the latter meshing with the internal gear 470 of the storage cylinder as heretofore described so that when the transmitting element is revolved with the shaft 123 within the storage cylinder, through driving connection of the gear wheel 1026 with the differential gearing, the escapement gear wheel 1157' will revolve in the internal gear of the cylinder when the escapement member 1277' is free to revolve, but when the lip 1143' of the bell crank lever arm 1142' is moved into the path of the lip 1276 of the escapement member 1277, the escapement gear 1157' locks to the internal gear on the cylinder and causes the transmitting element to be carried in fixed relation to the cylinder.

It is apparent that with this arrangement, the trip 129 in the storage cylinder will engage the hooks 1123' of the bar 1122' and draw the links 1265 downwardly, thereby turning the character wheel by virtue of the roller 453" and notch 436", so that the clash gear 404' will engage the teeth 430' and revolve the character wheel a distance sufficient to transmit one character.

As soon as the character wheel has started to turn under the influence of the clash gear, the roller 453" is lifted from the notch 436" and not only permits the bar 1122' and link 1265 to return to normal position under the influence of spring 1279, which is attached to the extension 1280 of bar 1122' and to the cross bar 1011, but moves the extension 1268 against the universal bar 1269 so as to rock the arm 1270 and move the extension 1274 against the arm 1275 of the bell crank lever 1131', thereby rocking the said lever and moving the bell crank lever 1135' against the tension of the spring 1139' to lock the escapement member 1277'.

In this position, the transmitting element is locked to the storage cylinder and will turn relatively therewith until the character is run out, at which point the roller 453" will drop into the next succeeding pocket and release the escapement.

It has been found, however, that with the above described mechanism, the action is so quick that hook 1123' is moved over the trip 129 so rapidly that instead of moving the character wheel into the clash gear each time, the roller 453" is sometimes thrown out of the notch, causing the character to miss.

In order to obviate this missing and insure a positive action, I have provided means whereby the bar 1122' is held in elevated position after leaving the trip through a yieldable connection between the said bar and the link 1265, so that after the trip has passed and the transmitting element stopped by the escapement, the character wheel may move more slowly and positively into engagement with the clash gear.

The means just referred to for accomplishing this result comprises a universal latch bar 1283 having trunnions 1284 at each end which are pivotally mounted in brackets 1285 or the cross bar 1011.

The latch bar 1283 comprises a piece of sheet metal formed into a V-shaped strip, one leg of which is adapted to lie beneath the inclined arm 1286 of the bar 1122' and the adjacent edge of which is adapted to engage the notched end 1287 of said arm when the bar 1122' is rocked by the trip 129.

Near one end of the latch bar 1283 is a bracket 1288, having a slotted arm 1289 which is adapted to engage a laterally projecting pin 1290 on the arm 1142' of the bell crank lever 1135' so that as the bar 1122' is lowered, the latch bar 1283 is cammed outwardly and moves the arm 1142' into the path of the escapement and at the same time locks against the notched end 1287 to hold the hook 1123' in elevated position.

When in this position, the pin 1124' has moved along the slot 1264 in the link 1265 and tensioned the spring 1266 so that even though the setting of the bar 1122' was very rapid, the link 1265 was acted upon only by the spring 1266 so that the roller 453" is not lifted from the notch 436" but maintains its hold and exerts a circumferential tension on the character wheel equal to the tension of the spring 1266.

In following the movements of this device, it will be noted, Fig. 111, that as soon as a character is finished, the roller 453" drops into a notch 436" in the character wheel, and releases the escapement member 1277.

In Fig. 112, the hook 1123' is shown passing over a trip 129, the latch bar has been rocked on its trunnions and after moving the arm 1142' into the path of the escapement, member 1283 is seated in the notched end 1287 of the bar 1122' to hold the said bar in elevated position and tension the spring 1266.

In Fig. 113 it will be seen that under the influence of the spring 1266, the character wheel has been moved into mesh with the clash gear and that in revolving, the character wheel lifted the roller 453" from the notch 436" and moved the extension 1268 of the link 1265 against the universal bar 1269, thereby rocking the shaft 1271 and the arm extension 1274. The arm extension 1274 engages the arm 1275 of the bell crank lever 1131' which in turn rocks the bell crank lever 1135' and moves the arm 1142' further into the path of the escapement member 1277 and at the same time the pin 1290, operating in the slotted arm 1289, rocks the latch bar 1283 out of engagement with the bar 1122' and permits it to assume its normal position under the influence of the spring 1279. The character wheel continues its revolution until the roller 453' drops into the next succeeding notch 436" and causes the arm 1274 to release the arm 1275 of the bell crank lever 1131' which in turn releases the bell crank 1135' and permits it to recede under the influence of the spring 1139' and unlock the escapement.

It is apparent that with this construction, a close point is eliminated both in the lining up of the trips and in the hooks 1123' because the hooks pass entirely over the stops at each intermittent movement and it is not necessary to have the hooks poised at a certain point on the trips to lock the transmitting element to the storage cylinder.

Operation.

As I have described the operation of the several elements of the transmitter during the description of the mechanical features, I will not repeat the description of operation in detail, except to state that, presuming the parts to be constructed and assembled as described, the operator first connects the motor with a local lighting circuit to wind the operating spring. He then opens the telegraph line by manipulation of the finger piece at the front of the machine, sets the speed control and starts the machine by depressing the start key. The parts are then in position so that the keyboard may be operated at any speed to accumulate the stops in the storage cylinder, so that the stops will trip the relative character members in the transmitting element to transmit these characters to the telegraph line in the proper time and sequence; the number of characters in storage and the rate at which they are transmitted being clearly visible from the indicator dial. If the wrong key is depressed the erase key may be operated to correct the error both in the storage cylinder and indicator, without in any way affecting the transmission of other characters. When the message is complete all or any part of it may be repeated or eliminated by means of the repeat mechanism heretofore described; the indicator showing the amount of matter to be repeated or eliminated, and the transmitting element being returned to normal position in the manner heretofore described.

Having thus described my invention, what I claim as new therein, and desire to secure by Letters-Patent, is:—

1. In a telegraph transmitter, transmitting mechanism, setting mechanism separate from the transmitting mechanism and coöperative therewith to position the transmitting mechanism and means operable independently of the setting mechanism and in successive movements to set one member of the setting mechanism and return another member of the setting mechanism.

2. In combination with transmitting mechanism, setting mechanism for selectively positioning the transmitting mechanism, means movable toward and from the setting mechanism in an irregular path to function and defunction the setting mechanism, and other means operating the transmitting mechanism when the transmitting mechanism is positioned by the setting mechanism.

3. In a telegraph transmitter, transmitting mechanism comprising a circuit closer and separate means for operating the circuit closer, setting mechanism separate from the transmitting mechanism and comprising individual members engageable therewith to position the transmitting mechanism, and means operable upon primary movement to set one member of the setting mechanism in functional position and upon secondary movement to return a different member of the setting mechanism to non-functional position.

4. In a telegraph transmitter, transmitting mechanism comprising a circuit closer and means for operating the same, setting mechanism comprising individually operable members, means for positioning said operating means and a selective actuator operable upon primary movement to set one member of the setting mechanism and upon secondary movement to return a different member of the setting mechanism.

5. In a telegraph transmitter, transmitting mechanism, setting mechanism comprising a plurality of members movable individually to and from functional position, and means operable upon successive movements to move one setting member to functional position and return a previously set member to non-functional position.

6. In a telegraph transmitter, transmitting mechanism, setting mechanism comprising a plurality of members movable individually to and from functional position, and means operable in one direction to move a setting member to functional position and in the opposite direction to return a previously set member to non-functional position.

7. In a telegraph transmitter, transmitting mechanism, including character members, a reciprocatory selecting member, a setting element comprising members movable to and from functional position by the selecting member, and means for advancing the setting element in timed relation to reciprocation of the selecting member, whereby separate setting members are moved to and from functional position respectively upon forward and back movement of the selecting member.

8. In a telegraph transmitter, a transmitting element comprising a character member, a setting element comprising selective members, selecting mechanism for setting members of the setting element, an escapement for the setting element, under control of the selecting mechanism, and means operable at a determined period in the operation of the selecting mechanism prior to return of said mechanism to normal position, for the purpose set forth.

9. In combination with transmitting mechanism, setting mechanism comprising individually operable members, means engageable with said members to set and return different members of the setting mechanism upon successive movements of a single operation of said means and means for effecting advance of the setting mechanism between said movements.

10. In combination with transmitting mechanism, setting mechanism comprising individually operable members, means projectable into the path of a non-functional member of the setting mechanism while the setting mechanism is relatively stationary and movable to set said member to functional position and engageable with a functional member upon a succeeding movement to return said member.

11. In combination with transmitting mechanism, comprising a plurality of individually operable character members, means for setting the character members comprising selectively movable devices and a carrier therefor, means for effecting movement of said setting devices, and an escapement for the carrier under control of and controlling the means for effecting movement of said setting devices.

12. In combination with transmitting mechanism, setting mechanism comprising individually operable members, means projectable into the path of a non-functional member of the setting mechanism while the setting mechanism is relatively stationary and movable to set said member to functional position and engageable with a functional member upon a succeeding movement to return said member, means for urging the setting mechanism forwardly, and escapement operable to release the setting mechanism between periods of engagement of the said projectable means with said members.

13. In combination with transmitting mechanism, comprising a plurality of individually operable character members, means for setting the character members comprising selectively movable devices and a carrier therefor, means for effecting movement of said setting devices, a latch for said means, and an escapement for the carrier operable upon primary movement of said movement effecting means to release the carrier and upon secondary movement thereof to actuate the latch.

14. In a telegraph transmitter, a transmitting element comprising character mechanism, a setting element comprising means for setting the character mechanism, one of said elements being movable relative to the other, key mechanism for effecting actuation of the setting means, and an escapement for said movable element operable from said key mechanism upon primary movement of said mechanism and controlling secondary movement of said key mechanism.

15. In combination with transmitting mechanism, setting mechanism comprising individually operable members, means projectable into the path of a non-functional member of the setting mechanism while the setting mechanism is relatively stationary and movable to set said member to functional position and engageable with a functional member upon a succeeding movement to return said member, means for urging the setting mechanism forwardly, and escapement operable to simultaneously release the setting mechanism and projectable means.

16. In combination with transmitting mechanism, setting mechanism comprising individually operable members, means projectable into the path of a non-functional member of the setting mechanism while the setting mechanism is relatively stationary and movable to set said member to functional position and engageable with a functional member upon a succeeding movement to return said member, means for urging the setting mechanism forwardly, escapement operable to release the setting mechanism, key mechanism controlling both the projectable means and the escapement, a latch for holding the key mechanism while the setting mechanism is advanced, and means operable from said urging means to release the key mechanism.

17. In a telegraph transmitter a transmitting element comprising a character member, a movable setting element comprising trip mechanism, an escapement for holding the setting element, key mechanism for actuating the trip mechanism and releasing the escapement, and means for preventing return of the key mechanism between the trip actuating and escapement releasing periods.

18. In a telegraph transmitter a transmitting element comprising a character member, a movable setting element comprising trip mechanism, an escapement for holding the setting element, key mechanism for actuating the trip mechanism and releasing the escapement, means for holding the key mechanism to prevent return of the key mechanism between the trip actuating and escapement releasing periods, and means operable by the escapement for actuating said holding means to release the key mechanism.

19. In a telegraph transmitter a transmitting element comprising a character member and positioning device, a setting element comprising trip mechanism for actuating the positioning device, means for urging the setting element forward, an escapement for the setting element, and means controlled by the escapement for setting said trip mechanism.

20. In a telegraph transmitter a transmitting element comprising a plurality of independently operable character members, a positioning device for each character member, a movable setting element having individual trip mechanism for each positioning device, means for actuating the setting element, an individual key for the setting mechanism for each individual character member, and an escapement controlling the actuation of the setting element and all of said keys.

21. In a telegraph transmitter a transmitting element comprising a plurality of individual character members, a positioning device for each character member, a movable setting element, individual trips in the setting element for actuating each of the positioning devices, separate means for setting the trips for the several character members, an escapement controlling movement of the setting element, key mechanism for first actuating the setting means and then releasing the escapement, a latch for holding the key mechanism after the actuation of a trip, and means operable by the escapement for shifting the latch to release the key mechanism.

22. In a telegraph transmitter a transmitting element, comprising a character member and a positioning device, a movable setting element comprising a trip for the positioning device, means for setting the trip in position for engaging the local setting device, an escapement for the setting element comprising a movable latch, a key lever, means operable by initial movement of the key lever for actuating the trip setting means, and means operable by the further movement of the key lever for rocking the escapement latch.

23. In a telegraph transmitter a transmitting element comprising a character member and a positioning device, a movable setting element comprising a trip, a selecting member for actuating the trip, a key lever, means operatively connecting the key lever with the selecting member, an escapement for controlling movement of the setting element, means operable by the lever for releasing the said escapement, and means for preventing retrograde movement of the key lever prior to the actuation of the escapement.

24. In a telegraph transmitter a transmitting element comprising a plurality of individual character members, each having a positioning device, a movable setting element comprising a tripping mechanism for each positioning device, an individual selecting member for each tripping mechanism, a key lever for actuating each individual selecting member, an escapement for controlling movement of the setting element, means operable by any of the key levers for releasing the escapement, and a keeper for preventing return of any key lever between its actuation of a selecting member and release of the escapement.

25. In a telegraph transmitter a transmitting element comprising a plurality of individual character members, each having a positioning device, a movable setting element comprising a tripping mechanism for each positioning device, an individual selecting member for each tripping mechanism, a key lever for actuating each individual selecting member, an escapement for controlling movement of the setting element, means operable by any of the key levers for releasing the escapement, a keeper for holding any depressed key lever, and means for releasing the keeper following the release of the escapement.

26. In a telegraph transmitter a transmitting element comprising a plurality of individual character members, each having a positioning device, a movable setting element comprising trip mechanism for each positioning device, an individual selecting member for each trip mechanism, an individual key lever for each selecting member, an escapement for controlling movement of the setting element, a rod arranged transversely of the key levers and adapted for actuation upon the actuation of any of said levers, means operable by the rod for releasing the escapement, a keeper for preventing premature return of any active key lever, and means operable upon movement of the setting element for shifting said keeper to release a held key lever.

27. In a telegraph transmitter a transmitting element comprising a plurality of individual character members, each having a positioning device, a movable setting element comprising a series of individually operable trips for actuating a relative positioning device, a selecting member for each series of trips, a key lever for each character lever, a movable hammer for each selecting member, a spring connecting each hammer with its key lever whereby the hammer is actuated upon initial movement of the key lever, an escapement for controlling movement of the setting element and means operable by continued movement of the key lever for actuating the escapement.

28. In a telegraph transmitter a transmitting element comprising a plurality of individual character members, each having a positioning device, a movable setting element comprising a series of individually operable trips for actuating a relative positioning device, a selecting member for each series of trips, a key lever for each character member having a slot therein, a hammer for each selecting member having an ear projected loosely in said slot, a spring connecting each hammer with its key lever, whereby initial movement of the key lever actuates the hammer through the spring and continued movement of the lever leaves the hammer unaffected, an escapement for controlling movement of the setting element and means operable by continued movement of the key lever for releasing the escapement.

29. In a telegraph transmitter a transmitting element comprising a plurality of individual character members, each having a positioning device, a movable setting element comprising a series of individually operable trips for actuating a relative positioning device, a selective member for each series of trips, a key lever for each character member, means operable by the key levers for actuating relative selecting members, a hook on each key lever, a latch for automatically engaging the hook on any depressed key lever following actuation of a selecting member, and means operable by the moving setting element for actuating said latch to release the key lever.

30. In a telegraph transmitter a transmitting element comprising a plurality of individual character members, each having a positioning device, a movable setting element comprising a series of individually operable trips for actuating a relative positioning device, a selecting member for each series of trips, a key lever for each key member, means operable by each key lever for actuating a relative selecting member, a shaft extending beneath the key levers, a rod pivotally mounted on said shaft and adapted for actuation by an active key lever, means for yieldingly tensioning the rod to initial position, a lever pivotally mounted on the shaft and adapted for actuation upon depression of the rod, an escapement for controlling movement of the setting element, connection between the lever and escapement whereby the escapement is released upon depression of the rod, and yielding means for returning each key lever to initial position.

31. In a telegraph transmitter a transmitting element comprising a character member, a positioning device, a movable setting element comprising a trip, a pivotally mounted frame, a slide in said frame, yielding means for retaining the slide in initial position, means for actuating the setting element and frame, an escapement for controlling such actuation, and key mechanism for first setting the slide and then releasing the escapement.

32. In a telegraph transmitter a transmitting element comprising a character member, a positioning device, a movable setting element comprising a trip, a pivotally mounted frame, a cam for actuating the frame, a slide in said frame, an escapement controlling the actuation of the setting element and cam, and key mechanism for setting the slide and releasing the escapement.

33. In a telegraph transmitter a transmitting element comprising a character member and positioning device, a movable setting element comprising a trip for actuating the positioning device, a frame, a cam shaft, a cam on said shaft operatively connected with said frame, driving mechanism operably connected with the movable setting element and with the cam shaft, an escapement for controlling the driving mechanism, and key mechanism for actuating the setting member and releasing the escapement.

34. In a telegraph transmitter a transmitting element comprising a character member and positioning device, a movable setting element comprising a trip for actuating the positioning device, a selecting member for setting the trip, a cam shaft, an eccentrically mounted cam member, a cam member on the cam shaft for actuating the eccentrically mounted member, connection between said member and the frame, a driver for the movable setting element and the cam shaft, an escapement for controlling said driver, and key mechanism for actuating the selecting member and releasing said escapement.

35. In a telegraph transmitter a transmitting element comprising a character member and positioning device, a movable setting element comprising a trip for actuating the positioning device, a selecting member for setting the trip, a cam shaft, an eccentrically mounted cam member, a cam member on the cam shaft for actuating the eccentrically mounted member, connection between said member and the frame, a driver for the movable setting element and the cam shaft, an escapement for controlling said driver, key mechanism for actuating the selecting member and releasing said escapement, a keeper for the key mechanism, and means operable by the eccentric member for actuating said keeper.

36. In a telegraph transmitter a transmitting element comprising a character member and positioning device, a movable setting element comprising a trip for actuating the positioning device, a selecting member for setting the trip, a cam shaft, a ring cam eccentrically mounted and having inturned teeth, a star cam on the shaft for engaging said teeth to actuate the ring, connection between the ring and frame, means for actuating the setting element and cam shaft, an escapement mechanism for controlling the driver, and key mechanism for actuating the selecting member and releasing the escapement.

37. In a telegraph transmitter, a transmitting element comprising a character member and positioning device, a movable positioning element comprising a trip for actuating the setting device, a frame, an escapement shaft, operative connection between the escapement shaft and setting element, a driver operatively connected with the setting element, a cam shaft operatively connected with the escapement shaft, a cam operable from the cam shaft and connected with the frame, key mechanism for actuating the trip, and a latch for the key mechanism operable by the escapement for releasing the key mechanism upon actuation of the escapement.

38. In a telegraph transmitter, a transmitting element comprising a character member and positioning device, a movable setting element comprising a trip for actuating the positioning device, a frame, an escapement shaft, operative connection between the escapement shaft and setting element, a driver operatively connected with the setting element, a cam shaft operable from the escapement shaft and connected with the frame, an escapement cam on the escapement shaft, a yoke having facing latch teeth for successively engaging the escapement cam, rocking support for the yoke, and key mechanism for actuating the setting mechanism and escapement yoke.

39. In a telegraph transmitter a transmitting element comprising a character member and positioning device, a setting element comprising a trip, a setting frame mounted for independent movement on a short and a long radius in the direction of the setting element, means for actuating the setting element and frame, escapement mechanism for controlling movement of the setting element, a selecting member in the frame, and key mechanism for actuating said member and releasing the escapement.

40. In a telegraph transmitter, a transmitting element comprising a character member and positioning device, a setting element comprising trips, a pivotally mounted frame support, a frame pivotally mounted in said support, a selecting member in said frame, key mechanism for actuating the selecting member, means for actuating the setting element, the frame and the frame support whereby initial movement of said means moves the frame to induce engagement of the selecting member with a trip in the setting element and ultimate forward movement of said means moves the frame away from the setting element.

41. In a telegraph transmitter, a transmitting element comprising a character member and positioning device, a setting element comprising trips, a pivotally mounted frame support, a frame pivotally mounted in said support, a selecting member in said frame, key mechanism for actuating the selecting member, means for actuating the setting element, the frame and the frame support, whereby initial movement of said means moves the frame to induce engagement of the selecting member with a trip in the setting element and ultimate forward movement of said means moves the frame away from the setting element, and an escapement for controlling the movement of the selecting parts.

42. In a telegraph transmitter a transmitting element comprising individual character members having positioning devices, a movable setting element having a series of trips for each positioning device, a frame having a selecting member for each series of trips, key mechanism for setting the selecting members, and means for actuating the frames to induce setting engagement of the selecting members with the trips during the primary movement and resetting engagement with other trips on return movement of the frame.

43. In a telegraph transmitter a transmitting element comprising a plurality of individual character members, each having a positioning device, a movable setting element comprising a series of individual trips for each positioning device, a movable frame, a selecting member in the frame for each series of trips, selective means for setting the selecting member, means for actuating the frame to functional position and returning the frame to initial position, and means for moving the setting element intermediate the movement of the frame to effect setting of a trip on one movement and return of another trip on the other movement of the frame.

44. In a telegraph transmitter a transmitting element comprising individual character members, each having a positioning device, a movable setting element, having a series of trips for each positioning device, a frame having an offset pivotal mounting, slides in said frame, key mechanism for advancing the slides, means for limiting the advance of the slides to locate their base ends in the extended axis of the frame mounting, a driver operatively connected with the setting element and frame to induce setting engagement of a slide and trip on a primary movement and resetting engagement of a slide with a different trip on a secondary movement of the frame.

45. In a telegraph transmitter a transmitting element comprising a plurality of individual character members, each having a positioning device, a movable setting element comprising a series of trips for each positioning device, a movable frame, members in said frame for setting selected trips and returning other trips to initial position, means for actuating the setting element and frame, an escapement for controlling such actuation, and key mechanism for setting the selected trip setting members and releasing the escapement.

46. In combination with transmitting mechanism, setting mechanism comprising individually operable members, actuators projectable into the path of said members, and a carrier for the actuators movable on a short radius to actuate said members and on a long radius to carry said members from and into said path.

47. In combination with transmitting mechanism, setting mechanism comprising individually operable members, actuators projectable into the path of said members, a carrier movable on a short radius at one limit of its movement to actuate said members and on a long radius at the opposite limit of its movement to carry said members from and into said path.

48. In combination with transmitting mechanism, setting mechanism comprising individually operable members, actuators projectable into the path of said members, a carrier movable on a short radius at one limit of its movement to actuate said members and on a long radius at the opposite limit of its movement to carry said members from and into said path, and means for advancing said setting mechanism during the interval between the short radius movements.

49. In combination with transmitting mechanism, setting mechanism comprising individually operable members, actuators projectable into the path of said members, a carrier movable on a short radius at one limit of its movement to set said actuators and on a long radius at the opposite limit of its travel to carry said actuators from and into said path, means for advancing said setting mechanism during the interval between the short radius movements, key mechanism comprising members for projecting said actuators, an escapement for the setting mechanism, and means operable by the key mechanism for actuating the escapement.

50. In a telegraph transmitter a transmitting element comprising a character member and a positioning device, a movable setting element comprising a trip for the positioning device, a pivotally mounted bearing, a frame pivotally mounted on the bearing on a short radius relative to the bearing mounting, a lever fixed to the frame, a plate adapted for engagement by the lever, means for actuating said lever to first rock the frame and then rock the bearing, a selecting member in the frame, and key mechanism controlling the setting of the selecting member and actuation of said lever.

51. In a telegraph transmitter, a transmitting element comprising a character member and a positioning device, a movable setting element comprising a trip for the positioning device, a pivotally mounted bearing, a frame pivotally mounted on the bearing on a short radius relative to the bearing mounting, a lever fixed to the frame, a stop on the bearing for engagement by the lever, cam mechanism, operatively connected with the lever, means for actuating the cam mechanism, a selecting member in the frame, and key mechanism for setting the selecting member and controlling actuation of the cam mechanism.

52. In a telegraph transmitter a transmitting element comprising a character member and a positioning device, a movable setting element comprising a trip for the positioning device, a pivotally mounted bearing, a frame pivotally mounted on the bearing on a short radius relative to the bearing mounting, a lever fixed to the frame, a stop on the bearing adapted for engagement by the lever when the latter is moved in either direction and whereby the frame is moved independently on the short and long radii, cam mechanism for actuating the lever, an escapement controlling the cam mechanism, a selecting member in the frame, and a key lever for actuating the selecting member and releasing the escapement.

53. In a telegraph transmitter a transmitting element comprising a character member and a positioning device, a movable setting element comprising a trip for the positioning device, a pivotally mounted bearing, a frame pivotally mounted on the bearing on a short radius relative to the bearing mounting, a lever fixed to the frame, a plate on said bearing adapted for engagement by the lever, means for actuating said lever to first rock the frame and then engage the plate to rock the bearing, a selecting member in the frame, key mechanism controlling the setting of the selecting member and actuation of said lever, and a latch for holding the plate at either limit of its travel.

54. In a telegraph transmitter a transmitting element comprising a character member and a positioning device, a movable setting element comprising a trip for the positioning device, a pivotally mounted bearing, a frame pivotally mounted on the bearing on a short radius relative to the bearing mounting, a lever fixed to the frame, a plate on said bearing adapted for engagement by the lever, means for actuating said lever to first rock the frame and then engage the plate to rock the bearing, a selecting member in the frame, key mechanism controlling the setting of the selecting member and actuation of said lever, and a latch for holding the plate at either limit of its travel comprising a pivotally mounted member, a wedge block and cone button, one on the plate and the other on the latch, and means for yieldingly urging the latch toward the plate.

55. In a telegraph transmitter a transmitting element comprising a character member and a positioning device, a movable setting element comprising a trip for the positioning device, a pivotally mounted bearing, a frame pivotally mounted on the bearing on a short radius relative to the bearing mounting, a lever fixed to the frame, a plate on said bearing adapted for engagement by the lever, means for actuating said lever to first rock the frame and then engage the plate to rock the bearing, a selecting member in the frame, key mechanism controlling the setting of the selecting member and actuation of said lever, a pivoted latch plate, means for urging the latch plate toward the bearing plate, a wedge block adjustably mounted on the latch plate, and a cone button on the bearing plate adapted for engagement with the wedge block.

56. In a telegraph transmitter a transmitting element comprising a character member and a positioning device, a movable setting element comprising a trip for the positioning device, a pivotally mounted bearing, a frame pivotally mounted on the bearing on a short radius relative to the bearing mounting, a lever fixed to the frame, a plate on said bearing adapted for engagement by the lever, means for actuating said lever to first rock the frame and then engage the plate to rock the bearing, a selecting member in the frame, key mechanism controlling the setting of the selecting member and actuation of said lever, a pivoted latch plate, means for urging the latch plate toward the bearing plate, means on the latch plate for limiting forward movement of the bearing plate, a wedge block adjustably mounted on the latch plate, and a cone button on the bearing plate adapted for engagement with the wedge block.

57. In a telegraph transmitter a transmitting element comprising character members and positioning devices, a movable setting element comprising trips for said positioning devices, a slide frame, slides in said frame, hammers for setting the slides, a cam, a yoke connected with the slide frame, a block pivotally mounted in said yoke, a rod pivotally mounted on the cam and slidably projected through the yoke block, lock nuts on the rod for holding the same to the block, a spring interposed between the lock and cam, an escapement for controlling movement of the setting element and cam, and key mechanism for actuating the slide hammers and releasing the escapement.

58. In a telegraph transmitter a transmitting element comprising character members and positioning devices, a movable setting element comprising trips for the positioning devices, a pivotally mounted bearing, a trip setting element pivotally mounted in said bearing, a plate having pin and slot adjustment on the bearing, a lever fixed to the trip setting devices, stop members on the plate for engagement by the lever at either limit of its travel, latch mechanism for the plate, means for actuating the setting element and lever, an escapement for said actuating means, and key mechanism for influencing the setting element and controlling the escapement.

59. In a telegraph transmitter a transmitting element comprising character members, a setting element comprising trips for positioning character members, means for actuating the setting element, an escapement for controlling such actuation, a plurality of levers for selectively actuating the trips, a crossbar for actuation by any of the key levers, a dash pot operable by the crossbar, and means operable by the crossbar for releasing the escapement.

60. In a telegraph transmitter, character mechanism, a setting element movable relative to the character mechanism and comprising individual members, means movable forwardly and back in a fixed path to function the individual setting members, and erase mechanism operable on the functioning means to vary the path of said means and effect defunctioning of previously functioned setting members.

61. In a telegraph transmitter, character mechanism, a setting element movable relative to the character mechanism and comprising individual members, means movable forwardly and back in a fixed path to function and defunction the individual setting members, and erase mechanism operable on the functioning means to vary the path of said means and effect defunctioning of previously functioned setting members.

62. In a telegraph transmitter, character mechanism, a setting element, comprising individual members for selectively setting the character mechanism, operable means for positioning the members of the setting element, power driven means for actuating both the setting element and said operable means, and means for conditioning said operable means to effect selective setting of members of the setting element.

63. In a telegraph transmitter, character mechanism, a setting element movable relative to the character mechanism and comprising individual members, mechanism for setting said members, including a frame and a plurality of normally inoperative selecting devices, means for selectively shifting said devices to operative position, and driving mechanism for actuating the setting element and said setting mechanism.

64. In a telegraph transmitter, character mechanism, a setting element, comprising individual members for selectively positioning the character mechanism, operable means for setting the members of the setting element, power driven means for actuating both the setting element and said operable means, means for conditioning said operable means to effect selective setting of members of the setting element and erase mechanism operable to effect reverse travel of the driving mechanism.

65. In a telegraph transmitter, character mechanism, a setting element movable relative to the character mechanism and comprising individual members, mechanism for setting said members, including a frame and a plurality of normally inoperative setting devices, means for selectively shifting said devices to operative position, driving mechanism for actuating the setting element and said setting mechanism, an escapement controlling said driving mechanism, and erase mechanism operable to effect reverse travel of the driving mechanism and vary the path of travel of the setting mechanism.

66. In a telegraph transmitter a transmitting element comprising character members and positioning devices, a setting element comprising a rotatable member having individual trips for actuating relative positioning devices, transmission operatively connected with the setting element comprising an escapement cam and shaft, a ratchet in fixed relation to the cam shaft, an erase key lever having a pawl for engaging the ratchet, and means for normally retaining the pawl out of engagement with the ratchet.

67. In a telegraph transmitter a transmitting element comprising character members and positioning devices, a movable setting element comprising trips for the positioning devices, means for setting said trips and mechanism for resetting the trips, and a cut-out device for rendering the resetting mechanism inoperative when the transmitting element is in a predetermined position.

68. In a telegraph transmitter a transmitting element comprising character members and positioning devices, a movable setting element comprising trips for the positioning devices, means for setting said trips and mechanism for resetting the trips, a cut-out device for rendering the resetting mechanism inoperative when the setting element is in a predetermined position, and means operable by the transmitting element for actuating the cut-out device.

69. In a telegraph transmitter a transmitting element comprising character members, a setting element comprising trips for relative character members, means for controlling actuation of the setting element comprising a ratchet wheel, pawl mechanism for actuating the ratchet wheel to reverse the setting element, a lever for holding the pawl out of contact with the ratchet wheel, and means operable by the transmitting element for actuating said lever.

70. In a telegraph transmitter a transmitting element comprising character members, a setting element comprising trips for relative character members, means for controlling actuation of the setting element comprising a ratchet wheel, pawl mechanism for actuating the ratchet wheel to reverse the setting element, a lever for holding the pawl out of contact with the ratchet wheel, a cam movable with the transmitting element, and a slide operable by the cam for actuating said lever.

71. In a telegraph transmitter, character mechanism, a setting element comprising individual setting members, means movable relative to the setting element to shift the individual members to and from functional position, a driven member for actuating said means, a driving member operable to forward the driven member upon either forward or back movement, transmission operatively connected with the driving member and with the setting element, an escapement for the transmission, key mechanism for releasing the escapement and setting the shifting means, and erase key mechanism for reversing movement of the transmission to effect movement of the setting members from functional position.

72. In a telegraph transmitter a transmitting element comprising character members, a setting element comprising trips for relative character members, means for controlling actuation of the setting element comprising a ratchet wheel, pawl mechanism for actuating the ratchet wheel to reverse the setting element, a lever for holding the pawl out of contact with the ratchet wheel, a cam adjustably connected with the transmitting element, and a slide yieldingly tensioned toward the cam and connected with the lever to actuate the lever at a determined position relative to the travel of the transmitting element.

73. In a telegraph transmitter a transmitting element comprising character members, a movable setting element comprising individual trips for setting the character members, means movable on a short radius and on a long radius for setting said trips, stop mechanism for limiting the travel of said means, and erase mechanism comprising means for actuating the setting means and for lengthening the long radius travel thereof.

74. In a telegraph transmitter a transmitting element comprising character members, a movable setting element comprising individual trips for relative character members, an escapement for controlling movement of the setting element, selecting devices adapted for engaging the trips in one direction to set the same and for engagement therewith in the opposite direction to reset the same, key mechanism for inducing reverse travel of the setting element, and means operable by the said key mechanism for lengthening travel of the selecting devices for the erase operation.

75. In a telegraph transmitter a transmitting element comprising character members, a movable setting element comprising trips for relative character members, a selecting mechanism having axial movement and movement toward and from the setting element, and means for actuating the selecting mechanism to first set the trip and then reset a different trip, means for increasing the travel of the selecting mechanism toward and from the setting element, and means for inducing the increased travel of the selecting mechanism and for actuating said mechanism to erase the said mechanism.

76. In a telegraph transmitter a transmitting element comprising character members, a setting element comprising trips for positioning character members and selecting mechanism for the trips, an escapement controlling movement of the setting element, key mechanism for actuating the selecting mechanism and a separate erase key mechanism for actuating the selecting mechanism and reversing travel of the setting element to reset a trip to normal position.

77. In a telegraph transmitter a transmitting element comprising character members, a movable setting element and means for actuating said setting element, an escapement for controlling such actuation, a pivotally mounted bearing, selecting mechanism pivotally mounted in said bearing to provide movement of the selecting mechanism on a short radius and on a long radius, a stop plate on the bearing, a latch for limiting movement of the plate to a short or long travel, means for holding the latch to normally limit movement of the bearing to its short travel, a lever fixed to the key mechanism and adapted for engagement with the plate to fix the short radius movement and induce the long radius movement, key mechanism for releasing the escapement and key mechanism for setting the selecting mechanism and releasing the escapement, an erase key mechanism for adjusting the latch to permit the increased travel of said bearing, and means operable by the erase key mechanism for reversing travel of the setting element.

78. In a telegraph transmitter a transmitting element comprising character members, a movable setting element comprising trips for positioning the character members, a rotatable bearing, selecting mechanism pivotally mounted in the bearing, a plate on said bearing provided with a tooth and with stop members, a lever on said selecting mechanism for engaging the plate stops to rock the plate and selecting mechanism on the bearing mounting, a latch for limiting travel of the plate in a short path or in a long path, means for normally retaining the latch in position for inducing short travel of the plate, a slide adapted for engagement with the plate tooth, and erase key mechanism operable by the erase key for reversing travel of the setting element and actuating said slide and latch to induce travel of the plate through the long path.

79. In a telegraph transmitter a transmitting element comprising character members, a movable setting element comprising trips for positioning the character members, a rotatable bearing, selecting mechanism pivotally mounted in the bearing, a plate on said bearing provided with a tooth and with stop members, a lever on said selecting mechanism for engaging the plate stops to rock the plate and selecting mechanism on the bearing mounting, a latch having stepped stops for limiting travel of the plate, a tooth on said plate adapted for engagement with said stops, means for yieldingly holding the latch to limit travel of the plate to the short path, a slide having a slot into which the plate tooth is projected, a post on the slide for engaging the latch, a slide rod adapted for engaging the slide, an erase key, means operable by the erase key for reversing the setting element, and a spring plunger on the erase key for actuating said rod to forward the slide and rock the latch plate.

80. In a telegraph transmitter a transmitting element comprising character members, a movable setting element comprising trips for positioning the character members, a rotatable bearing, selecting mechanism pivotally mounted in the bearing, a plate on said bearing provided with a tooth and with stop members, a lever on said selecting mechanism for engaging the plate stops to rock the plate and selecting mechanism on the bearing mounting, a latch having stepped stops for limiting travel of the plate, a tooth on said plate adapted for engagement with said stops, means for yieldingly holding the latch to limit travel of the plate to the short path, a slide having a slot into which the plate tooth is projected, a post on the slide for engaging the latch, a slide rod adapted for engaging the slide, an erase key, means operable by the erase key for reversing the setting element, a spring plunger on the erase key for actuating said rod to forward the slide and rock the latch plate, and an inclined bearing for tensioning the plunger.

81. In a telegraph transmitter a transmitting element comprising character members, a movable setting element comprising trips for positioning the character members, a rotatable bearing, selecting mechanism pivotally mounted in the bearing, a plate on said bearing provided with a tooth and with stop members, a lever on said selecting mechanism for engaging the plate stops to rock the plate and selecting mechanism on the bearing mounting, a latch having stepped stops for limiting travel of the plate, a tooth on said plate adapted for engagement with said stops, means for yieldingly holding the latch to limit travel of the plate to the short path, a slide having a slot into which the plate tooth is projected, a post on the slide for engaging the latch, a slide rod adapted for engaging the slide, an erase key, means operable by the erase key for reversing the setting element, a plunger housing pivotally mounted on the erase key lever, a plunger yieldingly mounted in said housing and adapted to engage said slide rod, an inclined plate for tensioning the plunger prior to its engagement with the slide rod, and a stop for limiting the pivotal movement of the plunger housing.

82. In a telegraph transmitter, a transmitting element comprising character members, a movable setting element comprising trips for positioning the character members, a rotatable bearing, selecting mechanism pivotally mounted in the bearing, a plate on said bearing provided with a tooth and with stop members, a lever on said selecting mechanism for engaging the plate stops to rock the rotatable bearing and the selecting mechanism on the said bearing to provide a long path and a short path for said selecting mechanism, a latch having stepped stops for limiting movement of the plate, a tooth on said plate adapted for engagement with said stops, means for yieldingly holding the latch to limit movement of the plate to the short path of said selecting mechanism, a slide having a slot into which the plate tooth is projected, a post on the slide for engaging the latch, a slide rod adapted for engaging the slide, the slide rod having flat faces, an erase key, a plunger on said key and a guide member engaging one of the flat faces of said slide rod to hold the other in position for engagement by the plunger.

83. In a telegraph transmitter, a transmitting element comprising character members, a movable setting element comprising trips for positioning the character members, a rotatable bearing, selecting mechanism pivotally mounted in the bearing, a plate on said bearing provided with a tooth and with stop members, a lever on said selecting mechanism for engaging the rotatable bearing stops to rock the plate and the selecting mechanism on the said bearing to provide a long path and a short path for said selecting mechanism, a latch having stepped stops for limiting movement of the plate, a tooth on said plate adapted for engagement with said stops, means for yieldingly holding the latch to limit movement of the plate to the short path, a slide for actuating said latch, an erase key lever comprising a primary member and an extension, a stop for the primary member for limiting the movement of the extension upon actuation of the primary member, a plunger housing pivotally mounted on the extension, and a plunger in said housing for actuating the slide.

84. The combination with a series of circular character members of various diameters having stationary offset axial supports to provide peripheral meeting points with a common transverse plane and means coöperative with said character members to produce telegraphic characters.

85. In a telegraph transmitter, a series of independently operable character members each having a plurality of like character sections separated by intervening spaces, the character sections on the different members being variant, and all of the intervening spaces equal, and common means for actuating all of said members.

86. In a telegraph transmitter, a plurality of character members rotatable on fixed axes and comprising spaced character and gear sections, a clash gear normally located between gear sections of said character members and means for shifting one of the rotatable members to establish driving relation of the clash gear with a gear section of a character member.

87. In a telegraph transmitter a plurality of character wheels of variable diameter rotatably mounted on fixed axes, and having peripheral points in the same transverse plane, each wheel having equally spaced character sections and corresponding gear sections, a clash gear normally projected into spaces between gear sections on the character members to rotate idly relative to the character members, and means for advancing the character members to throw gear sections thereof into mesh with the clash gear.

88. In a telegraph transmitter, a plurality of character wheels of variable diameter rotatably mounted on fixed axes and having peripheral points in the same transverse plane, each wheel having equally spaced character sections and corresponding gear sections, a clash gear rotatable on a fixed axis and normally projected into spaces between gear sections on the character members to rotate idly relative to the character members, and means normally retaining each character member in fixed relation to the clash gear but operable to advance its member to effect driving relation between a gear section and the clash gear.

89. In a telegraph transmitter, transmitting and setting elements, both mounted for rotation independently of each other and on a common center, common means for driving the transmitting and setting elements, a governor for controlling the speed of travel of the transmitting element, a plurality of individual character members, means operable by the transmitting element driving mechanism for actuating said character members, and means operable from the governor for connecting the character member driving means with the transmitting driving mechanism when the parts have attained a predetermined speed.

90. In a telegraph transmitter, a plurality of independent character members of different diameter, each comprising a driving portion having gear tooth sections equally spaced on its periphery, a clash gear for engagement by the gear sections on all of the character members, stop mechanism for retaining the gear sections on the character members in determined position relative to the clash gear, and means for actuating the stop mechanism to initially rotate the character members and induce engagement of the gear sections with the clash gear.

91. In a telegraph transmitter a plurality of character members, each comprising a character and a gear portion, the character portion having character sections spaced equally on its periphery and the gear portion having toothed sections spaced equally to the spacing on the character portion, a clash gear, and stop mechanism for holding the character member in determined position and initially actuating the same to induce engagement of the toothed sections with the clash gear.

92. In a telegraph transmitter a plurality of independently operable character wheels having a common tangential plane and each having a number of equally spaced sets of character teeth on its periphery, a clash gear, spaced gear sections on the character members corresponding in extent to the character sections thereon, and yielding means for retaining the character members in set position and for moving the character members into operative engagement with the clash gear.

93. In a telegraph transmitter a character member having peripheral character sections and stop portions, means for actuating the character member for periods relative to the character sections, and a yielding stop member for holding the character member in set position and initially shifting said member to effect driving relation thereof with said actuating means.

94. In a telegraph transmitter a character member having peripheral character sections and stop pockets, means for actuating the character member for periods relative to the character sections, a stop adapted to seat in said pockets to hold the character member in set position, and mechanism for actuating the stop to initially move the character member.

95. In a telegraph transmitter, a character member comprising a disk having equally spaced gear teeth sections on its periphery, a ring spaced from the disk and having character tooth sections on its periphery of extent and spacing equal to the extent and spacing of the gear teeth and having its inner periphery divided into equally spaced pocket and rail portions, stop mechanism comprising a yielding link having a roller adapted to seat in said pockets and travel on said rails, and means for actuating the link to initially rotate the character member.

96. In a telegraph transmitter a plurality of paired frame bars, having end support, character members having axial mounting in the frame members and each comprising peripheral character and gear tooth sections, a clash gear, stop mechanism for each of the character members, a lever adapted for holding the character member in set position, and means for actuating the lever to initially rotate the character member.

97. In a telegraph transmitter transmitting and setting elements, both mounted for rotation independently of each other and on a common center, common means for driving the transmitting and setting elements, a governor in the transmitting element for controlling the speed of travel of both elements, a plurality of individual character members, means operable by said driving means for actuating said character members, and means operable from the governor for connecting the character member driving means with said driving means when the parts have attained a predetermined speed.

98. In a telegraph transmitter a setting element, transmission for actuating the setting element, a transmitting element revolubly mounted within the setting element and having a clutch shaft in constant operative connection with said transmission, character members, means for actuating selected character members, a clutch gear wheel for driving said means, a shaft gear wheel adapted for driving engagement with the clutch gear wheel, means for yieldingly urging the shaft wheel toward its coöperative member, governor mechanism for controlling the speed of the transmission, and stop mechanism releasable by the governor for normally holding the shifting gear wheel against the tension of its spring.

99. In a telegraph transmitter a setting element, transmission for actuating the setting element, a transmission frame revolubly mounted within the setting element and having a clutch shaft in constant operative connection with said transmission, character members, means for actuating selected character members, a clutch gear wheel for driving said means, a shaft gear wheel adapted, for driving engagement with the clutch gear wheel, means for yieldingly urging the shaft wheel toward its coöperative member, a governor for controlling speed of the transmission and comprising an extended shaft and a brake member slidable on the shaft, a collar slidable on the shaft and arranged for abutment with the brake member to limit its sliding movement, and lever mechanism operably connected with the shifting gear wheel and said collar, whereby movement of the brake member in one direction will move the shaft gear wheel against the tension of its spring and movement in the opposite direction will permit movement of said gear wheel by the spring.

100. In a telegraph transmitter a setting element, a transmission for driving the setting element, a transmitting element frame rotatable concentric with and independently of the setting element, character members in said frame, means on the frame for actuating selected character members, a shaft rotatably mounted in said frame and operatively connected with the transmission, a collar rotatably mounted on the shaft, clutch mechanism on the shaft and collar, a gear wheel rotatable on the collar and operatively connected with the character member driving mechanism, a clutch on said gear wheel, a gear wheel slidably keyed on the collar and having a clutch face for engagement with the clutch on the rotatable gear wheel, a spring for normally urging the keyed gear wheel toward its coöperating member, a governor comprising an extended shaft, an intermediate shaft having members thereon operably connecting the keyed gear wheel with the governor shaft, a governor on the governor shaft and comprising a sliding brake member, a collar on the governor shaft adapted for abutment against the sliding brake member, a lever mechanism connecting said collar with the keyed gear wheel whereby the gear wheel is moved in one direction against the tension of its spring by engagement of the governor brake member with the sliding collar and the collar moved in the opposite direction by the spring when the governor slide moves away from the collar.

101. In a telegraph transmitter a setting element, a transmitting element comprising a rotatable frame, character members in said frame, means for driving selected character members comprising a clutch, a governor for controlling the speed of the transmitting and setting elements, an escapement for controlling travel of the moving parts, and a clutch in the character member driving mechanism controlled by the governor whereby the character members have continued operation under momentum of the governor after the escapement has stopped the travel of the setting element.

102. In a telegraph transmitter setting and transmitting elements, transmission for actuating said elements, character members in the transmitting element, means operable by the transmission for driving the character members, and a governor mechanism for controlling the speed of the transmission and operably connected with the character members, whereby the character members are driven by momentum of the governor following the stoppage of the transmission.

103. In a telegraph transmitter setting and transmitting elements, transmission for actuating said elements, character members in the transmitting element, means operable by the transmission for driving the character members, a governor mechanism for controlling the speed of the transmission and operably connected with the character members, whereby the character members are driven by momentum of the governor following the stoppage of the transmission, and means acting on the character members for stopping said members at the completion of a determined phase of travel.

104. In a telegraph transmitter, a transmitting element comprising character members, a movable setting element comprising separate members for corresponding character members, a driver for the setting element, keyboard mechanism for actuating the members of said setting element, a governor for controlling the driver, and means included in the keyboard for controlling the governor.

105. In a telegraph transmitter a transmitting element comprising character members, a movable setting element for selectively setting the character members, a driver for the setting element, a governor for controlling the driver, key mechanism for controlling the governor comprising a cam, a key lever for actuating the cam, a sliding brake member in the governor, a sliding collar adapted for actuation by the cam, and lever mechanism operable by the collar to move the sliding brake member.

106. In a telegraph transmitter setting and transmitting elements, a single shaft supporting the setting and transmitting elements and having a longitudinal bore and transverse slot at one end, character members in the transmitting element, means in the setting element for selectively actuating the character members, an escapement for actuating the setting and transmitting elements, a governor in the transmitting element for controlling the transmission and comprising a brake member, a collar slidable on the shaft, a lever operably connected with the collar and adapted for operative engagement with the governor brake, a key slidable in the shaft slot and operatively connected with the collar, a rod slidable in the shaft bore adapted for actuating the key, a cam for actuating the rod, and key mechanism for actuating the cam.

107. In a telegraph transmitter setting and transmitting elements, a single shaft supporting the setting and transmitting elements and having a longitudinal bore and transverse slot at one end, character members in the transmitting element, means in the setting element for selectively actuating the character members, an escapement for actuating the setting and transmitting elements, a governor in the transmitting element for controlling the transmission and comprising a brake member, a collar slidable on the shaft, a spring for resisting opening movement of the brake, a lever operably connected with the collar, and adapted for operative engagement with the governor brake, a key slidable in the shaft slot and operatively connected with the collar, a rod slidable in the shaft bore adapted for actuating the key, a cam for actuating the rod, key mechanism for actuating the cam, and a lock for holding the said key mechanism against the tension of the brake spring.

108. In a telegraph transmitter setting and transmitting elements, a single shaft supporting both of said elements, and having a transverse slot and longitudinal bore, transmission for driving said elements, a governor for controlling the transmission, a positive lock for holding the transmission and comprising a slide member and stop, a collar slidable on the shaft, a second collar guided by and spaced from the first collar, a spring interposed between the collars to normally space the same, lever mechanism connected with the second collar and adapted for actuating said slide, a key in the shaft slot, a rod in the shaft bore, and key mechanism for shifting the rod to actuate the governor brake.

109. In a telegraph transmitter setting and transmitting elements, a single shaft supporting both of said elements, and having a transverse slot and longitudinal bore, transmission for driving said elements, a governor for controlling the transmission, a positive lock for holding the transmission and comprising a slide member and stop, a collar slidable on the shaft, a second collar guided by and spaced from the first collar, a spring interposed between the collars to normally space the same, lever mechanism connected with the second collar and adapted for actuating said slide, a key in the shaft slot, a rod in the shaft bore, key mechanism for shifting the rod to actuate the governor brake, a spring for yieldingly urging the governor brake against the actuation of the key mechanism, and a latch for holding the key mechanism against the tension of the spring.

110. In a telegraph transmitter setting and transmitting elements, a single shaft supporting both of said elements, and having a transverse slot and longitudinal bore, transmission for driving said elements, a governor for controlling the transmission, a positive lock for holding the transmission and comprising a slide member and stop, a collar slidable on the shaft, a second collar guided by and spaced from the first collar, a spring interposed between the collars to normally space the same, lever mechanism connected with the second collar and adapted for actuating said slide, a key in the shaft slot, a rod in the shaft bore, key mechanism for shifting the rod to actuate the governor brake, a spring for yieldingly urging the governor brake against the actuation of the key mechanism, a latch for holding the key mechanism against the tension of the spring, and key mechanism for releasing said latch.

111. In a telegraph transmitter transmitting and setting elements, transmission for actuating said elements, stop mechanism for holding the transmission, comprising a slide, a governor for controlling the transmission comprising a brake arm, a plunger yieldingly mounted in the slide and bearing against the brake arm, and lever mechanism for actuating the slide to release the transmission and actuate the governor brake.

112. In a telegraph transmitter, setting and transmitting elements, means for actuating said elements, a positive stop for said means, a brake for said means, and means for controlling the stop and brake.

113. In a telegraph transmitter, setting and transmitting elements, means for actuating said elements, a positive stop for said means, a brake for said means, and common means for controlling the stop and brake.

114. In a telegraph transmitter, setting and transmitting elements, means for actuating said elements, a positive stop for said means, a brake for said means, and means for first shifting the stop and then releasing the brake to permit controlled actuation of said elements.

115. In a telegraph transmitter, setting and transmitting elements, means for actuating said elements, a positive stop for said means, a brake for said means, and means for first shifting the stop and then releasing the brake to permit controlled actuation of said elements, and for reversing said operation to stop said elements.

116. In a telegraph transmitter, transmitting and setting elements, means for driving said elements, locking mechanism for said means, a key lever controlling movement of said locking mechanism to non-functional position, a latch seat and a latch on said lever automatically engageable with the latch seat when the lever is actuated from the latch to hold the locking mechanism in one position, and automatically releasable when the lever is operated directly to unseat the latch.

117. In a telegraph transmitter setting and transmitting elements, transmission for actuating said elements, a stop for holding the transmission, a governor for controlling the transmission, and key mechanism for first shifting the stop and then releasing the governor.

118. In a telegraph transmitter setting and transmitting elements, transmission for actuating said elements, a motor for constantly tensioning the transmission, start and stop mechanism, a start key, mechanism operable by the start key for releasing the transmission, a stop key, and mechanism operable by the stop key for actuating the start mechanism.

119. In a telegraph transmitter setting and transmitting elements, transmission for actuating said elements, a motor for constantly tensioning said transmission, stop and start mechanism, a key mechanism for controlling the start and stop mechanism, comprising a lever having a key thereon, a lever pivotally mounted on the stop lever and having a latch for holding the stop lever depressed; the said latch being operable to functional position upon depression of the start lever and releasable upon depression of the stop lever.

120. In a telegraph transmitter setting and transmitting elements, a driver for actuating said elements, stop and start mechanism controlling said driver comprising a slide and cam, key lever mechanism for actuating the cam, and a locking member for actuating the cam independently of the key lever mechanism.

121. In a telegraph transmitter setting and transmitting elements, a driver for actuating said elements, stop and start mechanism for controlling said driver comprising a slide and cam, key lever mechanism for actuating the cam, a locking member for actuating the cam independently of the key lever mechanism, and means for setting the lock to fix the speed of actuation of the setting and transmitting elements.

122. In a telegraph transmitter setting and transmitting elements, a driver for said elements, stop and start mechanism controlling the driver and comprising a sliding rod, a reciprocatory member having a cam for engaging the rod, and key mechanism for actuating the reciprocatory member.

123. In a telegraph transmitter setting and transmitting elements, a driver for said elements, stop and start mechanism controlling the driver and comprising a sliding rod, a reciprocatory member having a cam for engaging the rod, key mechanism for actuating the reciprocatory member, a governor controllable by the rod, and a speed controlled lock for limiting travel of the cam.

124. In a telegraph transmitter setting and transmitting elements, a driver for actuating said elements, stop and start mechanism comprising a reciprocatory barrel, a plunger slidable in the barrel, a spring in said barrel for urging the plunger to extended position, a cam on said plunger, means operable by the cam for stopping or releasing the driver, and key lever mechanism for actuating the barrel.

125. In a telegraph transmitter setting and transmitting elements, a driver for actuating said elements, stop and start mechanism comprising a reciprocatory barrel, a plunger slidable in the barrel, a spring in said barrel for urging the plunger to extended position, a cam on said plunger, means operable by the cam for stopping or releasing the driver, key lever mechanism for actuating the barrel, and a speed regulator comprising a cam adapted for limiting movement of the plunger cam, for the purpose set forth.

126. In a telegraph transmitter, a setting element, transmitting mechanism comprising a movable character member, a driver for the character member, a member for shifting the character member to operative engagement with its driver, means operable by the setting element to actuate the shifting member, and means operable by the shifting member to disconnect said last named means from the setting element.

127. In a telegraph transmitter, transmitting mechanism comprising a character member, a driver for the character member, a setting element comprising a movable trip, means for setting the trip in functional position, a movable frame, a member on the frame for engaging said trip to rock the frame, and means on the frame engageable with the character member to shift the character member to operative engagement with its driver when the frame is rocked.

128. In a telegraph transmitter, transmitting mechanism comprising a character member, a driver for the character member, a setting element comprising a movable trip, means for setting the trip in functional position, a movable frame, a member on the frame for engaging said trip to rock the frame, and means on the frame engageable with the character member to shift the character member to operative engagement with its driver when the frame is rocked, said frame member being operable to disconnect from the trip upon operation of the character member from its driver.

129. In a telegraph transmitter, transmitting mechanism comprising a character member, a driver for the character member, a setting element, and connecting mechanism comprising members for engaging the character member and setting element operable from each other to shift the character member to operative engagement with its driver upon engagement of one member with the setting element, and to free the setting element upon operation of the other from the character member.

130. In a telegraph transmitter, a setting element comprising individually operable setting devices, means for setting said devices, transmitting mechanism comprising individually operable character members, a driver for the character members, a frame for each character member movable independently of the setting element and its character member, a lever on said frame operable from the frame to shift the character member to contact with its driver and operable from the character member when the latter is in actuation, a lever on the frame for engaging a set device in the setting element to rock the frame, and means operable from the character member lever to disconnect the setting lever from its setting device.

131. In a telegraph transmitter, transmitting mechanism comprising a plurality of individual character members, a driver for said character members, a setting element comprising a plurality of individually operable setting devices for each character member, a frame for each character member movable independently of the character member and setting element, a lever on the frame engageable by any of the setting devices to rock the frame, a link on said lever, a lever on the frame movable from the frame to effect contact of the character member with its driver and from an actuated character member to shift the link and disconnect the setting lever from its setting device.

132. In a telegraph transmitter, a transmitting element comprising individually operable character members, a driver for the character members, a setting element comprising individually operable setting devices, a frame for each character member movable independently of its character member and the setting element, a lever mounted for limited movement on the frame and having a hook adapted for engagement by a setting device to rock the frame, a lever on the frame movable primarily therewith to engage the character member with its driver and movable secondarily from an actuated character member and a link connected with the setting lever and operable from the character lever upon secondary movement thereof to disconnect the setting lever from its setting device.

133. In a telegraph transmitter, a transmitting element comprising individually operable character members, a driver for the character members, a setting element comprising individually operable setting devices, a frame for each character member movable independently of its character member and the setting element, a lever mounted for limited movement on the frame and having a hook adapted for engagement by a setting device to rock the frame, a lever on the frame movable primarily therewith to engage the character member with its driver and movable secondarily from an actuated character member, means yieldingly urging the frame to project the character member lever toward the character member, and a link connected with the setting lever and operable from the character lever upon secondary movement thereof to disconnect the setting lever from its setting device.

134. In a telegraph transmitter transmitting mechanism comprising individually operable character members, a driver for the character members, a setting element comprising individually operable setting devices, a frame for each character member, a frame movable independently of the character member and setting element, a lever on the frame and movable therewith to effect engagement of the character member with its driver, a lever on the frame engageable with a setting device to rock the frame, a link on the setting lever, a stop on the frame, a spring connecting the link and setting lever to hold the link on the stop and project the lever to position for engaging a setting device, and an arm on the character member lever engageable with the link to move the same from the stop and shift the setting lever.

135. In a telegraph transmitter, a transmitting element comprising a plurality of individually operable character members, a driver for all of the character members, a lever for normally holding each character member out of engagement with the driver, a trip lever connected with the character lever and having a hooked portion, a setting element comprising a series of trips for each character member and key mechanism for selectively actuating the last named trips to induce operative engagement with the character trips to move relative characters into operative relation with their driver, an escapement for permitting movement of the transmitting element independently of the setting element, and means for actuating the escapement upon the setting of the character member to lock the transmitting element to the setting element while a character member is actuated by its driver.

136. In a telegraph transmitter, a transmitting element comprising a plurality of individually operable character members, a driver for said character members, means for normally retaining each character member out of operative relation with its driver, a trip lever connected with said means, a setting element for actuating the trip lever, driving mechanism for moving the transmitting element oppositely to the setting element, an escapement comprising gear connection between the transmitting and setting elements, a rotatable stop, and a stop lever operable by said means for engaging the escapement stop to lock the transmitting element to the setting element.

137. In a telegraph transmitter, a transmitting element comprising a plurality of individually operable character members, a driver for said character members, means for normally retaining the character members out of operative relation with their driver, a trip lever connected with said means, a setting element for actuating the trip lever, driving mechanism for moving the transmitting element oppositely to the setting element, an escapement comprising gear connection between the transmitting mechanism and setting elements and a rotatable stop having a long and a short arm, a stop lever normally engaging the short arms of the escapement stop and adapted for initial movement upon initial movement of said retaining means to release the escapement and for operative engagement with the long arm of the stop when the character member is operated, for the purpose set forth.

138. In a telegraph transmitter, a transmitting element comprising a plurality of character members, a positioning member for each character member, having an inclined edge, a setting element for actuating a selected positioning member to move the relative character member to operative position, a rod extending along all of the positioning members and adapted for actuation by any of said positioning members when the latter are actuated, arms pivotally supporting the rod and movable therewith, an escapement comprising a stop, and an arm operable by said rod for engaging the stop to control said escapement.

139. In a telegraph transmitter, transmitting mechanism comprising individually operable character members, a driver for the character members, a setting element comprising individually operable setting devices, a frame for each character member, a frame movable independently of the character member and setting element, a lever on the frame and movable therewith to effect engagement of the character member with its driver, a lever on the frame engageable with a setting device to rock the frame, a link on the setting lever, a stop on the frame, a spring connecting the link and setting lever to hold the link on the stop and project the lever to position for engaging a setting device, means for limiting movement of the setting lever under tension of said spring, and an arm on the character member lever engageable with the link to move the same from the stop and shift the setting lever.

140. In a telegraph transmitter, independently operable transmitting and setting mechanisms, means for locking said mechanisms to effect synchronous operation thereof, character members in the transmitting mechanism, a driver for the character members, intermediate mechanism operable from the setting mechanism to connect a character member with its driver and from the character member to disconnect the intermediate mechanism from the setting mechanism, a lever in said intermediate mechanism normally engaging the character member to retain same inert and operable with the intermediate mechanism to connect the character member with its driver and from the character member to function the locking mechanism, and yielding means for returning the lever to initial position to release the locking mechanism.

141. In a telegraph transmitter transmitting and setting elements rotatable on a common axis, individual character members in the transmitting element, trips in the transmitting and setting elements for setting determined character members, means for setting the trips in the setting element, means for shifting the transmitting element to throw the trips of the transmitting element out of operative relation to the setting trips, locking mechanism for holding the transmitting element in shifted position, and a trip for releasing the locked mechanism when the transmitting element is in predetermined relation to the setting element.

142. In a telegraph transmitter transmitting and setting elements rotatable on a common axis, individual character members in the transmitting element, trips in the transmitting and setting elements for positioning determined character members, means for setting the trips in the setting element, means for shifting the transmitting element to throw the transmitter trips out of operative relation to the positioning trips, locking mechanism for holding the transmitting element in shifted position, a trip for releasing the locked mechanism when the transmitting element is in predetermined relation to the setting element, and means for automatically returning the transmitting element to active position upon the release of the locking mechanism.

143. In a telegraph transmitter, a storage element comprising members adapted for arrangement in spaced groups, a transmitting element comprising character members, and group indicating members in the storage element controlling movement of the transmitting element to functional position.

144. In a telegraph transmitter, a storage element comprising members adapted for arrangement in spaced groups, a transmitting element movable to and from functional position, means for automatically shifting the transmitting element to functional position, means for restraining the transmitting element, and group indicating members in the storage element operable on the restraining means to free the transmitting element.

145. In a telegraph transmitter, a storage element comprising character and word space members, a transmitting element movable from and to functional position and comprising members operable selectively from the storage element, means yieldingly urging the transmitting element to functional position, means for restraining said transmitting element, and means operable by a word space member for releasing the transmitting element.

146. In a telegraph transmitter, storage and transmitting elements, movable relative to each other in a normal path to transmit characters and one movable reversely to the other in a different path to position said elements for repeating transmission of characters, means for automatically locking said element in the different path, and means depending on condition of the other element for releasing the reversely movable element.

147. In a telegraph transmitter, storage and transmitting elements, movable relative to each other in a normal path to transmit characters and one movable reversely to the other in a different path to position said elements for repeating transmission of characters, means for automatically locking said element in the different path, means depending on condition of the other element for releasing the reversely movable element, and means for automatically returning said reversely movable element to normal position when released.

148. In a telegraph transmitter, a transmitting element comprising character members, a storage element comprising character and word space members, means for operating said elements to operate character members in the transmitting element selected from the storage element, other means for returning the transmitting element to repeat character operation, an automatic lock for preventing return of the transmitting element to normal relation with the storage element, and means operable by the word space members for actuating said lock to permit return of the transmitting element.

149. In a telegraph transmitter transmitting and setting elements movable relative to each other, individual character members in the transmitting element, having individual trips, trips in the setting element for the individual character member trips, separate word space members in the transmitting and setting elements, means for shifting one of said elements to throw the trips out of operative relation, locking mechanism for holding said element in shifted position, a trip operable by a word space trip in the setting element when the parts are in shifted relation to release the locking mechanism, and means for automatically returning the shifted element to normal position upon release of the locking mechanism.

150. In a telegraph transmitter a transmitting element comprising individual character members and a trip for each character member, a setting element comprising individual trips for relative character member trips, means for selecting the trips in the setting element, a word space trip in the setting element, means for shifting one of the elements to inoperative position, a trip in the transmitting element for engaging the word space trip in the setting element when the parts are in shifted relation, and yielding means adapted for automatically returning the shifted element to normal position upon engagement of the word space trip and dogs in the transmitting and setting elements.

151. In a telegraph transmitter a setting element comprising a plurality of individual series of trips including a word space series, a transmitting element comprising individual character members, trips in the transmitting element for actuation by relative trips in the setting element when the parts are in normal relation, means for shifting the transmitting element to render the trips inoperative, means for locking the transmitting element in shifted position, a normally inert trip in the transmitting element adapted for operative engagement with a word space trip when the parts are in shifted relation and operable on the locking mechanism to release the latter when actuated by a word space trip, and means for automatically returning the transmitting element to normal position when the locking mechanism is released.

152. In a telegraph transmitter a shaft, a transmitting element adapted for rotation with, and sliding travel on the shaft and comprising individual character members, trips for positioning selected character members, a setting element comprising trips for the character member trips, a driver for the transmitting and setting mechanism comprising a clutch transmission, a collar fixed on said shaft and connected with a clutch member in the transmission, a collar movable on the shaft and connected with the transmitting element, a spring between said fixed and movable collars, means for shifting said movable collar to shift the transmitting element and connected with one of the transmission clutches to open the clutch when the transmitting element is shifted, means for automatically returning the transmitting element to normal position, toggle mechanism for locking the transmitting element in shifted position and against the tension of its spring, word space trips in the setting element, a word space trip in the transmitting element normally in operative position with the relative trips in the setting element and adapted for coöperation therewith when the transmitting element is moved when in shifted position, the word space trip of the transmitting element being adapted for unlocking the toggle to release the same when actuated by a word space trip of the setting element.

153. In a telegraph transmitter a shaft, a transmitting element comprising a frame, rotatable with and slidably mounted on the shaft, a transmission mounted on the frame comprising a slide, a clutch member, a block on said shaft and connected with the slide, a clutch member to anchor the same against sliding movement with the transmitting element, a collar slidable on the shaft and fixed to the frame, a spring interposed between the collar and block, a slide movable in the shaft and adapted for moving the slide block, means for actuating said slide to shift the transmitting element, toggle mechanism pivotally mounted on said collar and block and adapted for locking the transmitting element against the tension of said spring, individual character members in the transmitting element including a word space member, a positioning trip for each of the character members, a setting element comprising individual trips for each of the positioning element trips, a trip in the transmitting element adapted for engagement with a word space trip in the setting element when the transmitting element is in shifted position and for engagement with the toggle mechanism when actuated by engagement with the word space trip to unlock the toggle mechanism, for the purpose set forth.

154. In a telegraph transmitter a shaft, a transmitting element comprising a frame pivotally movable with and longitudinally movable on the shaft and having a slot therein, character members in the transmitting element, a transmission mounted on the frame and comprising a shifting clutch member, a collar fixed on the shaft and controlling the clutch member, a collar slidable on the shaft and supported by the transmitting element, a spring interposed between said collars, toggle mechanism on the collars for locking the parts in shifted relation against the tension of said spring, a setting element comprising trips including word space trips for actuating trips in the transmitting element, a trip pivotally mounted in the frame slot and adapted for actuation by a word space trip in the setting element when the transmitting element is in shifted position and for rocking the toggle mechanism when so actuated, and yielding means for normally retaining the last named trip in inoperative position.

155. In a telegraph transmitter a shaft, a transmitting element comprising a frame rotatable with and slidably mounted on the shaft and having a slot, a collar fixed on said shaft, a collar slidably mounted on the shaft, a transmission mounted on the sliding collar and comprising a clutch having one member connected with the fixed collar, a grooved member on the sliding collar, character members in the transmitting element, each having an individual trip, a setting element having trips for the character member trips and including word space trips, a trip loosely mounted in the frame slot with one end connected with the grooved part of the sliding collar and the other end adapted for engagement by a word space trip when the transmitting element is in shifted position, means for shifting the transmitting element to break the clutch and for rotating the transmitting element in inoperative relation to the setting element, a locking mechanism for maintaining the parts in shifted relation and operable by the loosely mounted trip, and means for automatically returning the parts to normal relation when the locking mechanism is released.

156. In a telegraph transmitter a shaft, a transmitting element rotatable with and slidably mounted on the shaft and comprising a collar, a key slidable in the shaft and engaging the collar, means for moving the key to shift the transmitting element, and yielding means for automatically returning the transmitting element to normal position.

157. In a telegraph transmitter a shaft, a transmitting element rotatable with and slidably mounted on the shaft and comprising a collar, a key slidable in the shaft and engaging the collar, a plunger slidable in the shaft in operative relation to the key, an eccentrically mounted crank for actuating the plunger and rotating the transmitter, and means for retaining the crank at either limit of its movement for retaining the plunger in operative or inoperative position.

158. In a telegraph transmitter a shaft, of a transmitting element rotatable with and slidably mounted on the shaft and comprising a collar, a key slidable in the shaft and engaging the collar, a plunger slidably mounted in the shaft and operable on the key, a concaved head on the plunger, a crank eccentrically mounted on the bushing and adapted for engaging the plunger head, yielding means for normally retaining the plunger head against the crank, and a rolling member carried by the crank in engagement by the plunger head for seating on the plunger or in the concaved end thereof to lock the crank at either limit of its travel.

159. In a telegraph transmitter a slotted shaft, having a bore opening through one end thereof, a transmitting element rotatable with and slidably mounted on the shaft and comprising a collar, a key slidably mounted in the shaft slot and adapted for engaging the collar, a plunger slidable in the shaft bore and adapted for engaging the key, a bushing connected with the transmitting element, a head on the plunger slidable in said bushing, yielding means for retaining the plunger out of operative relation to the key, and a crank pivotally mounted in the bushing and eccentrically of the plunger, whereby the rotation of the crank will rotate the transmitting element and pivotal movement of the crank on its mounting will actuate the plunger to shift the transmitting element on the shaft.

160. In a telegraph transmitter a slotted shaft, having a bore opening through one end thereof, a transmitting element rotatable with and slidably mounted on the shaft and comprising a collar, a key slidably mounted in the shaft slot and adapted for engaging the collar, a plunger slidable in the shaft bore and adapted for engaging the key, a bushing connected with the transmitting element, a head on the plunger slidable in said bushing, yielding means for retaining the plunger out of operative relation to the key, a crank pivotally mounted in the bushing and eccentrically of the plunger, whereby the rotation of the crank will rotate the transmitting element and pivotal movement of the crank on its mounting will actuate the plunger to shift the transmitting element on the shaft, means for locking the transmitting element in shifted position, selecting mechanism for releasing the lock, and means for automatically returning the transmitting element to normal position upon release of said lock.

161. In a telegraph transmitter rotatable transmitting and setting elements, one movable transversely relative to the other, character members in the transmitting element, means in the transmitting element for positioning character members, means in the setting element for setting the positioning means, locking means for retaining the movable element in shifted position, means for returning the shifted element to normal position, a pivotally mounted lever having a lip for engaging the locking mechanism to yieldingly retain the same in operative position, and trip mechanism operable by the setting element for actuating the said lever to actuate the locking mechanism.

162. In a telegraph transmitter a transmitting element and a setting element mounted for independent travel, an escapement mechanism for locking the elements together, means for shifting one of said elements, and means operable by the shifting means for releasing the escapement.

163. In a telegraph transmitter transmitting and setting elements mounted for independent rotatable movement and for movement transversely to each other, character members in the transmitting element, setting members for actuating the character members, a rocking member operable by any of the setting members, an escapement for locking the transmitting and setting elements together, and means operable by the rocking member for controlling the escapement.

164. In a telegraph transmitter transmitting and selecting elements, rotatable relative to each other and one movable transversely to the other, an escapement for locking the members together, a lever for controlling the escapement, a rocking member for controlling said lever, a plurality of individual character and word space members, trip mechanism for actuating any of the character or word space members and operable on the rocking member to influence the escapement, and means in the selective mechanism for controlling the trip mechanism.

165. In a telegraph transmitter a shaft, a setting element rotatable on the shaft, a transmitting element rotatable with and slidably mounted on the shaft, a sleeve fixed on the shaft, a sleeve fixed to the transmitting element and slidable on the shaft, a spring between said sleeves for yieldingly holding said elements apart, an escapement for locking the transmitting and setting elements together, means for shifting the transmitting element against the tension of said spring, and means operable upon the shifting of the transmitting element for releasing the escapement.

166. In a telegraph transmitter a shaft, a setting element rotatable on the shaft, a transmitting element rotatable with and slidably mounted on the shaft, a sleeve fixed on the shaft, a sleeve fixed to the transmitting element and slidable on the shaft, a spring between said sleeves for yieldingly holding said elements apart, an escapement for locking the transmitting and setting elements together, means for shifting the transmitting element against the tension of said spring, character members in the transmitting element, mechanism operable from the setting element for positioning the character members, a rocking member operable by said positioning mechanism, a pivotally mounted lever for actuating the rocking member, and means on the sliding collar for actuating said lever.

167. The combination with transmitting and setting elements, an indicator comprising dial and pointer members, operable respectively by the transmitting and setting elements.

168. The combination with transmitting and setting elements, a rotatable dial operable by one of said elements, and a pointer rotatable oppositely to the dial and operable from the other element.

169. In a telegraph transmitter transmitting and setting elements, a rotatable dial operable by one of said elements, a pointer rotatable oppositely to the dial and operable from the other element, indicating devices movably mounted in the dial, mechanism for controlling the setting mechanism for actuating said indicating devices, a space key in operative relation to the setting element, and means operable by the space key for resetting the indicating devices.

170. In a telegraph transmitter transmitting and setting elements, rotatable independently of each other, character mechanism in the transmitting element, means in the setting element for positioning the character members, an indicator comprising a rotatable dial, transmission between the setting element and the dial for rotating the latter upon actuation of the former, an indicator rotatable independently of and in proximity to the dial, transmission operable from the transmitting element for rotating the indicator reversely from the dial, independently operable setting devices in the dial, key mechanism for controlling the setting element, and means operable by the key mechanism for setting the indicator devices.

171. In a telegraph transmitter transmitting and setting elements, rotatable independently of each other, character mechanism in the transmitting element, means in the setting element for positioning the character members, an indicator comprising a rotatable dial, transmission between the setting element and the dial for rotating the latter upon actuation of the former, an indicator rotatable independently of and in proximity to the dial, transmission operable from the transmitting element for rotating the indicator reversely from the dial, independently operable setting devices in the dial, key mechanism for controlling the setting element, means operable by the key mechanism for setting the indicator devices, a spacing key for controlling movement of the setting element, and means operable by the space key for resetting the indicator devices.

172. In a telegraph transmitter transmitting and setting elements, an indicator dial, means for actuating the indicator dial synchronously with the setting element, individual indicator devices movably mounted in the dial, key levers controlling actuation of the setting element, a pivotally mounted arm for setting the indicating devices, a slotted member fixed relative to the arm and movable therewith, an arm operable by any of the key levers for advancing the indicator device arm by engagement with the slotted member, a spring connecting the slotted member with its moving arm, and means for lifting the moving arm to permit the return movement of indicator device arm.

173. In a telegraph transmitter transmitting and setting elements, an indicator dial, means for actuating the indicator dial synchronously with the setting element, individual indicator devices movably mounted in the dial, key levers controlling actuation of the setting element, a pivotally mounted arm for setting the indicating devices, a slotted member fixed relative to the arm and movable therewith, an arm operable by any of the key levers for advancing the indicator device arm by engagement with the slotted member, a spring connecting the slotted member with its moving arm, and adjustable means for lifting the moving arm to permit the return movement of the indicator device arm.

174. In a telegraph transmitter transmitting and setting elements, an indicator dial operably connected with the setting element, individual indicating devices in said dial, a rotatable arm for actuating any of the indicating devices, a slotted plate fixed to said arm, key mechanism for controlling the setting element, a rocking bar operable by the key mechanism and having a finger projected through the slotted plate and having a shoulder for abutment against said plate to move the latter, means for rocking the bar to project the same through the plate slot, and a spring connecting the plate and bar for returning the former upon projection of the latter through said slot.

175. In a telegraph transmitter transmitting and setting elements, an indicator dial operably connected with the setting element, individual indicating devices in said dial, a rotatable arm for actuating any of the indicating devices, a slotted plate fixed to said arm, key mechanism for controlling the setting element, a rocking bar operable by the key mechanism and having a finger projected through the slotted plate and having a shoulder for abutment against said plate to move the latter, means for rocking the bar to project the same through the plate slot, a spring connecting the plate and bar for returning the former upon projection of the latter through said slot, a stop for said plate, a space key controlling the selecting mechanism, and means operable by the space key for rocking said returning arm to return an indicating device to normal position.

176. In a telegraph transmitter transmitting and setting elements, a rotatable indicating dial operable by the setting element, individual indicating devices on the dial, key mechanism for controlling the setting element, a rotatable hammer for setting the indicator devices, a slide operable by the key mechanism for actuating said hammer, a rotatable hammer for returning the setting devices to normal position, and space key mechanism for controlling the setting element and actuating the return hammer.

177. In a telegraph transmitter transmitting and setting elements, a rotatable dial, indicating devices in said dial, a rotatable shaft, a hammer pivotally mounted on said shaft and adapted for setting the indicator devices, key mechanism for controlling the setting element, means operable by the key mechanism for actuating the hammer, a return hammer fixed on the shaft, space key mechanism for controlling the setting element, and means operable by the space key mechanism for actuating said shaft.

178. In a telegraph transmitter transmitting and setting elements, a rotatable indicator dial, indicator devices carried by said dial, a rotatable shaft, a hammer rotatably mounted on said shaft and adapted for actuating the indicator devices and comprising a slotted member, a bar having a shouldered portion slidably mounted in the slotted member and having a shoulder for operatively engaging said member, a spring connecting the hammer and bar, a stop for said hammer, key mechanism controlling the setting element and operatively connected with said bar, and adjustable means for controlling the bar.

179. In a telegraph transmitter transmitting and setting elements, a rotatable indicator dial, operably connected with the setting element, individual indicator devices in said dial, key mechanism for controlling the setting element, means operable by the key mechanism for setting said indicator devices, a space key, a rotatable resetting hammer for returning the indicator devices to normal position, a hook operable by the space key for rocking said return hammer, and yielding means for returning the hook to normal position.

180. In a telegraph transmitter transmitting and setting elements, an indicator dial operably connected with the setting element, individual indicator devices in said dial, key mechanism for controlling the setting element, means operable by the key mechanism for setting the indicator devices, a space key lever having a pin thereon, a resetting hammer for the indicating devices, a rotatable shaft for the resetting hammer, an oscillating hook carried by said shaft and having a shouldered portion for engaging the key pin upon depression of the key and whereby the hook is lifted positively by return movement of the key, and yielding means for normally retaining the hook and return hammer in initial position.

181. In a telegraph transmitter transmitting and setting elements, an indicator dial operatively connected with the setting element and comprising radial peripheral slots, indicator teeth pivotally mounted in said slots, a spring for each indicator tooth for normally retaining same in either limit of its travel, setting and return hammers for actuating said teeth, individual character members in the transmitting element, mechanism for positioning the character members, space key levers for controlling the setting element, and means operable by the character and space keys respectively for actuating the setting and returning hammers.

182. In a telegraph transmitter transmitting and setting elements, a rotatable indicator dial having radial peripheral teeth, a ring fixed to the dial and having teeth overlying the dial teeth and provided with anchoring shoulders, teeth trips pivotally mounted between the dial and ring teeth, a spring for each trip anchored to the ring teeth and adapted for holding the trips at either limit of their travel, setting and return hammers for actuating the indicator teeth and character key, and space levers for controlling the setting element and adapted for actuating the setting and return hammers.

183. In a telegraph transmitter transmitting and setting elements, a hollow shaft, a dial rotatably mounted on said shaft, means operable from the setting element for rotating the dial, a spindle in said shaft, a pointer on the spindle, means operable from the transmitting element for rotating the spindle oppositely to the dial, indicating devices on the dial, means for setting and returning the indicator devices, and character key and space levers for controlling the setting element and adapted for actuating the setting and return hammers respectively.

184. In a telegraph transmitter a rotatable setting element, a rotatable transmitting element movable transversely of the setting element, transmission for actuating the setting element, and means operable upon the shifting of the transmitting element for locking the transmission to the setting element.

185. The combination of a rotatable setting element, a rotatable transmitting element movable transversely to the setting element, transmission having a member fixed relative to the transverse movement of the setting element, means on said member for locking the transmission to the setting element, said means being retained in inoperative position by contact with the transmitting element when the latter is in normal position, and yielding means for actuating the locking means upon the transverse movement of the transmitting element into locking relation with the setting element.

186. In a telegraph transmitter, a shaft, a setting element rotatable on the shaft, a transmitting element rotatable with and slidably mounted on the shaft, a transmission having a member rotatable on the shaft, followers in the transmission member, and yielding means for urging said followers to locking engagement with the setting element whereby the locking is effected upon the shifting movement of the transmitting element.

187. In a telegraph transmitter, a shaft, a setting element rotatable on the shaft, a transmission member rotatable on the shaft, dogs pivotally mounted on the transmission member, yielding means for projecting the dogs to locking engagement with the setting element, a transmitting element rotatable with and slidably mounted on the shaft, means for normally retaining the transmitting member in operative position and for holding engagement with said dogs, and means for shifting the transmitting element whereby the dogs are released by the influence of their springs, for the purpose set forth.

188. In a telegraph transmitter, a shaft, a setting element rotatable on the shaft and provided with ratchet teeth, a transmitting element rotatable with and slidably mounted on the shaft, a transmission member rotatable on the shaft but fixed relative to the sliding movement of the transmitting element, dogs pivotally mounted in the transmission member and having roller bearing against the transmitting element and having teeth for engaging the ratchet teeth on the setting element, springs urging said dogs to contact with the transmitting element and locking engagement with the setting element whereby the locking coöperation is effected upon the shifting of the setting element, and means for shifting said transmitting element.

189. In a telegraph transmitter a transmitting element comprising individual character members, selective mechanism for positioning said character members, means for actuating the character members when set, and a circuit closer operable by the character members and comprising a flexible arm, means for limiting movement of the arm in one direction, a rockable member for tensioning the arm against the holding means, a contact point for the flexible arm, and circuit wires leading to the contact point and arm respectively.

190. In a telegraph transmitter a transmitting element comprising individual character members, selective mechanism for positioning said character members, means for actuating the character members when set, a circuit closer comprising a brush, means for yieldingly tensioning the brush toward the character members, a bell crank lever having a stop portion, yielding means for tensioning the lever in one direction, a stop for said lever, a bracket, adjusting mechanism for the bracket, a flexible arm controlled by the bell crank lever, a contact point for cooperation with the arm, and means for conducting current to the contact point and arm respectively.

191. In a telegraph transmitter a stationary frame, a transmitting element comprising a rotatable frame and a plurality of character members, a setting element having a rotatable frame inclosing the transmitting element, a circuit closer comprising a brush adapted for actuation by the character members, a plunger electrically connected with the brush, a contact ring on the setting element frame, wiping the plunger, a brush on the stationary frame wiping the contact ring, and circuit terminals connected with the last named brush and grounded on the stationary frame respectively.

192. In a telegraph transmitter, a stationary frame, a setting element comprising a rotatable member, inner and outer brush rings fixed to the setting element, and having conductive relation, a brush on the stationary frame contacting one of said rings, a transmitting element comprising character members, a brush operable by the character members, a plunger mounted on and insulated from the transmitting element and wiping the second contact ring, a contact point in conductive relation to the plunger, a contact member urged toward said point, and means on the brush for interrupting movement of said contact member.

193. In a telegraph transmitter, a character member having a plurality of sets of character teeth, a gear on said character member having a plurality of teeth arranged in sets corresponding in number to the sets of character teeth and means for driving said gear.

194. In a telegraph transmitter, a character member, having a plurality of equally spaced groups of gear teeth, a constantly revolving gear located in one of the spaces between said groups of teeth, and means for moving said teeth into mesh with said gear.

195. In a telegraph transmitter, a plurality of character members of different capacity, a plurality of groups of equally spaced gear teeth on each character member, a constantly revolving gear located in the interstices between said groups of teeth, and means for moving said character gear teeth into mesh with said constantly revolving gear.

196. In a telegraph transmitter, a plurality of character members of different capacity, a plurality of sets of equally spaced characters on said character members, a circuit closer operable from said characters, a plurality of groups of gear teeth on said character member corresponding in number to the characters, a constantly revolving gear located between groups of character gear teeth and means for circumferentially moving the character gear teeth into mesh with the constantly revolving gear, whereby the characters are caused to actuate the circuit closer.

197. In a telegraph transmitter, a circuit closer, a plurality of character members, each having equally spaced groups of character forming teeth for actuating said circuit closer to form telegraphic characters, the character forming teeth of one of said character members being spaced farther apart than the groups of teeth on the remaining character members to make the telegraphic character produced by that character member stand out in relief, and means for effecting relative movement of a character member, and the circuit closer.

198. In a telegraph transmitter, a circuit closer, a plurality of character members, each having equally spaced groups of character forming teeth for actuating said circuit closer to form telegraphic characters, the groups of character forming teeth of some of the character members being spaced relative to the groups of teeth on the remaining character members to make the telegraphic characters on those character members stand out in relief, and means for effecting relative movement of a character member and the circuit closer.

199. In a telegraph transmitter, a character member comprising a disk having a plurality of equally spaced groups of gear teeth, a constantly revolving gear wheel located in the space between said groups of teeth, a character ring rigidly secured to said disk, a plurality of equally spaced groups of character teeth on said character ring, a brush operable from said character teeth, a circuit closer operable from said brush to form telegraphic characters, the said character ring having notches on its inner face corresponding in number to the groups of character and gear teeth, a roller seated in one of said notches, and a link on said roller for determining the neutral position of said disk and character ring with respect to said constantly revolving gear and brush respectively.

200. In a telegraph transmitter, a character member comprising a disk having a plurality of equally spaced groups of gear teeth, a constantly revolving gear wheel located in the space between said groups of teeth, a character ring rigidly secured to said disk, a plurality of equally spaced groups of character teeth on said character ring, a brush operable from said character teeth, a circuit closer operable from said brush to form telegraphic characters, the said character ring having notches on its inner face, corresponding in number to the groups of character and gear teeth, a roller seated in one of said notches, and trip mechanism operatively connected with said roller whereby said gear teeth are moved into mesh with said constantly revolving gear to synchronously move the character teeth against said brush, for the purpose set forth.

201. In a telegraph transmitter, a character member comprising a disk, having a plurality of equally spaced groups of gear teeth, a driving gear adapted for meshing with said teeth to drive said disk, a character ring rigidly mounted on said disk, character forming teeth on said ring having straight and inclined edges, a brush operable from said character teeth and a circuit closer operable from said brush to form telegraphic characters, the said brush being disposed so as to rise on the inclined edges and trip from the straight edges of said character teeth to produce whole and half units of a telegraphic code.

202. In a telegraph transmitter, a character member comprising a disk having a plurality of equally spaced groups of gear teeth, a driving gear adapted for meshing with said teeth to drive said disk, a character ring rigidly mounted on and spaced from said disk, a plurality of character forming teeth on said ring having straight and inclined edges, a brush operable from said character teeth and a circuit closer operable from said brush to form telegraphic characters, the said brush being disposed at an angle to the character teeth so as to trip from the straight edge of one tooth to the base of the inclined edge of the next tooth to produce half units of a telegraphic code.

203. In a telegraph transmitter, a character member comprising a disk having a plurality of equally spaced groups of gear teeth, a driving gear adapted for meshing with said teeth to drive said disk, a character ring rigidly mounted on and spaced from said disk, a plurality of character forming teeth on said ring of one unit length, a brush operable from said character teeth, a retractile spring for holding said brush to said ring and capable of moving said brush at a higher rate of speed than said character teeth and a circuit closer operable from said brush to form telegraphic characters, the said brush being disposed so that in tripping from one character tooth to the succeeding tooth, the brush will move under the influence of the retractile spring to produce a space equal to one-half unit.

204. In a telegraph transmitter, a character member comprising a disk having a plurality of groups of gear teeth, a constantly revolving gear located within the space between said groups of teeth, a character ring fixed to and spaced from said disk, and having a plurality of groups of character teeth offset from the groups of gear teeth on the disk, a brush operable from said character teeth, a circuit closer operable from said brush to produce telegraphic characters, and means for circumferentially moving said gear teeth into mesh with said constantly revoluble gear before said character teeth engage said brush, for the purpose set forth.

205. In a telegraph transmitter, a normally inactive character wheel, a constantly revolving gear adjacent said character wheel, trip mechanism for circumferentially moving said character wheel into engagement with said constantly revolving gear, and means on said character wheel for automatically determining the period of engagement of said wheel with said gear.

206. In a telegraph transmitter, a plurality of character members, a plurality of equally spaced groups of gear teeth on said character member of different length, a constantly revolving gear adapted to mesh with said gear teeth at times, a plurality of equally spaced groups of character teeth on said character member of different length, trip mechanism for individually moving said groups of gear teeth into mesh with said constantly revoluble gear, and means on said character member for automatically determining the period of engagement of said gear teeth with said gear in proportion to the length of the character teeth groups.

207. In a telegraph transmitter, storage and transmitting elements, means for differentially driving said elements to transmit telegraphic characters, and an indicator operatively connected with the storage element for indicating the capacity of storage.

208. In a telegraph transmitter, storage and transmitting elements, means for differentially driving said elements to transmit telegraphic characters, and an indicator operatively connected with both the storage and transmitting elements whereby the position of the character being sent at any instant is indicated with respect to others in storage.

209. In a telegraph transmitter, storage and transmitting elements, means for differentially driving said elements to transmit telegraphic characters, and an indicator operatively connected with the storage element for indicating the number of characters in storage.

210. In a telegraph transmitter, storage and transmitting elements, means for differentially driving said elements to transmit telegraphic characters, and an indicator operatively connected with the storage and transmitting elements for continuously indicating the number of characters in storage during simultaneous operation of both of said elements.

211. In a telegraph transmitter, storage and transmitting elements, means for differentially driving said elements to transmit telegraphic characters, and an indicator operatively connected with said elements for indicating the number of words in storage.

212. In a telegraph transmitter, storage and transmitting elements, means for differentially driving said elements to transmit telegraphic characters, a keyboard including space and character keys, and an indicator operatively connected with the storage element and keyboard for separately indicating the resultant action of the space and character keys on the storage element.

213. In a telegraph transmitter, storage and transmitting elements, means for differentially driving said elements to transmit telegraphic characters, and an indicator operatively connected with the storage and transmitting elements for continuously indicating the difference between the number of characters stored and the number of characters transmitted.

214. In a telegraph transmitter, a storage element, means for storing characters in said element, a transmitting element shiftable from and into non-functional relation with the storage element, character elements in said transmitting element, means for differentially driving said storage, transmitting and character elements to transmit telegraphic characters, and means for disengaging the driving means from the transmitting and character elements and resetting said elements relative to the storage element to repeat telegraphic characters.

215. In a telegraph transmitter, a storage element, means for storing characters in said element in the proper sequence, a transmitting element, character elements in said transmitting element operable from said storage element, means for differentially driving said elements in a fixed path to transmit characters in the proper time and sequence, and means for shifting said transmitting and character elements laterally relative to the storage element and resetting the same to repeat the telegraphic characters in the same time and sequence.

216. In a telegraph transmitter, a storage element, means for storing characters in said element, a transmitting element, character elements in said transmitting element operable from said storage element, means for differentially driving said elements in a fixed path to transmit telegraphic characters, and means for manually disengaging the driving means from the transmitting and character elements and moving said elements in a different path relative to the storage element to eliminate some of said characters and again resetting the parts to continue the transmission of characters in the proper time and sequence.

217. In a telegraph transmitter, a storage element, means for storing characters in said element, means for grouping said characters into words, a transmitting element, character elements in said transmitting element operable from said storage element, means for differentially driving said elements to transmit telegraphic characters, means for manually disengaging the driving means from the transmitting and character elements and moving said elements relative to the storage element, means for holding said transmitting and character elements out of engagement with the driving means, and means operable from the beginning of a word in the storage element for tripping said holding means whereby the transmitting and character elements again coöperate with said storage element to transmit telegraphic characters.

218. In a telegraph transmitter, a storage element, means for storing characters in said element, a transmitting element operable from said storage element, means for differentially driving said elements to transmit telegraphic characters, means for disengaging the driving means from the transmitting element and moving said element relative to the storage element to repeat said characters, and an indicator operatively connected with said storage and transmitting elements for indicating the number of characters repeated.

219. In a telegraph transmitter, a storage element, means for storing characters in said element, a transmitting element operable from said storage element, means for differentially driving said elements to transmit telegraphic characters, means for disengaging the driving means from the transmitting element and moving said element relative to the storage element to eliminate said characters, and an indicator operatively connected with said storage and transmitting elements for indicating the number of characters eliminated.

220. In a telegraph transmitter, a storage element, a transmitting element, means for storing characters in said storage element, means for turning said transmitting element relative to said storage element to transmit telegraphic characters, means for resetting said transmitting element relative to the storage element to repeat said characters, and an indicator operable from both of said elements for indicating the point at which the transmitting element is reset.

221. In a telegraph transmitter, a storage element, means for storing characters in said element, a transmitting element, character elements in said transmitting element operable from said storage element, means for differentially driving all of said elements to transmit telegraphic characters, and means for simultaneously disengaging the driving means from the transmitting and character elements, and locking said driving means on said storage element whereby said transmitting and character elements may be moved relative to the storage element to repeat said characters.

222. In a telegraph transmitter, a storage element, means for storing characters in said element, a transmitting element, character elements in said transmitting element, an escapement between said transmitting and storage elements, means connected with character elements for actuating said escapement, means for differentially driving all of said elements, means for disengaging the driving means from the transmitting element and character elements and releasing the escapement whereby the transmitting element may be moved relative to the storage element to repeat said characters.

223. In a telegraph transmitter, a storage element, a transmitting element, character elements in said transmitting element, means for differentially driving all of said elements to transmit telegraphic characters, a governor operatively connected with said character elements for regulating the speed thereof, means for regulating the speed of said governor, and a positive lock on said driving means operable from said governor for positively locking said driving means.

224. In a telegraph transmitter, a storage element, a transmitting element having escapement connection with said storage element, means for driving said elements in opposite directions to transmit telegraphic characters, and a drag pawl on said transmitting element operatively connected with said storage element to prevent a reversal of the normal travel of the transmitting element relative to the storage element.

225. In a telegraph transmitter, a storage element, a keyboard, means for producing a record of the operation of said keyboard in said storage element, a transmitting element, character members in said transmitting element, an escapement between said storage and transmitting elements, means for differentially tensioning said storage and transmitting elements, hooks on said transmitting element operable from said storage record, and links on said hooks operably connected with said escapement and character members whereby said escapement and character members are actuated simultaneously.

226. In a telegraph transmitter, a storage element, a keyboard, means for producing a record of the operation of said keyboard in said storage element, a transmitting element, character members in said transmitting element, an escapement between said storage and transmitting elements, a clash gear for said character members, means for differentially driving said storage and transmitting elements and said clash gear, hooks on said transmitting element operable from said storage record, and links on said hooks operably connected with said escapement and character members whereby said character members are thrown into operative engagement with said clash gear simultaneously with the actuation of the escapement to transmit telegraphic characters, and whereby said escapement is again actuated at the completion of each character.

227. In a telegraph transmitter, a storage element, means for producing a record in said storage element, a character forming element, means for differentially driving said storage and character forming elements, a hook operable from said storage record, a link on said hook operatively connected with said character forming element, and single means for tensioning said hook toward said storage element and said link toward said character forming element, for the purpose set forth.

228. In a telegraph transmitter, the combination with a plurality of character members having equally spaced characters and means for actuating said character members, of a circuit closer comprising an insulated contact screw, a contact spring yieldingly tensioned toward said contact screw, means for adjusting the tension of said contact spring, a brush operable from said character members for actuating said contact spring, a spring for holding said brush to said character members and said contact spring from said contact screw, and means for adjusting the tension of said last named spring to vary the difference in tension between the two springs.

229. In a telegraph transmitter, a storage element, a keyboard, means for producing a record of the operation of the keyboard in the storage element, a transmitting element, character members in said transmitting element operable from said storage element, for transmitting telegraphic characters, means for differentially driving said storage and transmitting elements and said character members, and an erase key for simultaneously eliminating a character from the storage element and reversing the direction of motion of the storage element without effecting the transmission of telegraphic characters.

230. In a telegraph transmitter, storage and transmitting elements, means for differentially tensioning said elements to transmit telegraphic characters, a keyboard for releasing said storage element to the tensioning means, means for actuating said transmitting element, an erase key for eliminating the effects of said keyboard on said storage element and an indicator for indicating the extent of operation of said erase key on said storage element.

231. In a telegraph transmitter, the combination with storage and transmitting elements and a character element operable from said storage element, means for shifting the transmitting element laterally relative to the storage element to repeat the operation of the character element, and a keyboard for actuating said storage element, of a differential gearing for tensioning said storage element, and means for yieldingly actuating said gearing whereby the keyboard may be operated while the transmitting element is in repeat position.

232. In a telegraph transmitter, a storage element, a transmitting element, a character element, means for differentially tensioning said elements, an escapement for controlling said storage element and said tensioning means, an oscillating bar, a key lever operating in conjunction with said bar for tripping said escapement, and a buffer for absorbing the momentum of said bar when moved by said key lever.

233. In a telegraph transmitter, the combination with a transmitting element and a storage element having a plurality of radially disposed apertures having a pivot rod and inwardly opening side apertures, of a trip pivotally mounted on said rod within each of said apertures and comprising a body portion having an edge notch, a dog portion for engaging said transmitting element and a setting portion, and a spring having a straight portion seated in the body notch of said trip and curved spring portions integral with said straight portion and having laterally turned ends seated in said inwardly opening apertures, whereby said trip is yieldingly tensioned to each limit of its travel.

234. In a telegraph transmitter, a transmitting element and a storage element having a plurality of radially disposed apertures having inwardly opening apertures at each side and clearance pockets adjacent each of said apertures and having a transverse pivot rod, a trip pivotally mounted on said rod within each pocket, a spring seated in said trip and said inwardly opening apertures, and having spring loops adapted for projection into said clearance pockets, and means for rocking said trips into the path of said transmitting element.

235. In a telegraph transmitter, the combination with a storage and a transmitting element, of an electric motor, a variable-tension spring motor operatively connected with said electric motor, constant-tension springs interposed between said variable-tension spring motor and said storage element, and means for automatically transferring tension from said variable-tension spring motor to said constant-tension springs to maintain a constant tension on said storage element.

236. In a telegraph transmitter, the combination with a storage and a transmitting element, of an electric motor, a variable tension spring motor operatively connected with said electric motor, constant tension springs interposed between said variable-tension spring motor and said storage element, and means for automatically transferring tension from said variable-tension spring motor to said constant-tension springs to maintain a constant tension on said storage and transmitting elements.

237. In a telegraph transmitter, the combination with a storage and a transmitting element, of an electric motor, a variable-tension spring motor operatively connected with said electric motor, constant-tension springs interposed between said variable-tension spring motor and said storage element, and automatic means for constantly transferring tension from said variable-tension spring motor to said constant-tension springs to maintain a constant tension on said storage and transmitting elements.

238. The combination of storage and transmitting elements, trips in said storage element, a keyboard for forwarding said storage element, and setting said trips for engaging said transmitting element, an erase key for reversing said storage element and resetting said trips from engagement with said transmitting element, of an electric motor, a spring motor operatively connected with said electric motor, an equalizer operatively connected with said spring motor and with said storage and transmitting elements, and means for holding said spring motor against revolution in one direction whereby said equalizer and spring motor are free to turn reversely as a unit when the storage element is reversed by the erase key.

239. In a telegraph transmitter, a frame, a storage element in the frame, a transmitting element in the storage element, character members in said transmitting element and a circuit closer on the transmitting element comprising an insulated base, a contact arm pivotally mounted on said base, an insulated arm operable from said character members for actuating said contact arm, a contact screw grounded on the transmitting element for contacting said contact arm, collector rings insulated from said storage element, a brush on said insulated base for wiping one of said collector rings, a second brush on said frame for wiping the other of said collector rings and circuit wires for said frame and second brush, for the purpose set forth.

240. In a telegraph transmitter, a frame, a storage element in the frame, a transmitting element in the storage element, character members in said transmitting element and a circuit closer on the transmitting element comprising an insulated base, a contact screw on said insulated base, a brush operable from said character members, a contact spring on said brush adapted to engage said contact screw to transmit telegraphic characters, means for adjusting said contact spring, collector rings on and insulated from said storage element, a brush on said insulated base for wiping one of said collector rings, a second brush on the frame for wiping the other of said collector rings, and circuit wires connected with the frame and second brush, for the purpose set forth.

241. In a telegraph transmitter a setting element and means for actuating the setting element, transmission for actuating the setting element, a frame revolubly mounted within the setting element, character members in said frame, a governor in said frame operatively connected with said transmission and with said character members, clutch connection between said governor and transmission adapted for driving engagement in one direction, and means in the frame for effecting transmission of telegraphic characters.

242. In a telegraph transmitter a setting element, transmission for actuating the setting element, a frame revolubly mounted within the setting element, character members in said frame, a governor in said frame operatively connected with said character members and having clutch connection with said transmission whereby the governor is free to revolve to run out a character after the driving connection has ceased.

243 In a telegraph transmitter setting and transmitting elements, transmission for actuating said elements, character elements in the transmitting element, a governor in said transmitting element, a yieldable clutch connected with said transmission and adapted for driving said governor in one direction, a driving connection between said governor and character members, an escapement between said setting and transmitting elements operable from said character members, means for stopping said transmission whereby the governor may revolve from its yieldable clutch to run out an unfinished character, and means operable from the stopping means for locking the escapement to prevent another character being thrown into operation.

244. In a telegraph transmitter setting and transmitting elements and a case for inclosing said elements, a driver for actuating said elements, stop and start mechanism for controlling said driver comprising a sliding rod, a reciprocatory barrel, a plunger in said barrel, a spring for urging said plunger in one direction, a cam on said plunger for contacting said sliding rod, a cam on said case for contacting said first cam, an indicator having a dial for determining the position of said last named cam and a key lever for actuating said first named cam against said sliding rod and said last named cam and in proportion to the amount indicated on said dial.

245. In a telegraph transmitter transmitting and setting elements movable independently of each other, individual character members in the transmitting element, a positioning mechanism for each character member, a series of trips in the setting element for each positioning mechanism, individual means for actuating any of the trips in a series, escapement mechanism operable by the positioning mechanism for locking the elements together, and means for moving the said elements simultaneously and independently of each other, whereby trips may be set in storage during moving periods of the transmitting element and taken up by the positioning mechanism during movable periods of said element.

246. In a telegraph transmitter, a transmitting element, a storage element comprising indicia of telegraphic characters, means for differentially driving said elements to transmit telegraphic characters, means for grouping said indicia into word groups and an indicator for indicating the number of indicia in each word group.

247. In a telegraph transmitter, a character member having a plurality of equally spaced characters, a second character member having a plurality of equally spaced characters with equal spaces on each side of said characters, a circuit making and breaking device operable from said character members, and means for actuating said character members whereby the telegraphic characters produced by the second character member appear to be spaced farther apart than those of the first character member.

248. In a telegraph transmitter, a transmitting element, a storage element comprising indicia of telegraphic characters, means for setting up indicia in word groups in said storage element, and means for indicating the number of word groups set up in said storage element.

249. In a telegraph transmitter, a transmitting element, a storage element comprising indicia of telegraphic characters, means for setting up indicia in word groups in said storage element, means for differentially driving said elements to transmit telegraphic words and an indicator connected with said storage element for recording the number of word groups in said storage element.

250. In a telegraph transmitter, a transmitting element, a storage element comprising indicia of telegraphic characters, means for setting up indicia in said storage element, means for differentially driving said elements to transmit telegraphic characters and an indicator for indicating the number of indicia set up in said storage element.

251. In a telegraph transmitter, a transmitting element, a storage element comprising indicia of telegraphic characters, means for setting up indicia in word groups in said storage element, means for differentially driving said elements to transmit telegraphic words, and an indicator for indicating the beginning of each word group.

252. In a telegraphic transmitter, a transmitting element, a storage element comprising indicia of telegraphic characters, means for setting up indicia in word groups in said storage element, means for spacing the word groups in said storage element, means for differentially driving said elements to transmit telegraphic words, and an indicator for indicating the spacing between word groups.

253. In a telegraph transmitter, a transmitting element, a storage element comprising indicia of telegraphic characters, means for setting up indicia in word groups in said storage element, means for spacing the word groups set up in said storage element, means for differentially driving said element to transmit telegraphic words, and an indicator for indicating the end of each word group.

254. In a telegraph transmitter, a transmitting element, a plurality of character members in said element, means for driving said character members to transmit telegraphic characters, means for stopping the character driving means at any point and before a character is completed, and means for driving out a character member, which may be in operation at the time transmission of characters is stopped.

255. In a telegraph transmitter, a transmitting element, a plurality of character members in said element, means for driving said character members to transmit telegraphic characters, means for stopping the character driving means before a character is finished, and an indicator for indicating the unfinished character.

256. In a telegraph transmitter, a transmitting element, a plurality of character members in said element, means for driving said character members to transmit telegraphic characters, means for stopping the character driving means at any point, and before a character is complete, means for driving out a character member which may be in operation at the time the character driving means is stopped, and an indicator for indicating when a character is complete.

257. In a telegraph transmitter, a transmitting element, a storage element comprising indicia of telegraphic characters, means for setting up a plurality of indicia in word groups in said storage element, means for eliminating any number of said groups and an indicator for indicating the number of groups eliminated.

258. In a telegraph transmitter, a transmitting element, a storage element comprising indicia of telegraphic characters, means for setting up a plurality of indicia in word groups in said storage element, means for repeating any number of said groups, and an indicator for indicating the number of groups repeated.

259. In a telegraph transmitter, a transmitting element, a storage element comprising indicia of telegraphic characters, means for functioning said indicia, means for erasing functioned indicia and means for indicating the indicia erased.

260. In a telegraph transmitter, a transmitting element, a storage element comprising indicia of telegraphic characters, means functioning said indicia, means for erasing one or more of said functioned indicia and an indicator for indicating the number of indicia erased.

261. In a telegraph transmitter, a transmitting element, a storage element comprising indicia of telegraphic characters, means for functioning a plurality of indicia in said storage element, means for driving said elements to transmit telegraphic characters, an indicator for indicating the number of indicia functioned in said storage element, an indicator for indicating the number of characters transmitted by said transmitting element, means for erasing an indicium from said storage element, and means for indicating the indicium erased.

262. In a telegraph transmitter, a transmitting element, a storage element comprising indicia of telegraphic characters, means for functioning a plurality of indicia in said storage element, means for erasing one of said functioned indicia, an indicator for indicating the number of indicia functioned, an indicator for indicating the character being transmitted, and an indicator for indicating the position of the indicia erased relative to the character being sent.

263. In a telegraph transmitter, a transmitting element, a storage element comprising indicia of telegraphic characters, means for functioning indicia in said storage element, means for securing the repetition of said indicia in word groups and means for insuring the resumption of repeat transmission at the beginning of word groups.

264. In a telegraph transmitter, a transmitting element, a storage element comprising indicia of telegraphic characters, means for setting up indicia in said storage element, means for eliminating any number of said indicia in word groups and means for preventing the reëstablishment of telegraphic transmission except at the beginning of word groups.

265. In a telegraph transmitter, a transmitting element, a storage element, means for setting up indicia in said storage element, means for stopping the transmitting element at any point, and means for running out any character which may have started at the time the transmitting was stopped.

266. In a telegraph transmitter, a transmitting element, a plurality of character members in said transmitting element, a clash gear for driving said character members, a storage element, means for differentially driving said elements and clash gear to transmit telegraphic characters, means for locking the power on said transmitting element, and means for turning said clash gear after said transmitting element is locked to finish out an operative character member.

267. In a telegraph transmitter, a transmitting element, a plurality of character members in said transmitting element, means for driving said character members to transmit telegraphic characters means for locking the power on said transmitting element at any point, means for continuing the motion of a character member which may have been in operation at the time the transmitting element was stopped and means for ultimately stopping said character moving means at the completion of said character.

268. In a telegraph transmitter, storage and transmitting elements, a plurality of character members in said transmitting element, means for stopping said transmitting element at any point, and means for clearing the transmitting element of unfinished characters irrespective of the point at which said transmitting element stopped.

269. In a telegraph transmitter, a transmitting element, a storage element comprising indicia of telegraphic characters, means for setting up a plurality of indicia in said storage element, a plurality of normally inert character members in said transmitting element, means for differentially driving said character members and storage and transmitting elements to transmit telegraphic characters, a governor for regulating the speed of said character members and means whereby the transmitting element is automatically started as the governor reaches a predetermined speed.

270. In a telegraph transmitter, a transmitting element, a storage element comprising indicia of telegraphic characters, means for setting up a plurality of indicia in said storage element, a plurality of character members in said transmitting element, a clash gear for actuating said character members, a governor for regulating the speed of said clash gear, means for driving said storage and transmitting elements and said governor to transmit telegraphic characters and means for positively locking said transmitting element and checking the speed of said governor whereby an unfinished character may be completed after stopping said transmitting element.

271. In a telegraph transmitter, storage and transmitting elements, a plurality of character members in said transmitting element, means for differentially driving said elements and character members to transmit telegraphic characters, and means for arresting the motion of said character members until said driving means has attained a predetermined speed.

272. In a telegraph transmitter, storage and transmitting elements, a plurality of character members in said transmitting element, means for differentially driving said elements and said character members, means for producing a mechanical record in said storage element for tripping said character members to the action of said driving member and means for resting said tripping action until said driving means has attained a predetermined speed.

273. In a telegraph transmitter, storage and transmitting elements, a plurality of character members in said transmitting element, means for differentially driving said elements and said character members, a governor for regulating the speed of said character members, and means for arresting the motion of said character members until said governor has attained a predetermined speed.

274. In a telegraph transmitter, storage and transmitting elements, a plurality of character members in said transmitting element, a gear adapted to mesh with any of said character members, means for differentially driving said elements and said gear, a governor for regulating the speed of said gear and means for arresting the movement of said gear until said governor has attained a predetermined speed.

275. In a telegraph transmitter, storage and transmitting elements, a plurality of character members in said transmitting element, a gear adapted to mesh with any of said character members, a governor for regulating the speed of said gear, and means for starting said gear after said governor has attained a predetermined speed.

276. In a telegraph transmitter, storage and transmitting elements, a plurality of character members in said transmitting element, a gear adapted to mesh with any of said character members, means for driving said storage and transmitting elements and said gear, means for arresting the movement of said gear until said governor has attained a predetermined speed, and means for maintaining operative engagement between said gear and said governor after a predetermined speed has been attained.

277. In a telegraph transmitter, storage and transmitting elements, a plurality of character members in said transmitting element, a gear adapted to mesh with any of the said character members, means for differentially driving said elements and said gear, a governor for regulating the speed of said gear, means for stopping said governor and gear, and automatically operable means for maintaining operative connection between said gear and governor until they have reached a state of rest.

278. In a telegraph transmitter, storage and transmitting elements, a plurality of character members in said transmitting element, a gear adapted to mesh with any of said character members, a governor, means for differentially driving said elements and said governor, and means for operatively connecting said gear and said governor after said governor has attained a predetermined speed.

279. In a telegraph transmitter, storage and transmitting elements, a plurality of character members in said transmitting element, a gear adapted to mesh with any of said character members, a governor, means for differentially driving said elements and said governor, means for operatively connecting said gear and governor after said governor has attained a predetermined speed, means for stopping said governor, and means for maintaining operative connection between said gear and said governor until said governor has reached a state of rest.

280. In a telegraph transmitter, a transmitting element comprising a plurality of individual character members, each having a positioning device, a movable setting element comprising a series of individually operable trips for actuating a relative positioning device, a selecting member for each series of trips, a key lever for each character member, an escapement for controlling the setting element, a hammer for each selecting member operable from and upon initial movement of a relative key lever to actuate a relative selecting member, and means operable by continued movement of any key lever for releasing the escapement.

281. In a telegraph transmitter, a transmitting element comprising a plurality of individual character members, each having a positioning device, a movable setting element comprising a series of groups of individual trips for each positioning device, means for actuating the setting element, an individually operable selecting member for each group of trips, an escapement connected with the setting element and comprising a cam, a movable latch for holding said cam, a key lever for each individual selecting member, and means operable by any of said key levers for actuating said latch to release the cam.

282. In an apparatus of the character described, a plurality of circular character members of various diameters having offset axial supports and peripheral meeting points in a common and permanent transverse plane.

283. In a telegraph transmitter, the combination of a circuit closer, a brush for actuating the circuit closer and a plurality of circular character members of various diameters, having offset axial supports, and engaging the brush peripherally in a single transverse plane.

284. In a telegraph transmitter, the combination of a circuit closer, a brush for operating said circuit closer, a plurality of character members of various diameters, having fixed axial supports, the said supports being offset whereby the peripheries of the character members engage the brush in points which lie in a straight line.

285. In a telegraph transmitter, a circuit closer, a straight brush pivotally mounted to actuate said circuit closer, a plurality of circular character members of different diameters, having fixed axial supports offset to bring corresponding points of all of the character members in a straight line, teeth on said character members arranged in a path traversing said brush, and means for actuating said character members to actuate said brush.

286. In a telegraph transmitter, a plurality of character members of various diameters, each comprising a plurality of character sections and intervening spaces, with the spaces on all of the character members of equal length, and means for driving all of the character members at the same peripheral speed.

287. In a telegraph transmitter, a plurality of circular character members of different diameters, having fixed axes and all tangential to a single plane, and an external driving gear coöperative with all of said character members.

288. In a telegraph transmitter, the combination of a plurality of character members of different diameters, having offset, fixed, axial supports to bring corresponding points in the circumferences of all of the character members in a straight line, each character member comprising a plurality of character sections and intervening spaces, with the spaces on all character members of equal length, means for actuating the character members, a brush operable by the character members and a circuit closer operable by the brush.

289. In a telegraph transmitter, the combination of a plurality of independently operable character members of different diameters, each having a plurality of like character sections and intervening spaces, the character sections on the several members being various in extent and the spaces equal throughout the series, means for actuating the character members, a brush operable by any character member, and a circuit closer operable by the brush.

290. In a telegraph transmitter the combination of a plurality of circular character members of different diameters, each having equally spaced groups of character teeth which vary in length and number on the different members, means for actuating the character members, a brush operable by the character members, and a circuit closer operable by said brush.

291. In a telegraph transmitter, a plurality of character members of different diameter, having offset axial supports to provide one point in the circumference of each character member tangent to a transverse plane, a circuit closer operable from said character member and a common driving gear intersecting said transverse plane for actuating any of said character members.

292. In a telegraph transmitter, a plurality of character members of different diameter having offset axial supports to locate one point in the circumference of each member tangent to a transverse plane, a driving gear intersecting said transverse plane and operable on the character members, a brush also intersecting said transverse plane, and operable by said character members, and a circuit closer operable by said brush.

293. In a telegraph transmitter the combination with a plurality of character members having equally spaced character sections and means for actuating said character members, of a circuit closer comprising a yielding arm normally tending to close a circuit, a brush operable from said character member and operable to move and release said arm, a spring urging the brush to functional relation with the moving arm, and means for adjusting said spring to vary the speed of operation of said yielding arm.

294. In a telegraph transmitter, a plurality of character members, spaced groups of gear teeth on said character members, the groups on the several wheels being of different length, groups of character forming teeth on said character members, corresponding in length to the length of the groups of gear teeth, a constantly revolving gear adapted to mesh with said gear teeth at times, a contact brush operable from said character teeth at corresponding times, a circuit closer operable from said brush, trip mechanism for individually moving said groups of gear teeth into mesh with said constantly revoluble gear to effect operation of the brush by the character teeth, and means on said character member for automatically determining the period of engagement of said gear teeth with said constantly revolving gear and of said character teeth with said brush for the purpose set forth.

295. In a telegraph transmitter, a plurality of character members comprising gear and character sections, a constantly revolving member comprising individual gear sections for meshing with the gear sections of the character members at times, a circuit closer and a brush for actuating said circuit closer comprising fingers adapted to operate between the gear sections on said constantly revolving member and engage the character sections of said character member.

296. In a telegraph transmitter, a plurality of character members rotatable on fixed axes and comprising spaced character and gear sections, a pivotally mounted frame, a clash gear rotatable in said frame and comprising sections normally located between the gear sections of said character members, stops for said frame, means for adjusting said stops to regulate the depth of said clash gear in said gear sections and means for yieldingly holding said frame against said stops.

297. In a telegraph transmitter, a plurality of character members rotatable on a fixed axis and comprising spaced character and gear sections, a pivotally mounted frame to cause said clash gear to mesh with and adapted to mesh with said gear sections at times, yielding means urging the frame to cause said clash gear to mesh with said gear sections, and adjustable stop members for said frame for regulating the depth at which the clash gear meshes with said gear sections.

298. In a telegraph transmitter, a setting element having trips, a transmitting element concentric with and adapted to rotate relative to said setting element, character members in said transmitting element adapted for operation from said setting element trips to position for transmitting telegraphic characters, a return spring between said setting and transmitting elements, means for shifting said transmitting element longitudinally relative to said setting element against the tension of said spring and a lock for holding said transmitting element in shifted position.

299. In a telegraph transmitter, a setting element having trips, a transmitting element concentric with and adapted to rotate relative to said setting element, character members in said transmitting element adapted for operation from said setting element trips to position for transmitting telegraphic characters, a return spring between said setting and transmitting elements, means for shifting said transmitting element against the tension of said spring, a lock for holding said transmitting element in shifted position comprising a toggle arm pivotally mounted on said setting element, toggle links pivotally mounted on said transmitting element and on said toggle arm, a spring for normally holding said toggle arm and links toward locking position and means operable from the setting element trips for unlocking said toggle lock to release said transmitting element to the action of the return spring.

300. In a telegraph transmitter, a setting element comprising spaced circumferential rows of trips, means for selectively functioning said trips, a transmitting element having a plurality of character members, trip levers adapted to register with said setting element trips to set said character members, means for driving set character members, to transmit telegraphic characters, a block on said setting element, a bracket on said transmitting element, a rod fixed in said setting element block and slidably mounted in said transmitting element bracket, a spring between the block and bracket, and adjusting nuts on said rod for limiting the action of said spring and determining the line up of said trip levers and setting element trips.

301. In a telegraph transmitter, a setting element, a transmitting element, a plurality of character members in said transmitting element, lever mechanisms operable from the setting element to selectively set said character members, means for driving set character members to transmit telegraphic characters, an escapement between said transmitting and setting elements comprising a rotary pawl on said transmitting element operable from said setting element, an oscillating pawl on said transmitting element for coöperating with said rotary pawl, a universal bar operable from any of said lever mechanisms, stop points on said pawl and universal bar, a spring between said universal bar and oscillating pawl for holding same yieldingly against their stop points, whereby said oscillating pawl will yield at times when the lever mechanism operates prior to operation of the rotary pawl.

302. In a telegraph transmitter, a setting element, a transmitting element movable relative to the setting element, a plurality of character members in said transmitting element adapted to be selectively positioned from said setting element, means for driving positioned character members to transmit telegraphic characters, escapement connection between said transmitting and setting elements for controlling relative movement between said elements, and a drag pawl on said transmitting element coöperative with said setting element for controlling counter movement of said setting and transmitting elements.

303. In a telegraph transmitter, a setting element having a plurality of trips, a transmitting element having rotary movement relative to the setting element, a plurality of character members in the transmitting element, positioning levers coöperative with said trips for positioning said character members, means for driving positioned character members to transmit telegraphic characters, an escapement for controlling one direction of rotary movement of the transmitting element, a drag pawl for controlling rotary movement of said transmitting element in the opposite direction, means for shifting said transmitting element longitudinally relative to said setting element and disconnecting said drag pawl, thereby permitting free rotary movement of said transmitting element in either direction, means for locking said transmitting element in shifted position, means for unlocking said transmitting element, a spring for returning said transmitting element to normal position, a pivotal mounting for said drag pawl, a stop for said drag pawl and a spring for holding said pivotal mounting against said stop, whereby said pivotal mounting will yield to permit said drag pawl to engage said setting element when the transmitting element is returned to normal position.

304. In a telegraph transmitter, a setting element comprising individual trips, a shaft revolubly mounted concentrically with said setting element, a transmitting element comprising a frame rotatable with and slidably mounted on the shaft, character members in said transmitting element, means for differentially driving said setting element, transmitting element and character members, a block rigidly mounted on said shaft, a bracket rigidly mounted on the transmitting element frame, a rod rigidly mounted in said block and slidably mounted in said bracket, adjusting nuts on said rod for determining the relative positions of said setting and transmitting elements, a spring on said rod between said block and bracket for holding said elements in adjusted position, a crank on said shaft adapted for in and out movement to move said transmitting element relative to the setting element against the tension of said spring, a toggle lock comprising an arm pivotally mounted on said shaft, links pivotally mounted on said transmitting element and on said arm, and adapted to move into locking position when the elements are shifted by said crank, a spring for yieldingly tensioning said links toward locking position, a pawl pivotally mounted on said transmitting element frame and adapted for engagement by said trips, a slide pivotally mounted on said pawl and adapted for reciprocatory movement on said transmitting element frame, a spring on said slide for yieldingly holding said pawl in engagement with said setting element trips, a pawl pivotally mounted on said slide and adapted to engage said toggle arm at times, a bell crank pivotally mounted on said transmitting element frame and adapted to rock said slide pawl, a spring on said bell crank for holding said slide pawl in functional position, a sleeve slidably mounted on said shaft and adapted for actuation by said crank, a flange on said sleeve, a bracket on the transmitting element frame and spaced therefrom to permit limited movement of said sleeve flange, a bracket rigidly mounted on said sleeve and adapted to actuate said bell crank, a spring on said bracket for holding said sleeve in normal position, whereby the crank, in outward position, operating through the sleeve flange and bracket, moves the transmitting element frame and locks the toggle, and whereby the crank, in inward position, operating through the sleeve, bracket and bell crank, functions the slide pawl and frame pawl so that the setting element trip, actuating through the frame pawl and slide pawl, will unlock the toggle arm and reset the transmitting element frame in normal position and whereby the crank in outward position acts through the same mechanism to defunction the slide pawl so that the setting element trip, acting through the frame pawl and slide pawl, will not unlock the toggle.

305. The combination of storage and transmitting elements, trips in said storage element, a keyboard for effecting advance of said storage element and setting said trips, an erase key for reversing said storage element and returning said trips, of an electric motor, a spring motor operatively connected with said electric motor and with said storage and transmitting elements and means for holding said spring motor against revolution in one direction, whereby said spring motor is free to turn reversely as a unit when the storage element is reversed by the erase key.

306. In a telegraph transmitter, a transmitting element comprising character members, a driver for said character members, a governor for regulating said driver, transmission for driving said governor and driver, a clutch for connecting the transmission with the driver, a latch controlling said clutch and a start key manually operating said latch and clutch to disconnect the transmission and driver, the latch being operable by the governor when the governor has attained a predetermined speed to stop the clutch and effect connection of the transmission with said driver.

307. In a telegraph transmitter, setting and transmitting elements, mechanism for locking said elements, a start member operable to defunction the locking mechanism, latch mechanism for retaining the locking mechanism de-functioned, and a stop member for releasing the locking mechanism to permit it to function.

308. In a telegraph transmitter, a transmitting element comprising character members, a driver for said character members, a governor for regulating the speed of said driver, a start key controlling the governor, and means for setting a predetermined speed of the governor, coöperative with the start key to permit the governor to operate at said predetermined speed when released by said start key.

309. In a telegraph transmitter, a transmitting element comprising character members, a driver for said character members, a governor, means for driving the governor, means automatically connecting the governor with the driver when the governor has reached a predetermined speed, means for operating the governor, means for regulating speed of the governor, a start key, and means operable by the start key to release the governor, whereby the governor is free to attain its regulated speed upon operation of the start key.

310. In a telegraph transmitter, character members, a circuit closer operable from the character members to form telegraphic characters, storage mechanism for positioning said character members for operation, other means for actuating said character members, and means operable by the character members for releasing said positioning means, the storage mechanism and means operable by the character members coöperating to mechanically space symbols transmitted by the character members.

311. In a telegraph transmitter, a transmitting element comprising a plurality of individually operable character members, each having a series of equally spaced character sections thereon and having relatively spaced pockets and rail portions, a driver for all of the character members, a frame for each character member having a trip device, and provided with an inclined portion, a setting element, key mechanism for acting on the setting element to induce operation of any selected frame, an escapement controlling actuation of the transmitting element with the setting element, means on each frame adaped to seat in the pockets and travel on the rail of its respective character member, a stop normally holding the escapement and operable upon initial movement of the frame to release the escapement and upon ultimate movement of the frame to relock the escapement.

312. In a telegraph transmitter, a transmitting element comprising a plurality of individually operable character members, each having equally spaced character sections and having equally spaced pockets and rail sections, a driver for all of the character members, a frame for each character member, comprising a lever, a roller normally located in a pocket of its character member, to hold the character member out of driving relation with its driver, a trip lever for each frame, a link operated by each trip lever to shift the respective roller lever, a setting element normally, operably connected with the transmitting element, an escapement controlling the connection between the transmitting element and setting element, a stop member on the escapement, a stop member in the transmitting element normally engaging the escapement stop, key mechanism for controlling actuation of the frame trips from the setting element whereby a link is actuated to normally move its character member into operative relation with the driver and release the escapement and whereby movement of the character member by the driver induces movement of the link by contact of the roller with a rail part to rock the link stop into operative engagement and into stopping relation with the escapement stop.

313. In a telegraph transmitter, a transmitting element comprising a plurality of individually operable character members, each having equally spaced character sections and having equally spaced pockets and rail sections, a driver for all of the character members, a frame member for each character member having a roller normally located in a pocket of the character member to hold the character member out of driving relation with its driver, a trip lever for each frame member, a setting element normally, operably connected with the transmitting element, an escapement controlling the connection between the transmitting and setting elements, a stop member on the escapement, a stop member in the transmitting element normally engaging the escapement stop, key mechanism for controlling actuation of the frame member trips from the setting element whereby a frame member is actuated to normally move its character member into operative relation with the driver and release the escapement and whereby movement of the character member by the driver induces movement of the frame member by contact of the roller with a rail section to rock the frame member stop into operative engagement and into stopping relation with the escapement stop, yielding means for returning the frame member into a successive character member pocket to stop the character member, and yielding means for returning the frame member stop with the frame member to release the escapement and induce the primary engagement of the frame member stop and escapement stop.

314. In a telegraph transmitter, a transmitting element comprising a plurality of individually operable character members, a driver for actuating any of said character members, a frame member operatively connected with each character member and comprising a trip lever, a rotatable setting drum inclosing the transmitting element and comprising an internal gear, a series of trips in said drum for each character member, key mechanism for setting the drum trips to engage the character member trips, an escapement comprising gear wheels in operative engagement with the internal drum gear, a stop in the escapement and means operable by the character member tripping mechanism for controlling the escapement to permit free movement of the gear wheels before locking the gear wheels to the drum gear, whereby the transmitting element may move freely within the drum or travel therewith.

315. In a telegraph transmitter, transmitting and setting elements, rotatable independently of each other, character members in the transmitting element, coöperative means in the setting and transmitting elements for selectively positioning character members for operation, a circuit closer operable from selected character members and means for locking the transmitting and setting elements together, comprising a mounting including a bracket pawl rotatable on the transmitting element, gear connection between the mounting and the setting element, and a pawl in the transmitting element operable upon positioning of a character member to engage the bracket pawl for the purpose set forth.

316. In a telegraph transmitter, independently rotatable setting and transmitting elements, character members in the transmitting element, means for positioning selected character members for operation, means in the setting element for actuating said positioning means, a stop operable from said positioning means, a mounting rotatable on the transmitting element and operatively connected with the setting element, a pawl pivotally mounted in said mounting and rotatable therewith, in non-functional relation to said stop when the character members are in normal position and engageable with the stop when the character members are positioned, to lock the setting and transmitting elements together.

317. In a telegraph transmitter, independently rotatable setting and transmitting elements, character members in the transmitting element, means for positioning selected character members for operation, means in the setting element for actuating said positioning means, a stop operable from said positioning means, a mounting rotatable on the transmitting element and operatively connected with the setting element, a yielding pawl pivotally mounted in said mounting and rotatable therewith, in non-functional relation to said stop when the character members are in normal position and engageable with the stop when the character members are positioned, to lock the setting and transmitting elements together.

318. In a telegraph transmitter, a setting element comprising an internal gear, a transmitting element rotatable within the setting element, character members in the transmitting element, means for positioning the character members for operation, means in the setting element for actuating the positioning means, a rotatable mounting in the transmitting element having gear connection with the internal gear of the setting element, a pawl pivotally mounted in the mounting, yielding means for retaining the pawl in one position and a stop in the transmitting element operable upon positioning of a character member to effect engagement thereof with the rotatable pawl to lock the setting and transmitting elements together.

In testimony whereof I affix my signature.

EDWIN H. PIERSEN.